United States Patent [19]

Kitagaki et al.

[11] Patent Number: 5,450,553
[45] Date of Patent: Sep. 12, 1995

[54] DIGITAL SIGNAL PROCESSOR INCLUDING ADDRESS GENERATION BY EXECUTE/STOP INSTRUCTION DESIGNATED

[75] Inventors: Kazukuni Kitagaki; Takeshi Oto; Yoshitsugu Araki; Tatsuhiko Demura, all of Kanagawa, Japan

[73] Assignee: Kabushiki Kaisha Toshiba, Tokyo, Japan

[21] Appl. No.: 715,622

[22] Filed: Jun. 14, 1991

[30] Foreign Application Priority Data

| Jun. 15, 1990 | [JP] | Japan | 2-155418 |
| Sep. 29, 1990 | [JP] | Japan | 2-262091 |
| Nov. 20, 1990 | [JP] | Japan | 2-312912 |
| Nov. 20, 1990 | [JP] | Japan | 2-312913 |
| Nov. 26, 1990 | [JP] | Japan | 2-317971 |
| Mar. 5, 1991 | [JP] | Japan | 3-038775 |
| Mar. 26, 1991 | [JP] | Japan | 3-061937 |

[51] Int. Cl.$^6$ ............................ G06F 9/00
[52] U.S. Cl. ............ 395/375; 395/166; 364/258.1; 364/258.2; 364/259; 364/261.3; 364/DIG. 1
[58] Field of Search ........... 395/400, 800, 166, 375

[56] References Cited

U.S. PATENT DOCUMENTS

| 4,849,921 | 7/1989 | Yasumoto et al. | 364/715.01 |
| 4,882,683 | 11/1989 | Rupp et al. | 395/165 |
| 5,175,625 | 12/1992 | Miles | 358/183 |
| 5,206,940 | 4/1993 | Murakami et al. | 395/400 |

OTHER PUBLICATIONS

IEEE International Solid–State Circuits Conference, Feb. 19, 1986, Akira Kanuma et al., "Sensors and Interface Electronics", Session IX, pp. 102–103.
IEEE International Solid–State Circuits Conference, Feb. 16, 1989, Shin—ichi Nakagawa et al, "Digital Video & Image Processing", Session 12, pp. 168-169.

*Primary Examiner*—Parshotam S. Lall
*Assistant Examiner*—Ayni Mohamed
*Attorney, Agent, or Firm*—Oblon, Spivak, McClelland, Maier, & Neustadt

[57] ABSTRACT

Disclosed is a digital signal processor for processing input digital signals, comprising an address generation unit for generating an address of an addressing mode which is used for processing the input digital signals; a setting unit for setting an initial value necessary for generating the address in advance in the address generation unit; and an instruction designating unit for designating only execution and stop of address generation to the address generation unit, wherein the address generation unit in which is set the initial value is so constructed as to perform execution and stop of address generation only by designation of the execution and stop outputted from the instruction designating means.

7 Claims, 41 Drawing Sheets

| $X_4$ $(-1,-1)$ | $X_3$ $(-1,0)$ | $X_2$ $(-1,1)$ |
|---|---|---|
| $X_5$ $(0,1)$ | $X_0$ $(0,0)$ | $X_1$ $(-0,1)$ |
| $X_6$ $(1,-1)$ | $X_7$ $(1,0)$ | $X_8$ $(1,1)$ |

FIG. 28

0TH STAGE (FIRST, SECOND)

| COUNTER VALUE | ARRANGING THE LOWER 3 BITS IN THE REVERSE ORDER | INPUT DATA ADDRESS | COMBINATIONS OF BUTTERFLY DATA | COUNTER VALUE | ARRANGING THE LOWER 1 BITS IN THE REVERSE ORDER | OUTPUT TARGET ADDRESS |
|---|---|---|---|---|---|---|
| 000 | → | 000 | ╳ | 000 | → | 000 |
| 001 | → | 100 |   | 001 | → | 001 |
| 010 | → | 010 | ╳ | 010 | → | 010 |
| 011 | → | 110 |   | 011 | → | 011 |
| 100 | → | 001 | ╳ | 100 | → | 100 |
| 101 | → | 101 |   | 010 | → | 101 |
| 110 | → | 011 | ╳ | 001 | → | 110 |
| 111 | → | 111 |   | 111 | → | 111 |

1TH STAGE (FIRST, SECOND)

| COUNTER VALUE | ARRANGING THE LOWER 2 BITS IN THE REVERSE ORDER | INPUT DATA ADDRESS | COMBINATIONS OF BUTTERFLY DATA | COUNTER VALUE | ARRANGING THE LOWER 2 BITS IN THE REVERSE ORDER | OUTPUT TARGET ADDRESS |
|---|---|---|---|---|---|---|
| 000 | → | 000 | ╳ | 000 | → | 000 |
| 001 | → | 010 |   | 001 | → | 010 |
| 010 | → | 001 | ╳ | 010 | → | 001 |
| 011 | → | 011 |   | 011 | → | 011 |
| 100 | → | 100 | ╳ | 100 | → | 100 |
| 010 | → | 110 |   | 010 | → | 110 |
| 001 | → | 101 | ╳ | 001 | → | 010 |
| 111 | → | 111 |   | 111 | → | 111 |

2TH STAGE (FIRST, SECOND)

| COUNTER VALUE | ARRANGING THE LOWER 3 BITS IN THE REVERSE ORDER | INPUT DATA ADDRESS | COMBINATIONS OF BUTTERFLY DATA | COUNTER VALUE | ARRANGING THE LOWER 3 BITS IN THE REVERSE ORDER | OUTPUT TARGET ADDRESS |
|---|---|---|---|---|---|---|
| 000 | → | 000 | ╳ | 000 | → | 000 |
| 001 | → | 100 |   | 001 | → | 100 |
| 010 | → | 010 | ╳ | 101 | → | 010 |
| 011 | → | 110 |   | 011 | → | 110 |
| 100 | → | 001 | ╳ | 100 | → | 001 |
| 010 | → | 101 |   | 101 | → | 101 |
| 110 | → | 011 | ╳ | 110 | → | 011 |
| 111 | → | 111 |   | 111 | → | 111 |

FIG.29

0TH STAGE (FIRST, SECOND)

| COUNTER VALUE | ARRANGING THE LOWER 3 BITS IN THE REVERSE ORDER | INPUT DATA ADDRESS | COMBINATIONS OF BUTTERFLY DATA | COUNTER VALUE | ARRANGING THE LOWER 3 BITS IN THE REVERSE ORDER | OUTPUT TARGET ADDRESS |
|---|---|---|---|---|---|---|
| 000 | → | 000 | ╳ | 000 | → | 000 |
| 001 | → | 100 |  | 001 | → | 100 |
| 010 | → | 010 | ╳ | 010 | → | 010 |
| 011 | → | 110 |  | 011 | → | 110 |
| 100 | → | 001 | ╳ | 100 | → | 001 |
| 101 | → | 101 |  | 101 | → | 101 |
| 110 | → | 011 | ╳ | 110 | → | 011 |
| 111 | → | 111 |  | 111 | → | 111 |

1TH STAGE (FIRST, SECOND)

| COUNTER VALUE | ARRANGING THE LOWER 2 BITS IN THE REVERSE ORDER | INPUT DATA ADDRESS | COMBINATIONS OF BUTTERFLY DATA | COUNTER VALUE | ARRANGING THE LOWER 2 BITS IN THE REVERSE ORDER | OUTPUT TARGET ADDRESS |
|---|---|---|---|---|---|---|
| 000 | → | 000 | ╳ | 000 | → | 000 |
| 001 | → | 010 |  | 001 | → | 010 |
| 010 | → | 001 | ╳ | 010 | → | 001 |
| 011 | → | 011 |  | 011 | → | 011 |
| 100 | → | 100 | ╳ | 100 | → | 100 |
| 101 | → | 110 |  | 101 | → | 110 |
| 110 | → | 101 | ╳ | 110 | → | 101 |
| 111 | → | 111 |  | 111 | → | 111 |

2TH STAGE (FIRST, SECOND)

| COUNTER VALUE | ARRANGING THE LOWER 1 BITS IN THE REVERSE ORDER | INPUT DATA ADDRESS | COMBINATIONS OF BUTTERFLY DATA | COUNTER VALUE | ARRANGING THE LOWER 3 BITS IN THE REVERSE ORDER | OUTPUT TARGET ADDRESS |
|---|---|---|---|---|---|---|
| 000 | → | 000 | ╳ | 000 | → | 000 |
| 001 | → | 001 |  | 001 | → | 100 |
| 010 | → | 010 | ╳ | 010 | → | 010 |
| 011 | → | 011 |  | 011 | → | 110 |
| 100 | → | 100 | ╳ | 100 | → | 001 |
| 101 | → | 101 |  | 101 | → | 101 |
| 110 | → | 110 | ╳ | 110 | → | 011 |
| 111 | → | 111 |  | 111 | → | 111 |

FIG.31

0TH STAGE (FIRST,SECOND)

| COUNTER VALUE | ARRANGING THE LOWER 2 BITS IN THE REVERSE ORDER | FACTOR ADDRESS |
|---|---|---|
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |

1TH STAGE (FIRST,SECOND)

| COUNTER VALUE | ARRANGING THE LOWER 2 BITS IN THE REVERSE ORDER | FACTOR ADDRESS |
|---|---|---|
| 0 0 0 | → | 0 0 0 |
| 0 0 0 | → | 0 0 0 |
| 0 0 1 | → | 0 1 0 |
| 0 0 1 | → | 0 1 0 |
| 0 0 0 | → | 0 0 0 |
| 0 0 0 | → | 0 0 0 |
| 0 0 1 | → | 0 1 0 |
| 0 0 1 | → | 0 1 0 |

2TH STAGE (FIRST,SECOND)

| COUNTER VALUE | ARRANGING THE LOWER 2 BITS IN THE REVERSE ORDER | FACTOR ADDRESS |
|---|---|---|
| 0 0 0 | → | 0 0 0 |
| 0 0 0 | → | 0 0 0 |
| 0 0 1 | → | 0 1 0 |
| 0 0 1 | → | 0 1 0 |
| 0 1 0 | → | 0 0 1 |
| 0 1 0 | → | 0 0 1 |
| 0 1 1 | → | 0 1 1 |
| 0 1 1 | → | 0 1 1 |

FIG.32

0TH STAGE (FIRST,SECOND)

| COUNTER VALUE | ARRANGING THE LOWER 2 BITS IN THE REVERSE ORDER | FACTOR ADDRESS |
|---|---|---|
| 0 0 0 | → | 0 0 0 |
| 0 0 0 | → | 0 0 0 |
| 0 0 1 | → | 0 1 0 |
| 0 0 1 | → | 0 1 0 |
| 0 1 0 | → | 0 0 1 |
| 0 1 0 | → | 0 0 1 |
| 0 1 1 | → | 0 1 1 |
| 0 1 1 | → | 0 1 1 |

1TH STAGE (FIRST,SECOND)

| COUNTER VALUE | ARRANGING THE LOWER 2 BITS IN THE REVERSE ORDER | FACTOR ADDRESS |
|---|---|---|
| 0 0 0 | → | 0 0 0 |
| 0 0 0 | → | 0 0 0 |
| 0 0 1 | → | 0 1 0 |
| 0 0 1 | → | 0 1 0 |
| 0 0 0 | → | 0 0 0 |
| 0 0 0 | → | 0 0 0 |
| 0 0 1 | → | 0 1 0 |
| 0 0 1 | → | 0 1 0 |

2TH STAGE (FIRST,SECOND)

| COUNTER VALUE | ARRANGING THE LOWER 2 BITS IN THE REVERSE ORDER | FACTOR ADDRESS |
|---|---|---|
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |
| 0 0 0 | → | 0 0 0 |

FIG.37

| | THE NUMBER OF CLOCKS | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| AGF | COUNTER 4 | A-1 | A-2 | A-3 | A-4 | A-5 | A-6 | A-7 | A-8 | A-9 | A-9 | A-9 | A-9 | A-9 | A-9 | A-9 | A-5 | A-6 | A-7 |
| | NAC 9 | B-1 | B-1 | B-1 | B-1 | B-1 | B-1 | B-1 | B-1 | B-1 | B-2 | B-3 | B-4 | B-5 | B-6 | B-2 | B-2 | B-2 | B-2 |
| | CUE 53 | | | | | | A-1 | A-2 | A-3 | A-4 | B-5 | A-4 | A-4 | A-4 | A-4 | A-4 | | | |
| | REGISTER 52 | | A-1 | A-2 | A-3 | A-4 | A-5 | A-6 | A-7 | A-8 | A-9 | B-2 | B-3 | B-4 | B-5 | B-6 | B-7 | A-5 | |
| | REGISTER 52 | | | A-1 | A-2 | A-3 | A-4 | A-5 | A-6 | A-7 | A-8 | A-9 | B-2 | B-3 | B-4 | B-5 | B-6 | B-7 | A-5 |
| | ADDRESS OUTPUT | | | | | | | A-4 | A-5 | A-6 | | | B-2 | B-3 | B-4 | B-4 | | | |
| | DATA INPUT | | | | | DA-1 | DA-2 | DA-3 | DA-4 | DA-5 | | | | | DB-2 | DB-3 | | | |
| | DATA PROCESS | | | | | | DA-1 | DA-2 | DA-3 | DA-4 | | | | | | DB-2 | | | |
| ARITHMETIC OPERATION SECTION | | | | | | | | | | | | | | | | | | | |

BIT OPERATION CIRCUIT

FIG.47
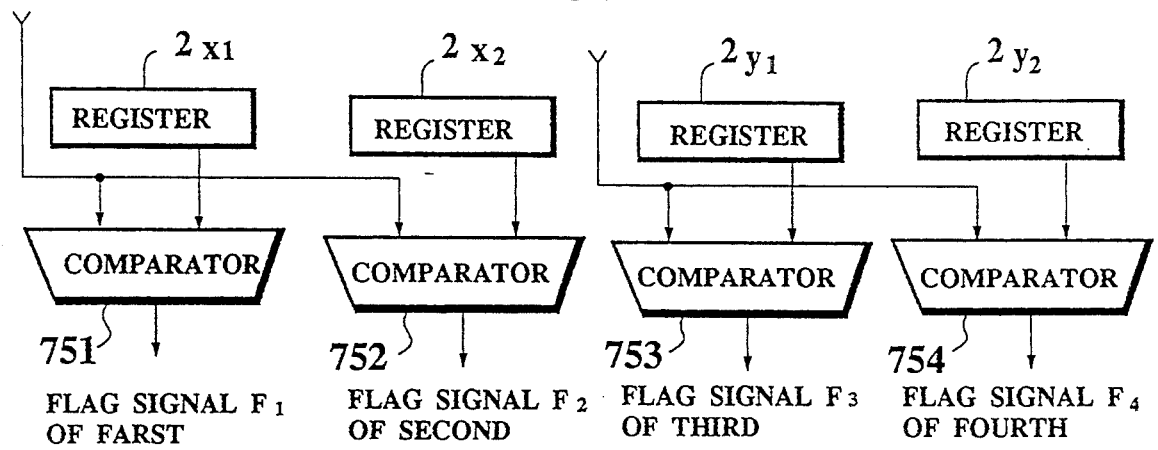
FIG.48 (a)
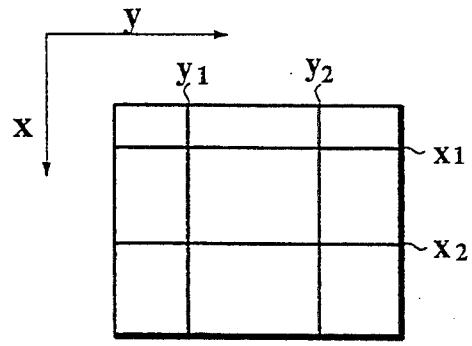
FIG.48 (b)   FIG.48 (c)
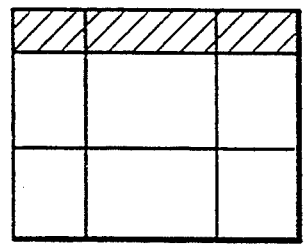 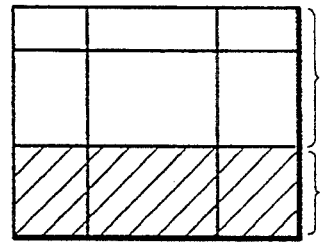
FLAG SIGNAL $F_1$ OF FARST    FLAG SIGNAL $F_2$ OF SECOND
FIG.48 (d)   FIG.48 (e)
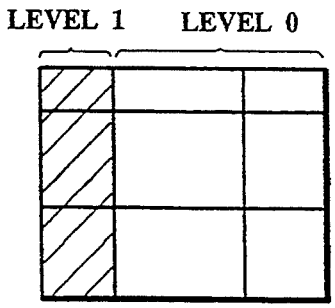 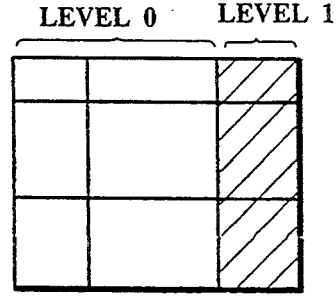
FLAG SIGNAL $F_3$ OF THIRD    FLAG SIGNAL $F_4$ OF FOURTH

SPECIFIC AREA A

SPECIFIC AREA B

SPECIFIC AREA C

SPECIFIC AREA D

SPECIFIC AREA E

SPECIFIC AREA F

SPECIFIC AREA G

SPECIFIC AREA H

SPECIFIC AREA I

FIG.55

REGISTER A INPUT FIELD
$$\begin{cases} 00 : BUS1 \\ 01 : BUS2 \\ 10 : BUS3 \\ 11 : NO\ CONNECTION \end{cases}$$

REGISTER B INPUT FIELD
$$\begin{cases} 00 : BUS1 \\ 01 : BUS2 \\ 10 : BUS3 \\ 11 : NO\ CONNECTION \end{cases}$$

REGISTER C INPUT FIELD
$$\begin{cases} 00 : BUS1 \\ 01 : BUS2 \\ 10 : BUS3 \\ 11 : NO\ CONNECTION \end{cases}$$

BUS 1 INPUT FIELD
$$\begin{cases} 00 : REGISTER\ A \\ 01 : REGISTER\ B \\ 10 : REGISTER\ C \\ 11 : REGISTER\ 203 \end{cases}$$

BUS 2 INPUT FIELD
$$\begin{cases} 00 : REGISTER\ A \\ 01 : REGISTER\ B \\ 10 : REGISTER\ C \\ 11 : REGISTER\ 203 \end{cases}$$

BUS 3 INPUT FIELD
$$\begin{cases} 00 : REGISTER\ A \\ 01 : REGISTER\ B \\ 10 : REGISTER\ C \\ 11 : REGISTER\ 203 \end{cases}$$

REGISTER 201 INPUT FIELD
$$\begin{cases} 00 : BUS1 \\ 01 : BUS2 \\ 10 : BUS3 \\ 11 : NO\ CONNECTION \end{cases}$$

REGISTER 202 INPUT FIELD
$$\begin{cases} 00 : BUS1 \\ 01 : BUS2 \\ 10 : BUS3 \\ 11 : NO\ CONNECTION \end{cases}$$

FIG.56

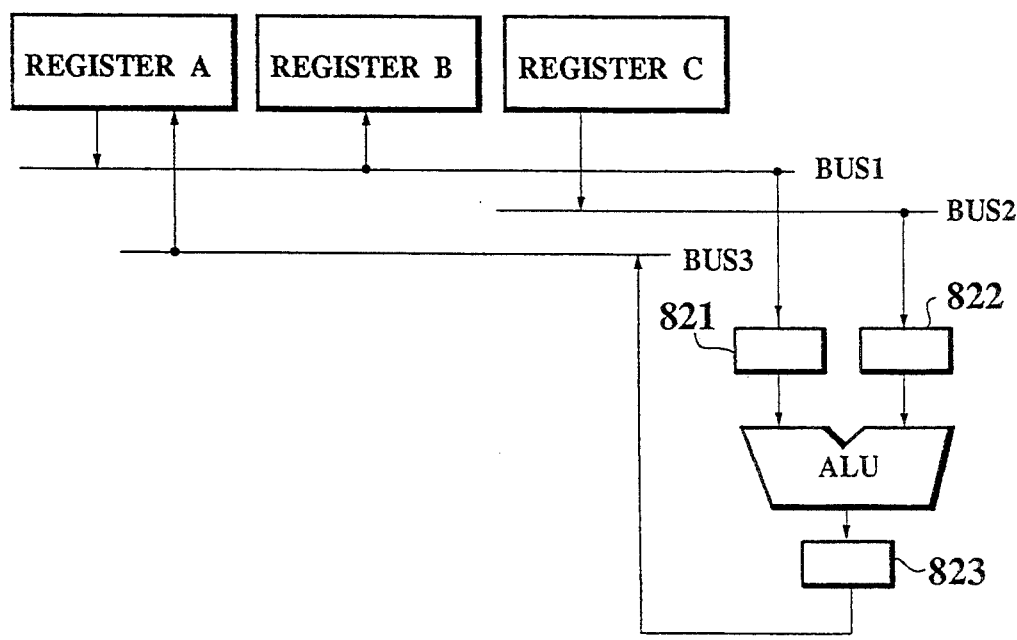

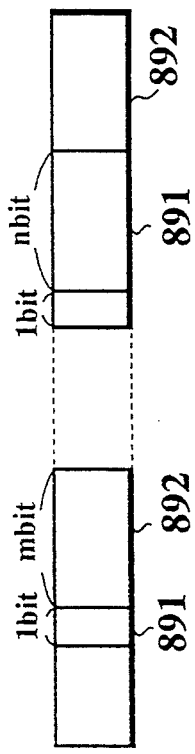
FIG.59
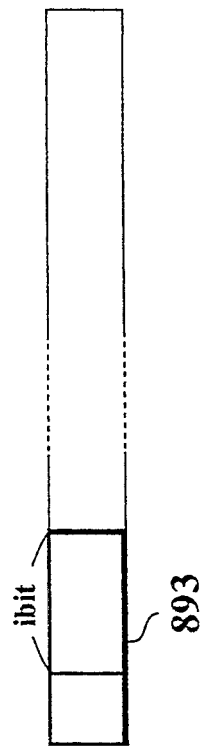
FIG.60
FIG.61
```
ALU,ADD   ALU,INA A1   ALU,INB B1   MPY,MPY   MPY,INA A2   MPY,INB B2   MOV,A3 A2   MOV A1,C3 ;
                                    MPY,NOP                                          MOV A2,C3 ;
ALU,SUB                ALU,INB B2                          MPY,INB B3                MOV A1,C3 ;
                                                           MPY,INB B2                            ;
                                    MPY,MPY   MPY,INA A4                                         MOV A2,C3 ;
```

DIGITAL SIGNAL PROCESSOR INCLUDING ADDRESS GENERATION BY EXECUTE/STOP INSTRUCTION DESIGNATED

BACKGROUND OF THE INVENTION

1. Field of the Invention

The present invention relates to a digital signal processor (DSP) for executing arithmetic operations for obtaining sums of products at a high speed, and particularly to a DSP which can independently process picture-image signals.

2. Description of the Prior Art

Recently, digital signal processors (hereinafter, designated as DSP) for executing high speed arithmetic operations on sums of products frequently appearing in digital signal processes have been widely used. Moreover, also in the field of processing picture-image signals, DSP's for independently processing image signals have prevailed.

FIG. 1 shows a block diagram of a typical construction of a conventional DSP 371 for processing picture-image signals.

In the DSP 371, there are provided mainly an operation section 373 for carrying out data operations, address generation units (hereinafter, designated as AGU) 375a to 375c, a register file 381 for temporarily holding data, an instruction memory 377 for holding instructions in a readable state, and a control section 379.

In such construction, the control section 379 controls the AGU's 375a to 375c, operation section 373 and register 381 in accordance with an instruction contained in the instruction memory 377. The AGU's 375a to 375c calculate addresses of external memories 383a to 383c in accordance with a process program, and then output them to these memories 383a to 383c, respectively. Then, these calculated addresses stored in the external memories 383a to 383c, and are respectively read and temporarily held in the register 381 through a data bus 384. Otherwise, these data are inputted to the operation section 373, and some calculation designated by a suitable program is given to these data in the section 373. Moreover, these data calculated in the operation section 373 are respectively read into the external memories 383a to 383c in accordance with the respective addresses generated by the AGU's 375a to 375c.

Incidentally, the address calculation carried out in the AGU's 375a to 375c and the arithmetic operation given to the data in the operation section 373 are executed in parallel or in a pipeline.

Next, the construction, operation and problems in the address generation units (AGU) in the above-mentioned conventional DSP for processing picture-image signals will be explained.

First, the construction of the AGU's 375a to 375c is explained with reference to FIG. 2. Moreover, in FIG. 3, there is schematically shown an instruction field in which is described the instruction on data operation or on address calculation.

Now consider an addressing mode, i.e., a two-dimensional raster scan mode in which a scanning operation is carried out from the left upper portion to the right lower portion of a screen, as shown in FIG. 4.

In such an addressing mode, increment of the X address by means of an adder 385 and increment of the Y address by means of an adder 387 are carried out simultaneously. Then, the increase caused by each address increment is inputted to a register 389 or 391.

On the other hand, an addressing instruction is described in an AGU control field 791 in the instruction field shown in FIG. 3. Moreover, in the AGU control field 791 are described step by step input instructions to the registers 381, 391, instructions on additive operations to the adders 385, 387 and instructions on transfer of the addition results. Besides, the description on these instructions is so given as to synchronize with timings of the increment on the X and Y addresses and of the data operation by the operation section 373. Additionally, since the operation section 373 and the AGU's 375a to 375c are operated in parallel, the AGU control field 791 and an operation section control field 793 are set separately in the instruction field of FIG. 3.

As stated above, in the conventional DSP for processing picture-image signals, the instructions for controlling the AGU's 375a to 375c are described step by step in a condensed form in the AGU control field 791. Therefore, the bit number of these instructions must be greatly increased, so that a large amount of hardware for reading, storing and decoding these instructions must be prepared in the DSP. Moreover, when the instruction bit number is increased, a large number of instruction memories is required, and it also becomes necessary to decode these instructions into a plurality of parts processable. As the result, far more time is required for reading the instructions. Besides, it is very difficult to prepare such a program which is capable of realizing synchronism with timings of respective data operations. Moreover, even though possible, it would take much time and trouble to prepare such a program.

Next, the address production method in the address generation units (AGU) of the conventional DSP is explained.

Generally, the discrete Fourier transform technology is used in processing digital signals on picture-image processing or signal analysis. As a method for carrying out such a discrete Fourier transform, the so-called FFT (Fast Fourier Transform) method is known. Incidentally, the FFT method is disclosed in literatures, such as Alan V. Oppenhelm et al, Digital Signal Processing, Prentice-Hall International Editions. Such an FFT method is realized by repetition of butterfly operations on two data.

For example, when two complex-number input data are A+iB, C+iD, and the respective results of the butterfly operation are A'+iB', C'+iD', and the coefficient is X+iY, the butterfly operation can be expressed as follows:

$$A'+iB'=(A+iB)+(X+iY)(C+iD)$$

$$C'+iD'=(A+iB)-(X+iY)(C+iD)$$

wherein A, C, A', C' and X are real numbers, and B, D, B', D' and Y are imaginary numbers, respectively.

Moreover, as a typical FFT method, there can be mentioned a time thinning-out FFT method and a frequency thinning-out FFT method.

Here, a calculation procedure of the time thinning-out FFT method in the conventional data address generation method is explained.

FIG. 5 is a flow chart to show a calculation procedure of an FFT method for thinning out time at eight points.

In the same drawing, numerals 0, 1, 2, ... 7 respectively designate outputs or addresses generated from an address generation circuit. Moreover, x(0) to x(7) designate input data, X(0) to X(7) designate output data, and F0(0) to F2(7) are intermediate results, further W0 to W7 are coefficients, respectively.

On the 0th stage, addresses 0, 1, 2, 3, 4, 5, 6 and 7 are successively generated, and expressed in their respective binary forms, then each result is subjected to a bit reverse order operation. Namely,
0(000) is transformed to 0(000),
0(001) to 4(100),
2(010) to 2(010),
3(011) to 6(110),
4(100) to 1(001),
5(101) to 5(101),
6(110) to 3(011), and
7(111) to 7(111).

Then, each data (x(i) in FIG. 5) is read from each resultant transformed address, thereafter a butterfly operation is carried out with respect to respective pairs of addresses, i.e., addresses 0 and 4, 2 and 6, 1 and 5, and 3 and 7. Then, the results (F0 (i) in FIG. 5) are written at the addresses 0, 1, 2, 3, 4, 5, 6 and 7. For example, $F0(0)=x(0)+W0 \times x(4)$.

Accordingly, each address to be generated on the 0th stage can be expressed by $2^1 k+j+2^0 i$, wherein $i=0$, $j=0$, $k=0, 1, 2, 3$, and nesting is carried out in the order of i, j, k and is ended when i, j, k reach the respective maximum values.

Then, the butterfly operation is carried out with respect to every pair of the addresses generated in such a manner. However, the addresses generated here are not yet subjected to the bit reverse order operation as mentioned above.

Incidentally, the coefficients W are all equal on the 0th stage, so that a read address of the coefficient memory is 0.

Next, on the 1st stage, addresses 0, 2, 1, 3, 4, 6, 5 and 7 are generated successively, and each butterfly operation on F0(i) is given to respective address pairs of 0 and 2, 1 and 3, 4 and 6, and 5 and 7. Then, the results (F1(i) in FIG. 5) are respectively written in the addresses 0, 2, 1, 3, 4, 6, 5, 7.

At the time, each address to be generated can be expressed by $2^2 k+j+2^1 i$ wherein $i=0, 1, j=0, k=0, 1$.

Thereafter, each pair of the addresses generated in accordance with the above formula is subjected to a butterfly operation.

Incidentally, read addresses of the coefficient memory are 0 and 2, so that coefficients corresponding to these addresses are alternately used.

Moreover, on the 2nd stage, the addresses are generated in the order of 0, 4, 1, 5, 2, 6, 3 and 7, then each butterfly operation on Fi(1) is given to respective address pairs of 0 and 4, 1 and 5, 2 and 6, and 3 and 7. Further, the results (F2(i) in FIG. 5) are respectively written in the addresses 0, 4, 1, 5, 2, 6, 3, 7.

In this case, each address to be generated can be expressed by $2^3 k+j+2^2 i$ wherein $i=0, 1, j=0, 1, 2, 3$, $k=0$.

Thereafter, each pair of the generated addresses is subjected to a butterfly operation.

Incidentally, read addresses of the coefficient memory are 0, 1, 2, 3.

Generally, read addresses of the input data memory and write addresses of the output data memory respectively generated on the n-th stage of an FFT at a $2^m$ point can be expressed by the following formula (1):

$$2^{+1}k+j+2^n i \qquad (1)$$

wherein $i=0, 1, j=0, 1, 2, \ldots, 2^n-1, k=0, 1, 2, \ldots 2^{m-n-1}-1$.

On the other hand, read addresses of the coefficient memory can be expressed by the following formula (2):

$$2^{m-n-1}h \qquad (2)$$

wherein $h=0, 1, 2, \ldots, 2^n-1$.

The generation period of h is twice as long as the generation period of i, and is repeated $2^{m-n-1}$ times in the interval in which h reaches $2^n-1$ from 0.

In order to realize a hardware system for generating such addresses, counters for successively generating i, j, k, h, shifters for multiplying each corresponding factor by $2^{n+1}, 2^n, 2^{m-n-1}$, adders for obtaining the sum of $2^{n+1}k$, j and $2^n i$, and a bit reverse order operation circuit for carrying out the bit reverse order operation on the 0th stage must be prepared respectively for the input data, output data and coefficients.

FIG. 6 shows a conventional example of address generating circuits for realizing the formula (1). In the same drawing, reference numerals 399,392. 393 respectively designate counters, 394, 395 are shifters, 396, 397 are adders and 398 denotes a bit reverse order operation circuit.

Namely, as clearly seen from FIG. 6, in such an address generation circuit for realizing the address generation method based on the conventional FFT, the plurality of counters, shifters and adders, and the bit reverse order operation circuit are required, so that the generating circuit must be formed in relatively large-scaled and complicated construction. Moreover, since the connection between these counters and the setting of initial and final values of each counter are very complex, it is very difficult to control the circuit in such construction.

Next, another address generation method based on the affine transformation is explained.

Generally, in the picture-image signal process, affine transformation concerning reduction, expansion, movement or rotation of picture images is frequently used. Since the affine transformation is generally regarded as transformation concerning coordinates, in the case of processing digital signals of picture images, it is used for transformation of coordinates of the input and output picture images. Therefore, the address generation based on this method can be designated by the following formula (1):

$$\begin{pmatrix} X \\ Y \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

wherein X, Y are input picture-image coordinates, x, y are output picture-image coordinates, a, b, c, d are transformation coefficients, and e, f are offset coordinates, respectively.

Moreover, the input picture-image coordinates to be obtained by the calculation are respectively in the following forms (2):

$$X=ax+by+e \quad Y=cx+dy+f \qquad (2)$$

Namely, these input picture-image coordinates X, Y can be respectively obtained by an addition based on a, b, e and another on c, d, f with such general screen scanning that in the output picture-image coordinates (x, y), x is increased by one from the most left upper coordinates (0, 0) to right lower coordinates (m, n), and if x reaches m then y is increased by one.

In this case, though a, b, c, d, e, f are real numbers respectively, the input and output picture-image coordinates should be coordinates of integral numbers. Therefore, it is necessary to obtain coordinates of integeral numbers from coordinates of real numbers. For example, when both of the coordinates X, Y obtained by the formula (2) are real numbers, and both of the integral parts in X, Y are Xr, Yr, four integral coordinates adjacent to X, Y are generally determined as follows:

$$(Xr, Yr), (Xr+1, Yr) (Xr, Yr+1) (Xr+1, Yr+1). \qquad (3)$$

Accordingly, the input and output picture-image coordinates are selected as those nearest to the real-number coordinates (X, Y) among these four coordinates. Therefore, it is necessary to calculate the respective distances from (X, Y) to these four coordinates.

FIG. 7 shows a typical example of circuit construction for address generation. Namely, in the same drawing, the respective increased amounts of coordinates (X, Y) which are calculated by the operation section 373 shown in (FIG. 1) are contained in registers 301, 302, and the respective initial values of the same coordinates are contained in registers 303, 304, 305, 306. Then, the coordinates X, Y are respectively counted up by ALU's 313, 314 respectively controlled by the control section 379. Thereafter, the coordinates X, Y newly obtained by the ALU's 313, 314 are respectively shifted by barrel shifters 307, 308 to be met an address format given in advance to a picture-image memory. Then, the coordinates X, Y are combined together and transformed into an address on the picture-image memory by an ALU 309, and contained in an output register 312.

To carry out affine transformation by such an address generating circuit, the above-mentioned factor e calculated by the data processing section is contained in the register 304, likewise, f in 306, a in 301, and c in 302. Moreover, addition is repeated with respect to a, c based on e, f as the initial values. If the number of times of the addition reaches the maximum value with respect to the coordinate x, then b+e calculated by the data processing section is contained in the register 304, and d+f in 306. Thereafter, the calculation is continued in the same manner. As the result, a coordinates X, Y are transformed into an address on the picture-image memory by the barrel shifters 307, 308 and ALU 309, and contained in the output register 312. Since both of the coordinates contained in the register 312 are real numbers, these are transferred to the data processing section so as to obtain corresponding integral coordinates.

As stated above, in such an address generation circuit, since it is not possible to calculate the respective distances from real-number coordinates to four adjacent integral coordinates, an operation section is usually used in combination. Therefore, it takes much time to obtain an address based on the affine transformation. Moreover, in such construction, it is necessary to operate the ALU's 313, 314, selectors 310, 311 and barrel shifters 307, 308 at the same time. Accordingly, the program must be complicated, and an extremely large capacity is required for the program memory. Therefore, it is very difficult to realize with one LSI a digital signal processor capable of performing the affine transformation as well as other addressing modes.

Namely, in the conventional and generally known address generation circuit, it takes much time to obtain an address based on the affine transformation, moreover the program description must be extremely complicated.

Next, there is explained a conventional example of address generation circuits for carrying out eight neighborhood access.

On the other hand, the picture-image processing technology is also widely used in the field of factory automation or medical engineering. As the picture-image processing technology, there can be mentioned smoothing or edge detection based on two-dimensional space filters, orthogonal transformation represented by fast Fourier transformation (FFT) or discrete cosine transformation (DCT), and feature extraction represented by labelling, line thinning or boundary tracking.

For example, in the case of the two-dimensional filter technology, with respect to one picture element as an object, the process is given to a space of three picture-element square around the object. In this case, the process is continued in a scanning manner with shifting the object by one picture element over all of the screen.

In case of the labelling or line thinning, the process is given to four or eight points adjacent to one picture element as an object to be processed. The definition of these four or eight adjacent points is given in FIG. 8. Namely, in the same drawing, x1, x2, x3, x4, x5, x6, x7, x8 designate such eight adjacent points. On the other hand, x1, x3, x5, x7 show the four adjacent points. Moreover, at the lower portion in each section are respectively designated each X address and Y address corresponding to a distance from the center x0 to each point in the section. Accordingly, the process given to eight adjacent points in the labelling or line-thinning process is the same in principle as that given to a space of three picture-element square. However, unlike the above-mentioned two-dimensional space filter process, the process in the labelling or line- thinning technology is given to eight points adjacent to a specified picture element.

Hereinafter, the process on such eight adjacent points in the labelling is explained in more detail.

First, the definition of a term "connection" is explained. With respect to a picture element designated by 1 in binary picture images, if there is a point designated by 1 in the adjacent eight point, these two picture elements are defined to be in the relation of "connection" to each other in the eight-adjacent-point system. On the other hand, if there is a point in the four adjacent points, these two are defined to be in the relation of "connection" to each other in the four-adjacent-point system. Moreover, among a collection of picture elements respectively being in such a connective relation in binary picture images, some are in the 0 state and the other in the 1 state. These classes of the 0 and 1 states are respectively called connective components. Namely, in the labelling of these connective components, the same labels are allocated to the same connective components, and the other labels to the other components.

In this case, raster scan is successively carried out on the picture images so as to find a picture element in the 1 state (hereinafter designated by picture element 1), which is not yet given labels. Then, to this picture element is allocated a label not yet used. Next, picture elements 1 among eight picture elements which are adjacent to this picture element are given the same labels.

Moreover, the same labels are given to picture elements 1 among respective eight picture elements adjacent to these labelled picture elements. Then, the same process is repeated until no more picture element 1 to be labelled anew is found. As a result, the same labels are given to all of the same connective components. Furthermore, the same scanning process is repeated to find a picture element 1 not yet labelled so as to allocate a new label to it. Then, the same process is carried out. Thereafter, the algorithm is completed when the raster scan is finished over all of picture images. Accordingly, in such labelling, access of picture elements of the eight adjacent points is essential, thus the address generation for the access is very important.

Though the access order to picture elements of the eight adjacent points is optional in the labelling, this order is one of very important factors in the line thinning or boundary tracking.

Next, the calculation of a connectivity number necessary for the line thinning is explained.

The connectivity number Nc is a number for expressing a feature of a picture element in a certain Figure, and is defined by the following formula:

(In case of four adjacent points)

$$Nc^{(4)}(X_o) = \sum_{k=m} (f(X_k) - f(X_k)f(X_{k+1})f(X_{k+2}))$$

(In case of eight adjacent points)

$$Nc^{(8)}(X_o) = \sum_{k=m} (f(X_k) - f(X_k)f(X_{k+1})f(X_{k+2}))$$

In these formulae, f(xi) is a value of a picture element at xi shown in FIG. 8, and $'f(xi) = 1 - f(xi)$, $x9 = x1$, $S = \{1, 3, 5, 7\}$.

Namely, Nc=0 means an isolated point or internal point, Nc=1 means an end point, Nc=2 means a serial point, Nc=3 means a branch point, and Nc=4 means a crossing point.

As clearly seen from the result, the calculation of the connectivity number can be carried out with ease when the access is carried out in the anti-clockwise direction with respect to picture elements of the four or eight adjacent points. Next, the boundary tracking is explained. On extraction of the boundary of a Figure, it is usually convenient to take out the boundary as a series of picture elements arranged in a suitable order as well as a collection of boundary points. Moreover, there have been proposed an algorithm for successively tracking boundary points for such purpose.

According to the algorithm, it necessary to perform such boundary tracking as to carry out access in the anti-clockwise direction with respect to eight adjacent points from the previous picture element around the current picture element.

As a conventional example of address generation circuits for carrying out such eight neighborhood access, the circuit shown in FIG. 2 is known. Returning now to FIG. 2, in this case, reference numerals 401, 389, 403, 391 designate registers respectively capable of increment and decrement. 385, 387, 405 are adders. Moreover, the XA register 401 and YA register 403 respectively generate two dimensional logic addresses X, Y. While, the XB register 389 and YB register 391 respectivey generate relative distances ΔX, ΔY with respect to adjacent points. Namely, in case of generating addresses of a point, for example (1) in the eight adjacent points shown in FIG. 8, addresses of a picture element at the center is set in the XA and YA registers, and the relative distances −1, 1 are respectively set in the XB and YB registers. Thereafter, the values of the XA and XB registers are added in the adder 385 to be a logic address of the coordinate X of the point (1). On the other hand, the values of the YA and YB registers are added by the adder 387 to be a logic address of the coodinate Y of the point (1). Subsequently, the logic address X is shifted by a shifter 407 so as not to overlap the logic address Y, then added to the logic address Y by the adder 405.

In case of accessing the eight adjacent points from the point (1), the values of the XA and YA registers are set at constant values respectively. However, the values of the YB and XB registers should be respectively changed as follows:

−1, −1, −1, 0, 1, 1, 1, 0 1, 0, −1, −1, −1, 0, 1, 1

In the conventional address generating circuits, these numerical sequences are generated by loading them from a program provided inside or outside each circuit, and a suitable instruction for setting address registers is executed for each operational instruction. Therefore, the program must be very long and complicated, so that it such that it will be very difficult to develop such programs.

Accordingly, in the conventional address generation circuit based on the above-mentioned eight-adjacent-point access method, it is necessary to irregularly change the values to be set in the respective registers in the address generation circuit. Therefore, it is necessary to prepare a very complicated program for controlling this operation.

Next, the construction, control operation and the problems thereof in the operation section of the conventional DSP for picture image signal process are explained.

As shown in FIG. 9, the parallel arithmetic operation section based on the conventional parallel execution method comprises a plurality of computing units 501 to 502 and memories corresponding to a plurality of banks so that these units 501 to 502 and memory banks are optionally connected to one another. Moreover, the connection between each operation carried out at these computing units 501 to 502 and each memory bank is controlled in parallel so as to execute a plurality of operations in parallel on the same cycle.

On the other hand, as one of the most important operations executed by the parallel arithmetic operation section, there is a condition branching operation to be carried out on executing a condition branching instruction. In such an operation, when a branching condition designated by the condition branching instruction and a flag register 503 are in a specific relation, a value contained in an instruction pointer 504 is newly written into an address designated in the same condition branching instruction so as to change it into an address designated by the condition branching instruction. Incidentally, the flag register 503 is rewritten by the output result of the computing unit 502, and is generally constructed with a plurality of bits. For example, the register 503 has a bit to be changed into logic 1 when the output of the computing unit 502 is 0, or a bit to be changed into logic 1 when the output of the computing unit 502 is negative.

Moreover, in the conventional parallel arithmetic operation section as shown in FIG. 9, though the plurality of computing units 501 to 502 are provided, there is only one flag register 503 belonging to the computing unit 502. Therefore, the setting of branching conditions on the condition branching is greatly limited.

For example, consider a case of operation shown by a flow chart in FIG. 10, where:

a process 1 is executed when a variable A is smaller than a constant C (A<C), and a variable B is equal to a constant D (B=D); and a process 2 is executed in the other cases.

In such a case, the contents in an instruction memory of this case are shown in FIG. 11.

As shown in FIG. 11, an instruction on B-C is set in an address given increment by one step as compared with an address in which is set an instruction on A-C. Moreover, an execution instruction on the process 1 is set at an address given increment by one step as compared with the address in which is set the instruction on B-C. Furthermore, an execution instruction on the process 2 is set in a branched address.

On the other hand, to realize such an operation, the instruction on A-C is executed by using the computing unit 502, and the bit of the flag register 503 is rewritten in accordance with the sign of the output of execution. Then, at a control circuit 505 is carried out discrimination on whether A<C is established from the bit value of the flag register 503 showing the result of A-C. If A<C is not established, the instruction pointer 504 is rewritten at the branched address in which is set the execution instruction on the process 2 so that the condition branching is established. As the result, the process 2 is executed when the relation A<C is not established. On the contrary, if A<C is established, the instruction pointer 504 is subjected to increment by one step so that the condition branching is not established. In this case, since the instruction on B-C is already set in the address to which is shifted the instruction pointer 504 by one step increment, the same instruction is executed again by the computing unit 502.

Moreover, the bit of the flag register 503 is rewritten again in accordance with the sign of the execution result, and the control circuit 505 discriminates whether B=C is established from the bit value. If B=C is not established, the flow is branched to the branched address, and the process 2 is executed so that the condition branching is established. On the contrary, if B=C is established, the instruction pointer 504 is shifted by one step increment. As the result, the process 1 is executed so that the condition branching is not established.

Namely, by executing the above-described procedure, the process flow shown in FIG. 10 is realized.

In such a manner, according to the conventional parallel arithmetic operation section, a plurality of condition branching instructions are successively executed by one computing unit 502, so that it is necessary to discriminate whether or not each condition is established. Therefore, while the computing unit 502 executes the condition branching instruction, these computing units 501 to 502 can not be used for the original purpose of signal processing, moreover, the rest computing units can not execute anything for the while, either.

As explained above, in spite of including a plurality of computing units, the conventional parallel operation section requires extremely much time to execute programs containing a plurality of condition branches.

By the way, as another feature of the image signal handled in the conventional image signal processing DSP, the image signal is regarded as a two-dimensional signal in the X and Y directions on the screen when the corresponding picture image is fixed, but the signal is regarded as a three-dimensional signal concerning the X, Y and time directions when the corresponding picture image is moved. Accordingly, with respect to the image signal, there are concepts on a signal at the edge of the screen and another at the other portions thereof.

Accordingly, in case of processing the image signal having such a feature, the process at the edge of the screen sometimes differs from that at an internal portion thereof. For example, in a certain picture image, the image signal process differs at respective positions, such as the first line, the first column, the final line, the final column, the left upper edge, the right upper edge, the left lower edge, the right lower edge, and the other internal portions.

Namely, in a typical processing method using the conventional DSP concerning, e.g., a screen having a size of n picture elements in the horizontal direction and m lines in the vertical direction as-shown in FIG. 12, the image process is divided into:

a process A to be executed on the first row 9-1 except both edge columns;

a process B to be executed on the first column 9-2 except both edge lines;

a process C to be executed on the m-th line 9-3 except both edge columns;

a process D to be executed on the n-th column 9-4 except both edge lines;

a process E to be executed on the first line and the first column 9-5;

a process F to be executed on the first line and the n-th column 9-6;

a process G to be executed on the m-th line and the first column 9-7;

a process H to be executed on the m-th line and the n-th column 9-8; and a process I to be executed on the internal part 9-9 except the above portions.

Namely, in this case, the image process over all of the screen is carried out by executing:

(1) the process E once;

(2) the process A (n−2) times;

(3) the process F once;

(4) a cycle, (m−2) times, of executing:
 the process B once,
 the process I (n−2) times, and
 the process D once;

(5) the process G once;

(6) the process C (n−2) times; and (7) the process H once.

Accordingly, in the conventional DSP, even in case of such a simple picture-image process, it is necessary to exactly count the number of times of execution and to correctly control the order.

Moreover, there is often another image process method in which the screen is divided as shown in FIG. 13, and the image process is changed in each divided area. In such a case, the process is usually divided into:

a process A to be executed on an area 10-1;

a process B to be executed on an area 10-2;

a process C to be executed on an area 10-3; and a process D to be executed on an area 10-4.

In this case, the image process over all of the screen is carried out by executing:

a cycle, j times, of executing:
the process A i times, and
the process B (n−1) times; and
a cycle, (m−j) times, of executing:
the process C i times, and
the process D (n−1) times.

In order to realize such a process, there is a known method in which a loop counter circuit is prepared, and the number of times of the process and its order are set in advance, so as to directly execute the above-described procedure.

However, in such a method for the realization, it is necessary to correctly obtain in advance the order of the process and the number of times thereof. Therefore, when the procedure is complex, it takes an extremely long time to prepare the procedure. Moreover, in such a method, a complicated loop counter circuit is required, so that the amount of hardwares is greatly increased.

Moreover, as another method of realizing the above-mentioned procedure, there is a method in which is used conditional jump technology in which is defined an objective condition as a comparison result between each address on the image memory generated from DSP and a predetermined set value. Usually, the DSP for processing picture-image signals comprises an address generation unit (AGU) for calculating each address-on an image memory in which picture-image signals are contained, and an execution unit (EU) for carrying out an arithmetic operation on each picture-image signal read out from the image memory. Moreover, the construction is reported in the literatures "A. Kanuma et al., 'A 200 MHz 32 b Pipelined CMOS Image Processor', Digest of ISSCC, pp. 102, Feb. 1986" and "T. Murakami et al., 'A DSP Architectural Design for Low Bit-Rate Motion Video Codec', IEEE, Transactions on CAS, Vol. 36, No. 10, Oct. 1989."

In the DSP having such construction for processing picture-image signals, the process method based on the conditional jump technology, in case of FIG. 13 for example, is realized by the steps of:
comparing set values i, j, m, n respectively set on the first stage with current addresses (x, y) generated from the AGU by a computing unit in the EU every time the addresses are generated from AGU, then
executing, based on the comparison result,
the process A when (x address≦j) and (y address≦i);
the process B when (x address≦j) and (y address>i);
the process C when (x address>j) and (y address ≦i); or
the process D when (x address>j) and (y address>i).

However, in such a method, it is necessary to carry out the comparison between these set values and the addresses from the AGU on every address generation by the computing unit in the EU for executing the conditional jump. Therefore, in the period when the comparison process is executed, it is not possible to process data directly concerning the picture image, so that the process efficiency is drastically degraded.

As explained above, in the DSP for processing picture-image signals, in case of executing the image process in which the process method is changed in accordance with positions on the screen, the procedure is very complicated so that the preparation of the procedure requires extremely much trouble. Moreover, it takes much time to execute or control of the procedure, so that the process efficiency in the original image process is drastically lowered.

Moreover, as still another feature of the conventional DSP for processing picture-image signals, the operation section is so constructed as to carry out arithmetic operations for obtaining sums of products.

FIG. 14 shows a typical example of a circuit for the arithmetic operation on sums of products. As shown in the same drawing, this circuit comprises a multiplier 601, an adder 602 and registers 603 to 606.

In case of carrying out the arithmetic operation for obtaining a sum of products, multiplications are carried out at the multiplier 601, then the multiplication results are accumulated at the adder 602 so as to obtain a sum of products $\Sigma a_i.b_i$. Incidentally, in FIG. 14, the register 605 serves as a pipeline between the multiplier 601 and the adder 602.

Generally, when the input bit width of the multiplier 601 is m, the bit number of the multiplication result becomes 2 m. Accordingly, to keep the accuracy of the multiplier 601 as it is, the input bit width of the adder 602 is also set at 2 m bits.

FIG. 15 shows construction of an arithmetic operation section which is generally used for the DSP. The operation section comprises a multiplier 621, an adder 622 and registers 623, 624. Moreover, the multiplier 621 and the adder 622 are independently connected to input buses 625, 626 and an output bus 627 so as to operate these two units independently. In this case, when the bit width of these buses 625 to 627 is m, the bit number of the multiplication result is 2 m like the case shown in FIG. 14.

Incidentally, when the multiplier 621 and the adder 622 are connected in series to perform the calculation on sums of products, to keep the operational accuracy of the multiplier 621, the input bit width of the adder 622 is also set at 2 m. However, when the adder 622 is operated independently, since the bit width of the buses 625 to 627 is m, it is enough to set the input bit width of the adder 622 at m. Accordingly, when the input bit width of the adder 622 is set at 2 m on the assumption of the operation for calculating sums of products, the rest m bits remain unused in another case than the operation on sums of products.

On the other hand, in case of the image process, calculation of absolute values of respective differences is carried often out for the purpose of vector detection on movement, pattern matching or the like. FIGS. 16a to 16c respectively show typical examples of methods for the calculation of absolute values of differences.

In these cases, assume that input values a, b are used to obtain $|a-b|$.

First, in a method shown in FIG. 16a, the subtraction a−b is calculated at a subtracter 641 in the first stage. If the subtraction result is negative, the sign of the subtraction result is inverted at a sign inversion circuit 642. Then, the inverted value is selected by and outputted from a selector 643.

Incidentally, since the sign inversion circuit 642 performs a process in which all bits are inverted and 1 is added to each inversion result, the process requires almost the same process time as that required for the corresponding additional operation. Accordingly, in such a method, it is very difficult to achieve a high-speed operation.

On the other hand, in a method shown in FIG. 16b, the subtraction a−b is calculated at a subtracter 644. If the subtraction result is negative, the subtrahend and the minuend respectively kept in registers 645, 646 are exchanged. Then, the difference b−a is calculated at the same subtracter 644. Namely, according to this method, 2 clocks are required when the first subtraction result is negative. Accordingly, the number of clocks to be required is changed by the operational result. Therefore, also in this method, it is very difficult to elevate the operational speed.

Moreover, in a method shown in FIG. 16c, the subtraction a−b and b−a are respectively calculated by two subtracters 647, 648 in parallel. Then, the positive one is selected from the subtraction results by a selector 649, thereafter the selected value is outputted. Accordingly, it becomes possible to realize a high-speed operation by this method. However, in such a method, the circuit scale must be twice as large as usual.

Accordingly, in the operation section of the conventional DSP, when the input bit width is so set as to keep the accuracy of the multiplier on the calculation for obtaining sums of products, about a half of the circuit construction remains unused on other operations than that for sums of products. While, when the adder is so constructed as to perform high-speed operations for obtaining absolute values of respective differences, about a half of the circuit remains unused on the other calculation.

Next, an overflow process circuit for performing an overflow process peculiar to the picture-image process in the operation section of the conventional DSP for picture-image signal process is explained.

Generally, a conventional overflow process circuit can perform processes on additions, subtractions only once and accumulative additions to be subjected to the overflow process in a calculation carried out, or on accumulative subtractions when an overflowing number is a minuend.

As overflow process methods according to the overflow process circuit, there are a method of extending the bit number by one bit in the higher direction, and another method of extending the bit number sufficiently. In the method of extending the bit number by one bit in the higher direction, an arithmetic operation is carried out after extending the bit number by one bit in the higher direction. Then, the overflow is detected to be positive when the most highest two bits of the operational result are designated by 01, negative when 10, or is not detected when 11 or 00. In case that the overflow is detected, the output is replaced by the maximum code of the same polarity as of the original operation result.

However, in case of an accumulative operation, when the final result does not originally overflow, the result becomes an error. The reason is that the overflow in the accumulative operation is caused only when the number of times of exceeding the positive maximum value is different from the number of times of exceeding the negative maximum value. Therefore, the correction is carried only when the overflow is really generated because the operation result exceeds these numbers of times.

FIG. 17 shows a circuit for performing the overflow process based on the extension by one bit in the higher direction. Moreover, a procedure of overflow process in an arithmetic operation on two n-bit values is explained with reference to the same drawing.

First, data a 32 and a 33 selected by a selector 660 are respectively extended by one bit in the higher direction at a bit extension circuit 661. Then, the extended data are processed by an adder 662, and the operation result and the result obtained by clamping the operation result at an overflow process circuit 664 (which is explained in detail hereinafter) are inputted to a selector 665. At the same time, the highest one bit of the operation result from the adder 662 is deleted at a bit deleting circuit 666, then the operation result is held in a register 667. Here, clamping means a process of replacing a data by a maximum value or a minimum value which can be expressed by the bit length of the data. Incidentally, both of these data a32, a33 are not overflowing.

Then, in the second operation or after, the same process is carried out by using data a31 and a33.

The necessity of the clamping is decided by a signal 663. When the clamping is necessary, the operation result clamped at the overflow process circuit 664 is selected by and outputted through the selector 665. While, when not necessary, the operation result from the adder 662 is selected by and outputted through the selector 665.

Next, the overflow process circuit 664 is explained in detail with reference to FIG. 18. Incidentally, the overflow process circuit 664 performs judgement of overflow from the highest two bits in the operation result.

In the same drawing, when an operation result is inputted to the overflow process circuit 664, an overflow judgement circuit 680 judges that the overflow is positive when the highest two bits of the inputted operation result are designated by 01, negative when 10, or not existent when 00 or 11. When the overflow is positive, a register 681 in which 1 is held in advance is selected by a selector 684. On the other hand, when negative, a register 682 in which −1 is held in advance is selected. Moreover, when not existent, a register 683 in which 0 is held is selected. Then, the selected value and a value held in a register 685 are subjected to an additional operation at an adder 686. Incidentally, in case of an accumulative operation, the additional operation is further repeated.

By the repetition of the additional operation, the value in the register 685 is counted up in case of the positive overflow, while counted down in case of the negative overflow. Namely, in the register 685 is held the difference between the number of times of the positive overflow and that of the negative overflow. Accordingly, whether the overflow of the accumulative operation is positive or negative can be judged from the sign of the content of the register 685. Hereinafter, the register 685 is called overflow counter.

Moreover, the output of the adder 686 is inputted to a clamp judgement circuit 687. When the output is positive, a register 688 in which a positive maximum value is held is selected by and outputted from a selector 691. On the other hand, when negative, a register 689 in which a negative maximum value is held is selected and outputted. Moreover, when 0, an input value 690 of the overflow process circuit 664 is selected and outputted.

However, such an overflow process is established based on continuation of additional operations. Thus, in case of a subtraction using an overflowing value as a subtrahend, though the judgement on the sign of the overflow is completed, it is impossible to correctly carry out the process because the sign of the number of times of the overflow in the register 685 is not inverted.

Moreover, as the overflow counter value to be held in the register 685, it is impossible to select such a value that is always positive or 0 during the process. Therefore, it is not possible to correctly carry out an accumulative overflow process on absolute value operations.

However, in the preprocess such as filtering, affine transformation or fast Fourier transformation, or in the postprocess such as image recognition, histogram process or labelling, it is necessary to carry out an operation in which an overflowing value is used as a subtrahend, or an absolute value operation. Accordingly, such an overflow process circuit that can perform such operations has been desired so far.

As stated above, in the overflow process circuit for carrying out the process based on the one-bit extension in the higher direction, it is not possible to correctly carry out subtractions in which is an overflowing value is used as a subtrahend, or absolute-value operations on an overflowing value.

On the other hand, in the conventional DSP for processing picture-image signals, a plurality of registers are incorporated to perform a high-speed process. Moreover, with elevation of the LSI's integration, it has been possible to incorporate a register file in which are contained several to several tens of registers. In such a register file, various addressing modes like a memory are prepared as designating means of registers. As typical examples of such addressing modes, direct addressing and indirect addressing can be mentioned.

In the direct addressing mode, a specific field in an instruction directly designates an address of the register file. While, in the indirect addressing mode, a data value at an address designated in an instruction is used as an execution address. In a DSP adopting the Harvard architecture, since data memories and instruction memories are separately provided, an exclusive or general register not connected to a data bus is designated as an address register in an instruction, and the content designates an address of the register file.

Next, a method of selecting the addressing mode in the conventional DSP is explained with reference to FIG. 19.

The direct addressing mode or the indirect addressing mode is selected in accordance with an addressing designation field 943 designated in an instruction register 941. If the direct addressing mode is selected, an address signal 955 outputted from an address field 945 is selected in accordance with an addressing designation signal 953 outputted from the addressing designation field 943. If the indirect addressing mode is selected, an address signal 957 outputted from an exclusive or general address register 947 is selected. In accordance with the selected address signal, a selector 951 designates a register in a register file 949 corresponding to the address. Incidentally, the register file 949 gives/receives a data to/from a data bus 913.

Thus, in such a conventional DSP, as the addressing modes of the register file 949, there are only two addressing modes, that is, the direct and indirect addressing modes. Therefore, it is not possible to designate contents of a specific address in the register file 949 memorizing data on the data bus 913. Otherwise, if possible, the execution time becomes markely long.

Namely, in the direct addressing mode, an address value is designated in an Instruction, and it is not possible to designate contents of a register having a designated address. Therefore, it is impossible to designate contents of a register as an address. Moreover, in the conventional DSP adopting the Harvard architecture, even in the indirect addressing mode, it is also impossible to designate contents of a data as an address when an exclusive register not connected to the data bus 913 is used as the address register 947. Also, in case that a general register is used as the address register 947, since data in the register must be once transferred to the address register 947, the execution time becomes extremely long.

On the other hand, as one application of the picture-image processing technology, there is a histogram process on the density distribution of the picture image. Next, this process is explained with reference to FIGS. 20 and 21.

In FIG. 20a, an address to be accessed (designated by an arrow of a solid line) is generated from an AGU (address generation unit) 923 and sent through an address bus 935 to an external memory (hereinafter called picture-image memory) 933 in which picture-image data to be processed are memorized. Then, a data (designated by an arrow of a dotted line) of the accessed picture-image memory 933 for showing density of the picture image is inputted to the AGU 923 through a data bus 913. Thereafter, as shown in FIG. 20b, an address to be accessed is generated from the AGU and given to an external memory (hereinafter called histogram memory) 959 for preparing a histogram from the data. Then, as shown in FIG. 21a, a value in the histogram memory 959 corresponding to the address given from the AGU 923 is transferred to an EU (execution unit) 961. Thereafter, as shown in FIG. 21b, the transferred histogram data is increased by 1 for increment in the EU 961, then the increased value is written at the same address on the histogram memory 959.

Incidentally, in the respective processes shown in FIGS. 20b to 21b, since the same address of the histogram memory 959 is accessed, it is impossible to carry out the pipline operation in the respective construction of the same drawings. Therefore, the number of steps required for the process is quite increased. Moreover, since the histogram memory 959 is an external memory in the conventional histogram process, the access time is very restricted. Furthermore, it is necessary to carry out increment on the histogram data by using the EU 961.

Accordingly, in the conventional register file, since it is not possible to designate a data memorized in the exterbnal memory as an address, it takes quite much time to access the register file. Moreover, since it is not possible to carry out the pipeline operation on the histogram process, the number of process steps must be increased, or since no internal memory can be used for the process, the access time is very restricted. Furthermore, it is necessary to carry out data increment after the data is once transferred to the EU. Thus, the execution time of the histogram process must be very long.

SUMMARY OF THE INVENTION

The present invention was made in the light of the above problems of the conventional technology, and therefore, it is an object thereof to provide a digital signal processor for executing all of the addressing modes related to the picture-image signal process only by describing instructions of a small bit number in the AGU control field.

It is another object of the present invention to provide a digital signal processor having an arithmetic operation section which can execute a plurality of conditional branch instructions by a plurality of calculating units in parallel, and improve the operational processability even on executing a program including a plurality of conditional branches.

It is still another object of the present invention to provide a digital signal processor having an arithmetic operation section which can keep the accuracy of multiplication on calculating sums of products without generating any unused circuit portion, and perform a high-speed arithmetic operation on absolute values of respective differences.

It is still another object of the present invention to provide a digital signal processor having a register file which can decrease the access time to the register file by designating a data on a data bus as an address.

To achieve the above objects, a feature of the present invention is a digital signal processor which comprises an address generation unit for generating addresses in all addressing modes used in the picture-image process, setting means for setting an initial value necessary for the address generation to the address generating unit in advance, instruction designating means for designating execution or stop of the address generation to the address generation unit.

Another feature of the present invention is an address generation unit of a digital signal processor, which comprises memory means for storing the maximum value and the minimum value in the X and Y directions of respective coordinates, first count means for carrying out counting in the respective X and Y directions for successive scan addressing on the screen, second count means for carrying out counting in the respective X and Y directions for addressing on raster scan in a specific area, memory means for storing dimensions in the X and Y directions of the specific area, adjacent point address generation means for generating addresses in the X and Y directions for addressing on accessing points adjacent to a point optionally designated as a central point on the two-dimensional screen, input means for inputting respective address values in the X and Y directions given from the outside, addition means for generating an address which designates respective X and Y coordinates on the screen by carrying out additional calculations with respect to the respective X and Y coodinates by using two of the count means for counting in the X and Y directions for successive scan addressing, the count means for counting in the X and Y directions for addressing on raster scan in the specific area, the adjacent point address generation means for generating addresses in the X and Y directions for addressing on accessing the adjacent points and the input means for inputting respective address values in the X and Y directions, bit reverse means for carrying out variable-width bit reverse, means for carrying out shift and addition of respective address values in the X and Y directions and for generating an address on a picture-image memory, selection means for selecting an addressing mode for selecting an address to be given to the means for generating an address on the picture-image memory, and memory means for storing data in address calculation.

According to the above-described construction, in the address generation unit of the digital signal processor relating to the present invention, the maximum value, minimum value and addressing mode concerning an address are set in advance into an address generating section in accordance with a LOAD instruction as the setting means. Then, based on the set initial values, tile address generation unit generates an address in the set addressing mode. The execution or stop of the address generation is controlled only by 1 bit in an EXEC instruction as the instruction designating means.

Incidentally, the address generation is carried out over all of the following addressing modes.

(1) Addressing mode for raster scan on the two-dimensional screen

This is a successive scan addressing mode in which as shown in FIG. 4, a scan process is carried out on picture elements from one end to the other in the horizontal direction on a two-dimensional screen. Then, when the scan process reaches the other end, it returns horizontally therefrom to the first end for scanning on picture elements arranged lower by one line than those scanned first.

(2) Window raster scan mode

In this mode, a raster scan is carried out in a specific area, for example 3×3 or 5×5 on the screen, then such raster scan is successively carried out over all of the screen. Namely, this is an addressing mode for carrying out raster scan on a specific area, then another area is designated as a next specific area to be successively subjected to the raster scan until all of the screen is scanned. This addressing mode is used for such space filtering that each addressing factor is multiplied with respect to each specific area so as to obtain the sum of products.

(3) neighborhood access mode

In this mode, points, e.g., eight points adjacent to a specific point designated as a central point on a two-dimensional screen are accessed. This mode is used for a tracking process, such as labelling or boundary tracking. In more detail, when an optional central point 0 is designated, eight or four points adjacent to the central point 0 are accessed based on a certain directional property.

(4) Two-dimensional indirect addressing mode

This mode is used indirectly for designating each point on a two-dimensional screen.

(5) One-dimensional addressing mode

This mode is used for successively accessing one-dimensional arrangement of various data other than picture-image data, such as factors to be multiplied by the picture image data.

(6) Addressing mode for generating addresses for FFT (Fast Fourier Transformation)

This is an addressing mode for generating addresses respectively separated from one another by an interval in proportion to an exponent of 2 for accessing data being each pair of butterfly in case of executing FFT.

(7) Direct addressing mode

In this mode, each point on a two-dimensional screen is directly designated.

(8) One-dimensional indirect addressing mode

This mode is used for indirectly designating one-dimensional arrangement of various data other than picture image data.

Moreover, another feature of the present invention is an arithmetic operation section of a digital signal processor, which comprises a plurality of arithmetic operation means for executing a plurality of arithmetic operations at the same time in parallel in accordance with a plurality of conditional branch instructions, a plurality of comparison means corresponding to the respective arithmetic operation means for comparing the operation result obtained by the arithmetic operation means with branch conditions of the conditional branch instructions and for discriminating whether the operation result satisfies the branch conditions, logic operation means for carrying out a logic operation concerning the comparison results obtained by the plurality of comparison means based on each relation between the plurality of conditional branch instructions, and selection means for selecting each address at which each instruction to be executed after the plurality of conditional branch instructions in accordance with the operation result obtained by the logic operation means.

According to the above-described construction, in the digital signal processor of the present invention, the plurality of arithmetic operation sections execute a plurality of arithmetic operations at the same time in parallel in accordance with a plurality of conditional branch instructions. Then, the operation results obtained by these operation sections are outputted to flag registers respectively provided in response to the plurality of operation sections.

In each of these flag registers, the bit contents are rewritten into contents corresponding to each operation result. Then, the rewritten contents are outputted to each comparison circuit provided in response to each operation section like each flag register.

Then, each comparison circuit compares the bit contents outputted from each flag register with each branch condition of conditional branch instructions to be given from an instruction memory. Namely, in the comparison circuit, whether or not the operation result obtained by each arithmetic operation section satisfies each branch condition is discriminated. Then, from the plurality of comparison circuits, the comparison results are respectively outputted to a logic circuit.

The logic circuit carries out a logic operation on the plurality of comparison results. Incidentally, the logic operation is carried out in response to each relation between the plurality of conditional branch instructions. Namely, typical examples of the logic operation are the logical sum operation, logical product operation and the like. Moreover, from the logic circuit, the operation result is outputted to a selection circuit.

Then, in accordance with the operation result, the selection circuit selects an address in the instruction memory in which instructions to be executed after the plurality of conditional branch instructions are set.

Moreover, another feature of the present invention is an arithmetic operation section of a digital signal processor, which comprises a multiplier of m-bit input and 2 m-bit output, and two arithmetic logic operation units of m-bit input and m-bit output to the multiplier.

In the above-described construction of the operation section according to the present invention, when a binary operation for obtaining a sum of products consisting of m bits is carried out, data consisting of m bits are respectively inputted to two input ports of the multiplier. Then, the higher m bits of 2 m bits of the multiplication result outputted from the multiplier are inputted for addition to the first arithmetic logic operation unit, while the lower m bits are inputted for addition to the second arithmetic logic operation unit. Thereafter, the respective m-bit addition results outputted from the two arithmetic logic operation units are subjected to bit connection to be a 2 m-bit value. Then, the higher m bits of the 2 m-bit value are inputted again for addition to the first arithmetic logic operation unit, while the lower m bits are inputted for addition to the second logic operation unit.

In such a manner, by carrying out accumulation of the higher m bits at the first arithmetic logic operation unit as well as accumulation of the lower m bits at the second logic operation unit, the arithmetic operation to obtain a sum of products can be carried out without deteriorating the multiplication accuracy in the operation result.

Moreover, when another calculation for obtaining an absolute value on a difference between two m-bit values, the subtraction of these two values is carried out at the first arithmetic logic operation unit. On the other hand, the second arithmetic logic operation unit carries out another subtraction in which are replaced the subtrahend and the minuend on the subtraction by the first arithmetic logic operation unit. Then, the correct one of these subtraction results is selected to complete the absolute-value calculation.

Moreover, another feature of the present invention is a register file of a digital signal processor, which comprises a group of registers for respectively memorizing data, and selection means for selecting a value on a data bus as an address for designating one register in the group of registers.

In the above-described construction, contents on the data bus are selected as an address by the selection means. Then, a register in the register file to be designated by the selected address is accessed.

Still another feature of the present invention is a register file of a digital signal processor, which comprises a group of registers for memorizing data, and addition means for adding 1 to a value of a register whose address is designated in the group of registers, and for writing the added value at the same register.

In the above-described construction, the internal register file is used as a histogram memory, and the increment on histogram data is executed in the histogram memory.

These and other objects, features and advantages of the present invention will be more apparent from the following description of a preferred embodiment, taken in conjunction with the accompanying drawings.

BRIEF DESCRIPTION OF THE DRAWINGS

FIG. 28 is a diagram to explain an address generation method with respect to input and output data based on a time thinning-out FFT on eight points in the AGU according to the present invention;

FIG. 29 is a diagram to explain an address generation method with respect to input and output data based on a frequency thinning-out FFT on eight points in the AGU according to the present invention;

FIG. 31 is a diagram to show an address generation method concerning factors related to the time thinning-out FFT on eight points, according to the present invention;

FIG. 32 is a diagram to show an address generation method concerning factors related to the frequency thinning-out FFT on eight points, according to the present invention;

FIG. 37 Is a time chart to explain the operation of the address generating circuit of the present invention shown in FIG. 36;

FIGS. 47, 50 and 51 are diagrams to respectively show important parts of the embodiment shown in FIG. 46;

FIGS. 48(a)–48(e) and 49(a)–49(i) are diagrams to show relations between respective operation of the important parts and the screen;

FIG. 55 is a diagram to show relations between respective codes and constructional elements in respective input fields in the processor shown in FIG. 54;

FIG. 56 is a diagram to explain signal transmission in the processor according to the present invention;

FIGS. 59 and 60 respectively show construction of instruction fields for the DSP according to the present invention;

FIG. 61 shows an example of assembler programs to be described when the present invention is adopted;

FIG. 68b is a block diagram to explain the operation of arithmetic operations for obtaining absolute values of respective differences according to the arithmetic operation section shown in FIG. 62;

DETAILED DESCRIPTION OF THE EMBODIMENTS

Figure 22:
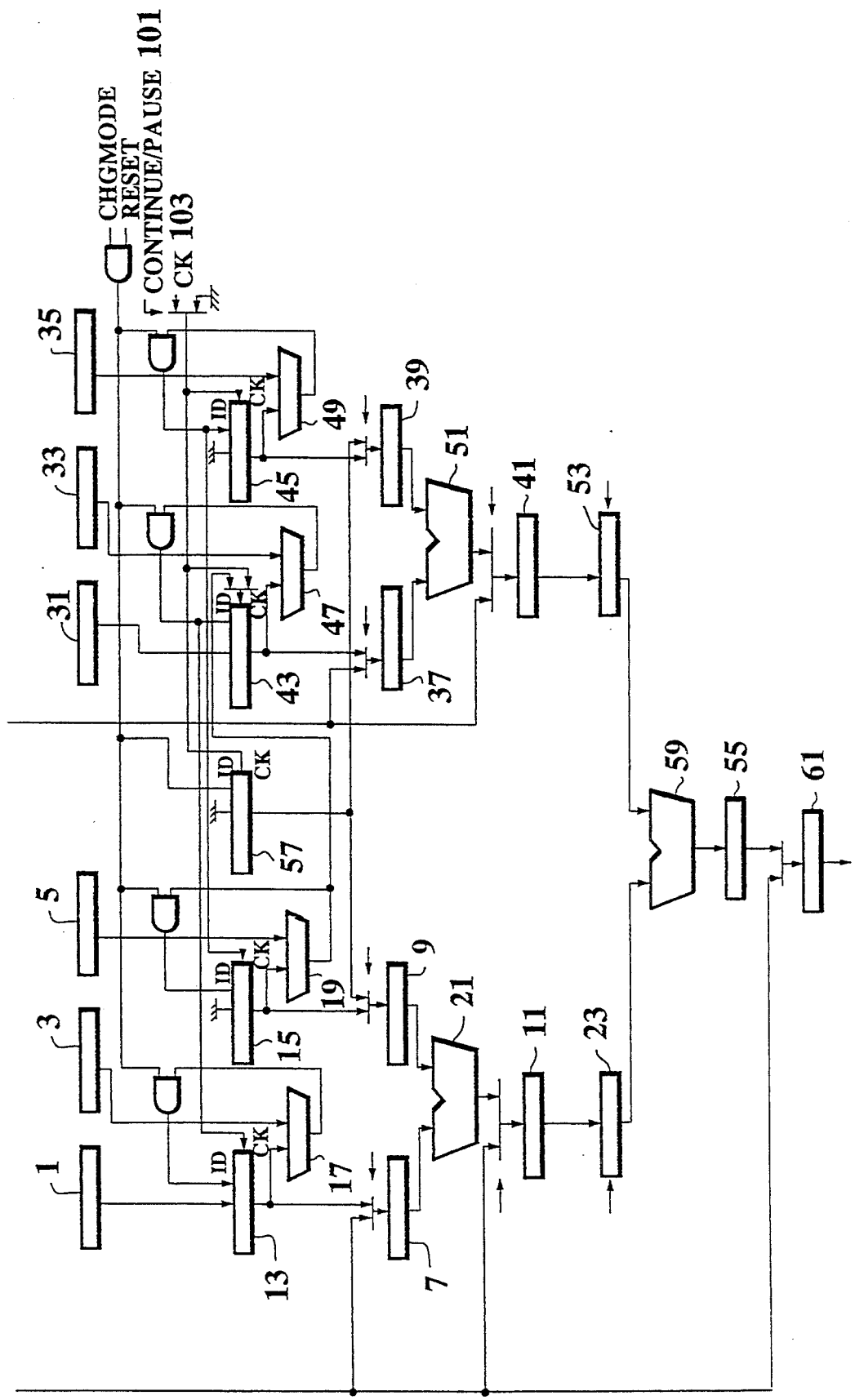
FIG. 22 is a block diagram to show construction of an embodiment of the AGU provided in a picture-image digital signal processor according to the present invention.

FIG. 22 is a block diagram to show construction of an embodiment related to an address generation unit (AGU) provided in a picture-image digital signal processor according to the present invention.

In the same drawing, the AGU is divided into a part for carrying out addressing in the X direction and another part for carrying out addressing in the Y direction.

Moreover, the part for the addressing in the X direction comprises registers 1 to 11, counters 13, 15, comparators 17, 19, an adder 21 and a barrel shifter 23.

While, the other part for the addressing in the Y direction comprises registers 31 to 41, counters 43, 45, comparators 47, 49, an adder 51, a barrel shifter 53 and a bit reverse circuit 55.

The registers 1, 31 set the minimum values of addresses in the respective directions as initial values.

The registers 3, 33 set the maximum values of addresses in the respective direction as initial values, and the registers 5, 35 set the maximum values of the respective directions in a specific area.

Moreover the counters 13, 43 increase addresses in the X and Y directions, so as to carry out scanning in the respective directions.

The counters 15, 45 relate to scanning of a specific area in the respective directions in the same manner as the counters 13, 43.

The comparators 17, 19, 47, 49 respectively compare the addresses increased by the counters 13, 15, 43, 45 with the values initially set by the registers 3, 5, 33, 35.

The registers 7, 37 respectively hold addresses generated by the counters 13, 43 or addresses generated by an external circuit (not shown).

The adjacent access decoder 57 determines each distance from a point adjacent to a central point to the central point.

The registers 9, 39 respectively hold addresses generated by the counters 15, 45 or each distance determined by the adjacent access decoder. Moreover, by these registers 9, 39, the input timings of the addresses generated by the counters 13, 43 and 15, 45 or the respective distances determined by the adjacent access decoder 57 to the adders 21, 51 are synchronized with one another. In such construction, the pipeline process is established.

Moreover, the adders 21, 51 respectively add the addresses held in the registers 7, 9 or 37, 39.

The registers 11, 41 respectively hold addition results of the adders 21, 51 or contents of an index register or base register designated by an external circuit.

The barrel shifters 23, 53 respectively shift addresses held in the register 11 by the bit number which is initially set.

The adder 59 adds the respective addresses in the X and Y directions generated by the above-described construction, and outputs each addition result as a physical address.

Moreover, the bit reverse circuit 55 carries out bit reverse of the addition result of the adder 59.

The register 61 holds the physical address outputted from the adder 59 or an address directly transferred from an external circuit.

Furthermore, setting of each addressing mode, each initial value of the registers 1 to 5, and 31 to 35, or each shift amount by the barrel shifters 23, 53 is carried out by each setting instruction (hereinafter called LOAD instruction). Besides, each execution or stop of addressing is carried out by each executing instruction (hereinafter called EXEC instruction).

Figure 23:
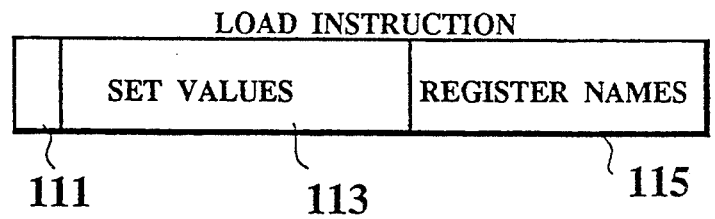
FIGS. 23 and 24 respectively show construction of a LOAD instruction and an EXEC instruction used in the picture-image signal processor of the present invention shown in FIG. 22.
Figure 24:
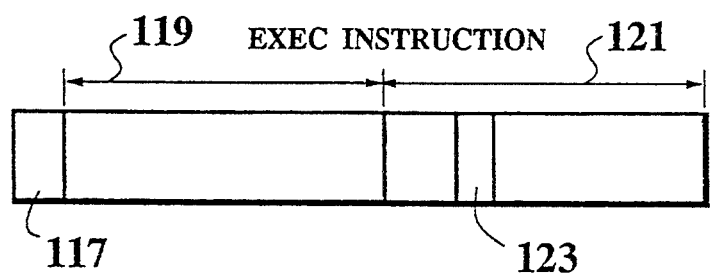

FIG. 23 shows a format of the LOAD instruction, and FIG. 24 shows a format of the EXEC instruction.

The LOAD instruction shown in FIG. 23 comprises fields 111, 113, 115. In the first field 111 (MSB) is described information showing that this area contains the LOAD instruction. While, in the field 113 shown on the right side of the field 111 are described addressing modes, initial values and bit shift amounts to be loaded respectively. Moreover, in the field 115 are described names of registers to which the initial values or bit shift amounts are to be loaded.

On the other hand, the EXEC instruction shown in FIG. 24 comprises a field 117, an arithmetic operation section control field 119, and an AGU control field 121. In the first 1-bit field 117 (MSB) is described information that this area contains the EXEC instruction. While, in the field 119 shown on the right side of the field 117 is described an instruction on the data arithmetic operation.

Moreover, in the AGU control field 121 is provided a Continue/Pause bit 123, and the execution/stop of addressing is controlled by the contents of the Continue/Pause bit 123. Namely, the content is Continue when a data is taken from an external memory, while Pause when a data is being processed by the arithmetic operation section. Accordingly, during address generation of one addressing mode, Continue and Pause are repeated several times during the generation of address in one addressing mode. In accordance with the contents of the Continue/Pause bit 123, a Continue/Pause signal (designated by 101 in FIG. 22) is inputted to the AGU. Namely, the Continue/Pause signal 101 determines whether or not a clock (designated by CK 103 in FIG. 22) is supplied to the counters 13, 15, 43, 45.

Incidentally, in the other portion of the AGU control field 121 than the Continue/Pause bit 123, only information of a small bit number for conditional judgement or the like is described.

Next, the operation of the system constructed by the above-mentioned AGU, LOAD instruction and EXEC instruction according to the present invention is explained.

Figure 1:
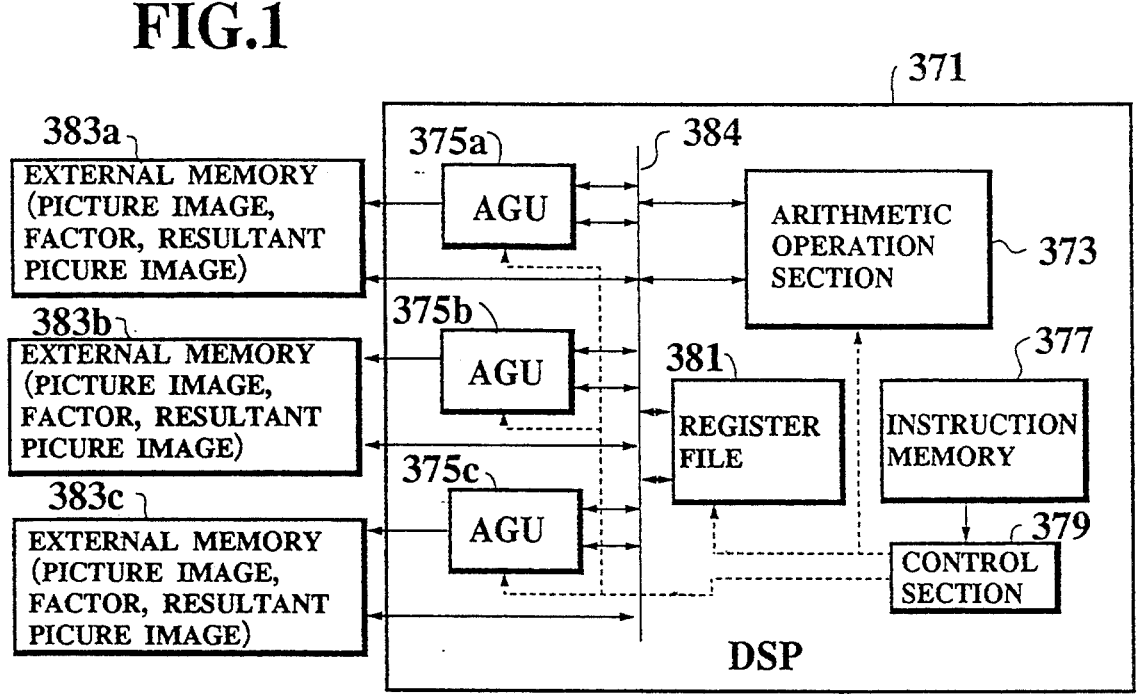
FIG. 1 is a block diagram to show construction of a general picture-image digital signal processor.
Figure 2:
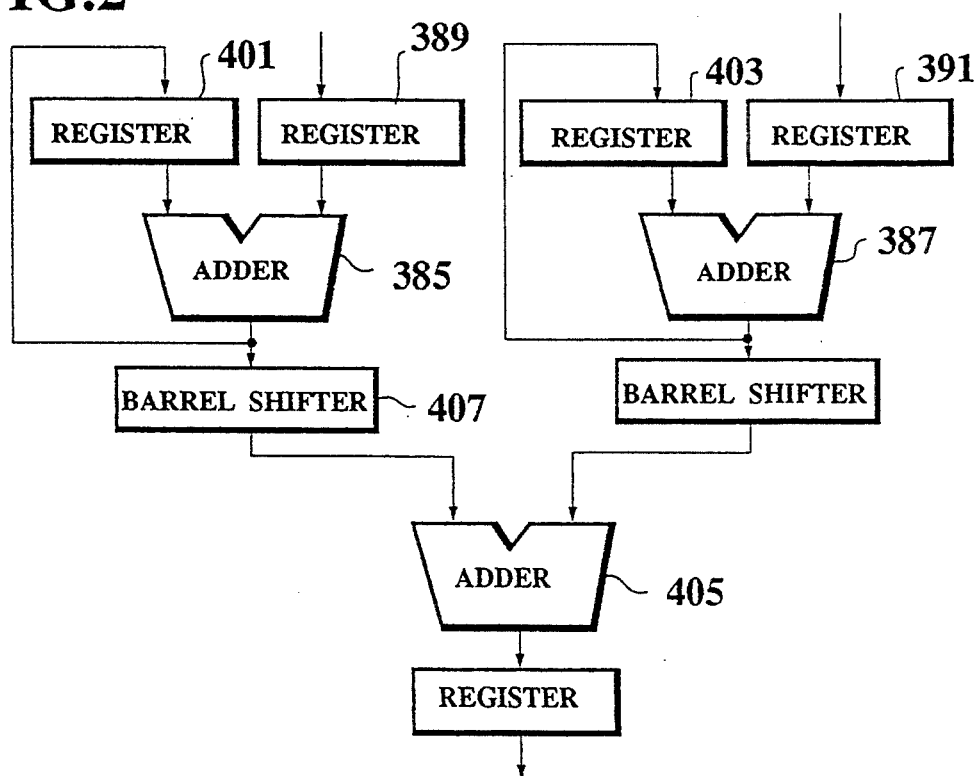
FIG. 2 is a block diagram to show construction of a conventional address generation unit (AGU)
Figure 3:
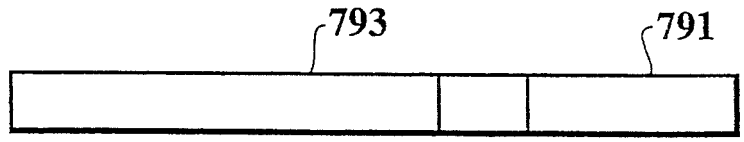
FIG. 3 is a schematic diagram of an instruction field generally used in the AGU shown in FIG. 2.
Figure 4:
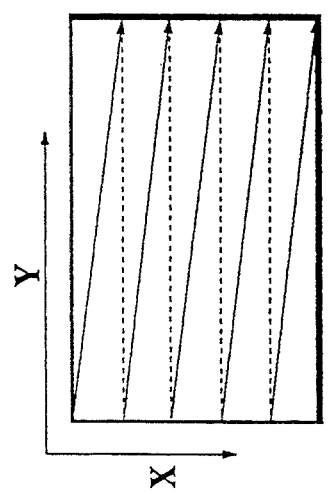
FIG. 4 is a diagram to partly and schematically explain an addressing mode.

(1) First, an addressing mode for carrying out the raster scan on a two-dimensional screen as shown in FIG. 4 is explained.

In this case, the scan in the horizontal direction or Y direction is carried out by the counter 43. The counter 43 is counted up every time the clock 103 is inputted. Then, an address generated by the counter 43 is compared with the maximum value in the Y direction initially set in advance in the register 33. If the address generated by the counter 43 exceeds the maximum value in the Y direction, the minimum value in the Y direction initially set in advance in the register 31 is set at the counter 43. At the same time, an address of the X direction in the counter 13 is subjected to increment.

In the counter 13, the scan in the vertical direction or X direction is carried out. In this case, an address generated by the counter 13 is compared with the maximum value set in advance in the register 3 by the comparator 17. If the address generated by the counter 13 exceeds the maximum value in the X direction, the minimum value initially set in advance in the register 31 is respectively set at the counters 43 and 13.

Then, the addresses respectively generated by the counters 43, 13 are shifted by respective bit numbers initially set in advance in the barrel shifters 53, 23. Moreover, the shifted addresses of the X and Y directions are respectively subjected to addition at the adder 59, then outputted as a physical address.

Figure 25:
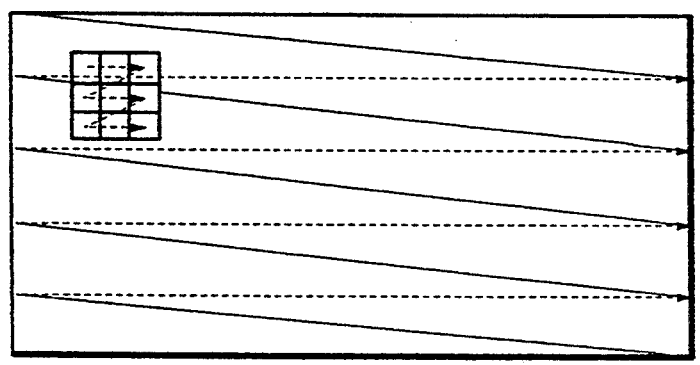
FIGS. 25 and 26 are diagrams to schematically explain a part of an addressing mode.

(2) Next, another addressing mode for carrying out raster scan over all of the screen by successive raster scan on a local area is explained with reference to FIG. 25.

In this case, scan in,the Y and X directions on a specific area is carried out by the counters 45, 15, while the other scan in the Y and X direction over all of the screen is carried out by the counters 43, 13. Incidentally, the counter 45 is counted up every time the clock 103 is inputted.

Moreover, an address generated by the counter 45 is compared with the maximum value of the Y direction on the specific area initially set in advance in the register 35 by the comparator 49. If the address generated by the counter 45 exceeds the maximum value of the Y direction on the specific area, 0 is set at the counter 45. At the same time, the address of the X direction on the specific area in the counter 15 is subjected to increment.

Then, the address generated by the counter 15 is compared with the maximum value of the X direction on the specific area initially set in advance in the register 5 by the comparator 19. If the address generated by the counter 15 exceeds the maximum value of the X direction on the specific area, 0 is respectively set at the counters 45, 15. At the same time, addresses of the Y direction over all of the screen in the counter 43 are subjected to increment.

Then, the following process with respect to the counter 43 is carried out in the same manner as described in the case (1).

Figure 26:
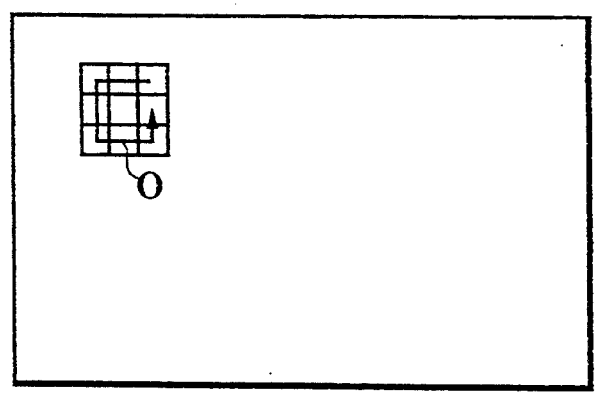

(3) In an addressing mode for accessing points, for example, eight point adjacent to a point designated as a central point 0 on the screen as shown in FIG. 26, first, the X and Y coordinates of the central point 0 are respectively set in the registers 7, 37. In this case, the coordinates of the central point 0 are directly or indirectly designated by an external circuit, or generated by the counters 43 and 13.

On the other hand, from the adjacent access decoder 57 is generated each relative distance from the central point 0.

Then, the coordinates of the central point 0 respectively held in the registers 7, 37 and the relative distance generated by the adjacent access decoder 57 are respectively added by the adders 21, 51. In such a manner, the X and Y coordinates of each adjacent point are calculated.

Thereafter, the calculated X and Y coodinates of each adjacent point are shifted by respective bit numbers initially set in advance in the respective barrel shifters 53, 23. Moreover, the shifted X and Y coordinates are respectively subjected to addition by the adder 59, then outputted as a physical address.

(4) In case of an indirect addressing mode with respect to a point on a two-dimensional screen, designated contents of the index register outside the AGU are directly transferred to the register 41 by an external circuit, while contents of the base register are directly transferred to the register 11 by an external circuit. Then, these addresses respectively held in the registers 41, 11 are shifted by respective bit numbers by barrel shifters 53, 23, thereafter respectively subjected to additional operations by the adder 59 to be a physical address.

(5) In case of an addressing mode for successively accessing one-dimensional arrangement, addresses successively generated by the counter 43 are held in the register 37. While, designated contents of the index register outside the AGU are directly transferred to the register 11 by an external circuit. Then, the addresses respectively held in the registers 37, 11 are subjected to additional operations by the adder 59, and outputted therefrom as each physical address.

(6) Next, an addressing:mode for generating addresses for FFT (Fast Fourier Transform) is explained. In this case, first, an increment process for every interval between factors of butterfly data depending on the point number and stage number is carried out by the counters 45, 43, 15. Then, the addresses given increment through the counters 45, 43 are respectively subjected to additional processes by the adder 51. Moreover, the address given increment through the counter 15 and the other address subjected to the bit reverse process are added by the adder 59. Thereafter, the resultant address is further subjected to the bit reverse process by the bit reverse circuit 55 to be a physical address. Incidentally, in this case, the bit shift by means of the barrel shifters 53, 23 is sometimes not carried out by the state of algorithm.

(7) Finally, another addressing mode for directly addressing a point on a two-dimensional screen is explained. In this case, an address in the instruction is directly transferred to and outputted from the register 61 by an external circuit.

In such a manner, only by using the AGU, LOAD instruction and the Continue/Pause bit 213 in the AGU control field 121, it is possible to carry out the address generation in all addressing modes used for the picture-image signal process.

Incidentally, the field construction of the LOAD instruction and EXEC instruction is not limited to these embodiments, but is able to be variously modified in accordance with the circuit construction other than the AGU.

Next, another embodiment of the address generation unit (AGU) in the picture-image digital processor according to the present invention is explained.

In the AGU of the former embodiment, when the address for the FFT is generated, a method of accumulatively adding exponents of 2 is used. However, such a method can realize only the one-dimensional FFT. Therefore, for the two-dimensional FFT addressing, the method requires computing units which are not used in the other modes than the two-dimensional FFT, or requires alteration of connection between respective computing units. Accordingly, the device based on this method must be formed in an extremely complex and large structure. Moreover, since it is necessary to change the maximum value of each counter on every stage of the FFT, the control section incorporated in the device must be also formed in a large scale. Accordingly, a further improved AGU for realizing addressing including the two-dimensional FFT without causing the device construction to be complex and large nor elevating the production cost.

Hereinafter, the second embodiment of the AGU is explained.

Figure 27:
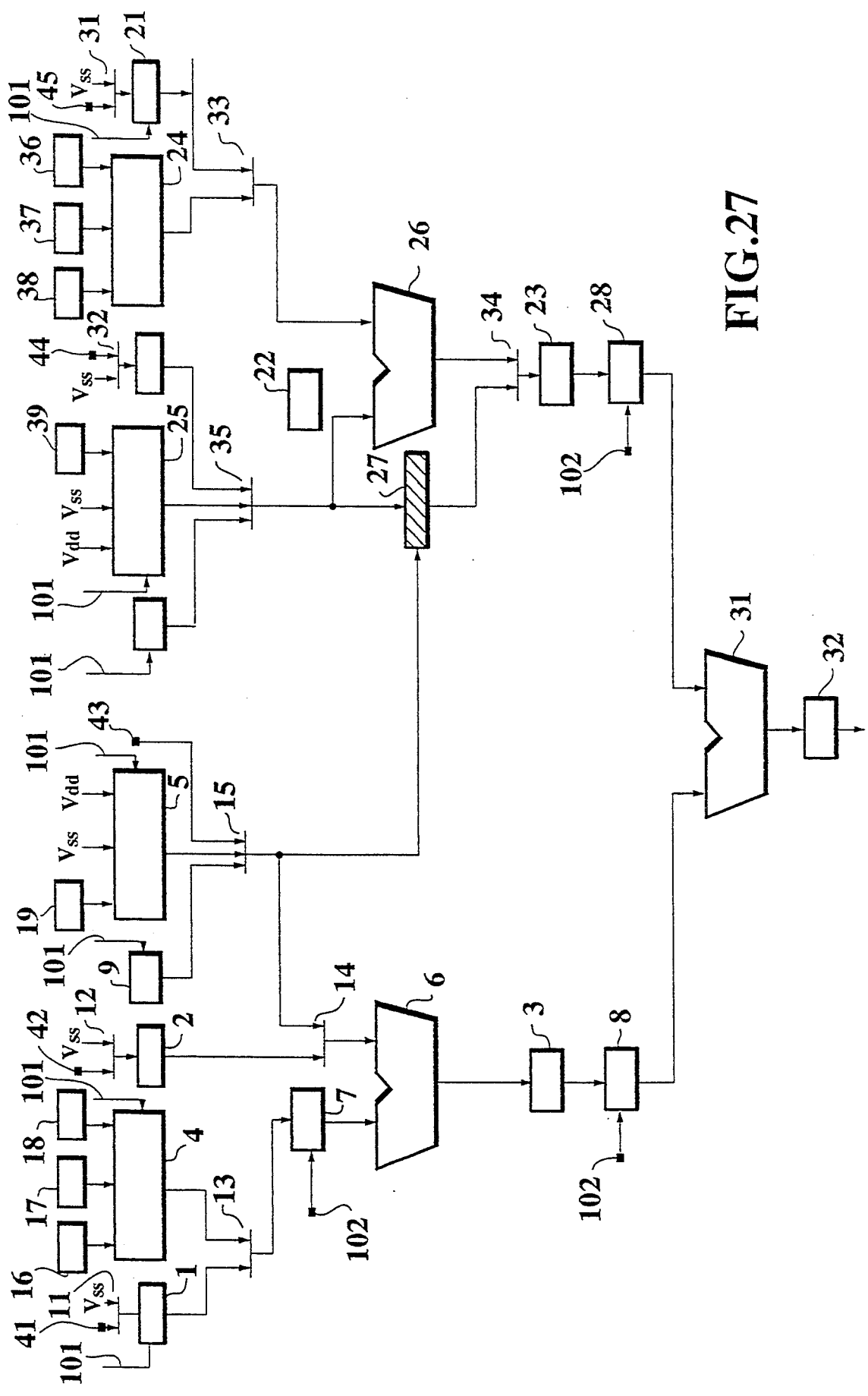
FIG. 27 is a block diagram to show construction of another embodiment of the AGU according to the present invention.

FIG. 27 is a block diagram to show construction of the second embodiment of the AGU. In the same drawing, the picture-image signal processor based on the AGU is generally divided into a part for generating an address showing each X coordinate (hereinafter, called logic address in the X direction) on the screen, and another part for generating an address showing each Y coordinate (hereinafter, called logic address in the Y address) on the screen. However, these X and Y directions are based on the directions shown in FIG. 4.

The part for carrying out calculation on the logic address in the Y direction comprises registers 1 to 3 and 16 to 19, counters 4, 5, an adder 6, barrel shifters 7, 8 and selectors 11 to 15.

While, the part for carrying out calculation on the logic address in the X direction comprises registers 21 to 23 and 36 to 39, counters 24, 25, an adder 26, barrel shifter 28, selectors 31 to 35 and a bit reverse circuit or variable bit-width reverse order circuit 27.

In the registers 17, 37, the minimum address values in the respective directions are initially set, while in the registers 16, 36 are initially set the maximum address values in the respective directions. Moreover, in the registers 19, 39 are initially set the maximum address values in the respective directions on a specific area in the window raster scan mode.

The counters 4, 24 respectively carry out increment and scan on addresses in the respective directions.

The counters 5, 25 respectively carry out scan on a specific area.

The registers 1, 2, 21, 22 respectively hold addresses generated by an external circuit (not shown).

Moreover, adjacent access decoders (hereinafter, NAC) respectively generate distances to a point optionally designated as a central point on the screen from points adjacent to the central point. The values of the NAC's 9, 29 can be changed every time an external clock 101 is inputted thereto.

The adder 6 adds the value of the register 4 or register 1 to the value of the counter 5, NAC 9 or register 2.

While, the adder 26 adds the value of the counter 24 or register 21 to the value held in the counter 25, register 22 or NAC 29.

The bit reverse circuit 27 carries out bit reverse of the lower n bits in the output value of the counter 25. Incidentally, n is determined by the value of the counter 5.

Moreover, the register 3 holds the addition result of the adder 6, and the register 23 holds the addition result of the adder 26 or the output value of the bit reverse circuit 27.

The barrel shifters 8, 28 respectively shift the addresses held in the registers 3, 23 by a predetermined shift amount 102, while the barrel shifter 7 shifts the value of the register 1 or register 4 by the shift amount 102.

The adder 31 adds each logic address in the X direction to each logic address in the Y direction generated by the above-described construction, then outputs the addition result as an address (physical address) on the picture-image memory.

Furthermore, the register 32 holds the physical address outputted from the adder 31.

Next, the operation of the picture-image signal processor in each addressing mode is explained.

(1) First, the operation in case of the raster scan addressing mode for carrying out raster scan on a two-dimensional screen shown in FIG. 4 is explained.

In this mode, the counters 4, 24 are used. Namely, the value of the counter 4 is increased by a value held in the register 18 in accordance with the external clock 101.

If the value of the counter 4 exceeds a value in the register 16, a value held in the register 17 is loaded to the counter 4, at the same time, the value of the counter 24 is increased by a value held in the register 38.

To make the origin of the physical address the same as the origin of the logic address, offset values of respective Y and X addresses are inputted to external ports 42, 44.

Then, the offset values of the X and Y addresses and the values of the counters 24, 4 are respectively added, to generate logic addresses of X, Y. Moreover, these logic addresses are inputted to the registers 23, 3, then respectively shifted by a predetermined shift amount 102 by the shifters 8, 28. Finally, these values are added by the adder 31 so as to be transformed into each physical address and held in the register 32. (2) Next, the operation in the addressing mode for carrying out window raster scan on a two-dimensional screen as shown in FIG. 25 is explained.

First, the value of the counter 5 is increased by 1 in accordance with the clock 101.

Then, if the value of the counter 5 exceeds a value held in the register 19, 0 is loaded to the counter 5. At the same time, the value of the counter 25 is increased by 1.

If the value of the counter 25 exceeds a value of the register 39, 0 is loaded to the counter 25, and the value of the counter 4 is increased by a value held in the register 18.

If the value of the counter 4 exceeds a value of the register 16, a value of the register 17 is loaded to the counter 4, and the value of the counter 24 is increased by a value held in the register 38.

Then, the values of the counters 5, 4 and those of the counters 25, 24 are respectively added so as to generate respective logic addresses of X, Y. Thereafter, these logic addresses are respectively inputted to the registers 23, 3, then shifted by the predetermined shift value 102 by the shifters 8, 28 in accordance with the ratio between vertical and horizontal lengths of the screen. Finally, these values are added by the adder 31 to be transformed into each physical address, then held in the register.

(3) Next, the operation in the case of the addressing mode for carrying out neighborhood access on the two-dimensional screen as shown in FIG. 26 will be explained.

First, the NAC's 9, 29 are respectively operated by the external clock 101.

Then, the X and Y addresses of a central point 0 are respectively output to the external port 41, 45.

Moreover, the X and Y addresses of the central point 0 and outputs of the NAC's 9, 29 are respectively added so as to generate logic addresses of X, Y. Thereafter, these logic addresses are respectively inputted to the registers 23, 3, then shifted by the predetermined shift amount 102 by the shifters 8, 28 in accordance with the ratio of vertical and horizontal lengths of the screen. Finally, these values are added by the adder 31 to be transformed into each physical address, then held in the register 32.

(4) Next, the operation in the two-dimensional indirect addressing mode for carrying out indirect access on a two-dimensional screen.

First, Y and X addresses are respectively given to external ports 41, 45, then taken in the registers 1, 21 in accordance with the external clock 101.

Then, offset values of the Y and X addresses are respectively inputted to external ports 42, 44.

Thereafter, the offset values of the X and Y addresses and other X and Y addresses given from an external circuit not shown are respectively added so as to generate logic addresses of X, Y. Thereafter, these logic addresses are respectively inputted to the registers 23, 3, then shifted by the predetermined shift amount 102 by the shifters 8, 28 in accordance with the ratio of vertical and horizontal lengths of the screen. Finally, these values are added by the adder 31 to be transformed into each physical address, then held in the register 32.

(5) The operation in case of the one-dimensional scan addressing mode for carrying out one-dimensionally successive access is explained.

First, the value of the counter 4 is increased by a value held in the register 18 by the external clock 101.

Then, an address offset value is inputted to the external port 42. Thereafter, the value of the counter 4 and the offset value are added by the adder 6, then the addition result is directly held in the register 32.

(6) Next, the operation in the one-dimensional indirect addressing mode for carrying out one-dimensional indirect access is explained.

An address is given to the external port 45 from an external circuit, and taken in the register 21 by the external clock 101.

Then, an address offset value is inputted to the external port 44. Thereafter, the offset address given from the outside is directly held in the register 32.

(7) Finally, the case of addressing mode for the two-dimensional FFT is explained.

The addressing mode for the FFT in case of the point number of $2^m$ can be expressed by the following formula:

$$adr = Rev[n+1] \quad (1)$$

Namely, this formula means that the lower $[n+1]$ bits of a signal i designated by a bit row are subjected to the bit reverse process. Incidentally, n is a current stage number, and n and i are designated as follows:

$$n = 1, 2, 3, \ldots, m-1$$

$$i = 0, 1, 2, \ldots, 2^m - 1$$

Moreover, when n is 0, the formula is expressed as follows:

$$adr = Rev[m](i)$$

$$n = 0$$

$$i = 0, 1, 2, \ldots, 2^m - 1$$

In this case, a value of i is counted in the counter 25, and n is counted in the counter 5, further an X address is given to the counter 24. Moreover, a value of $2^m - 1$ is set in the register 39, while $m - 1$ in the register 19.

In the two-dimensional FFT, the part for generating the X address and the other for Y address are alternately replaced. Therefore, the FFT in the Y direction is explained here.

First, the value of the counter 25 is increased by 1 by the external clock 101.

If the value of the counter 25 exceeds a value held in the register 39, 0 is loaded to the counter 25, and the value of the counter 5 is increased by 1.

Then, the lower part of the bit row {(the current bit value of the counter 5)+1} of the output data of the counter 25 is subjected to the bit reverse process, then the resultant value is outputted as a Y address.

Incidentally, in case of the 0 stage, the bit reverse is carried out with respect to the m bits inputted from the external port 43, then the result is outputted as a Y address.

If the value of the counter 5 exceeds a value of the register 19, 0 is loaded to the counter 5, and the value of the counter 4 is increased by 1.

While, the X address is shifted by the barrel shifter 7.

Then, offset values of the real-number part and the imaginary-number part of each address are alternately given to the external port 42.

Thereafter, the shifted X address and these offset values are added by the adder 6. As the result, each real-number part and each imaginary-number part of addresses are alternately outputted.

Then, the result of the bit reverse circuit 27 is inputted to the register 23, while the result of the adder 6 is inputted to the register 3. Moreover, these values are respectively shifted by the shifters 7, 28 in accordance with the ratio of the vertical and horizontal lengths of the screen. Thereafter, the results are added by the adder 31, then outputted to the register 32.

In such a manner, the second embodiment can realize the address generation including two-dimensional FFT in a relatively small scale as compared with that of the first embodiment.

As stated above, the AGU for picture-image digital signal processors in the first embodiment according to the present invention can carry out address generation over all of the addressing modes for the picture-image signal process only by describing instructions of a small bit number in the AGU control field.

As the result, the bit number of instructions to be described in the AGU can be greatly reduced, further the amounts of hardwares for the DSP can be reduced so much. Moreover, with the decrease of the instruction bit number, the instruction memory capacity and the time required for reading instructions can be also reduced. Besides, the program become so simple that the trouble required for the preparation can be greatly reduced. Furthermore, according to the second embodiment of the AGU for picture-image digital signal processors, it becomes possible to carry out addressing including two-dimensional FFT with ease at a high speed without increasing the control circuits and production cost.

Next, the time thinning-out FFT and the frequency thinning-out FFT according to the address generation method of the present invention are explained.

First, an embodiment of the time thinning-out FFT on eight points is explained with reference to FIGS. 28 and 5.

On the 0th stage all bits of the following respective group of values generated from a counter:
0 (000 in the binary expression),
1 (001),
2 (010),
3 (011),
4 (100),
5 (101),
6 (110),
7 (111)
are respectively arranged in the reverse order to obtain the following values as a read address of an input data memory:
0 (000),
4 (100),
2 (010),
6 (110),
1 (001),
5 (101),
3 (011),
7 (111).

Then, a butterfly operation is carried out with respect to respective pairs of 0 and 1, 2 and 3, 4 and 5, and 6 and 7 as the first counter values. Namely, in case of the address after the above-mentioned all-bit-reverse-order process, the butterfly operation is carried out with respect to respective pairs of 0 and 4, 2 and 6, 1 and 5, and 3 and 7.

Moreover, the group of values obtained by arranging the lowest one bit of each value generated by the output counter in the reverse order, i.e. 0, 1, 2, 3, 4, 5, 6, 7 are defined as a write address to an output data memory.

While, on the first stage, the lower two bits of the following group of values generated from a counter:
0 (000),
1 (001),
2 (010),
3 (011),
4 (100),
5 (101),
6 (110),
7 (111)
are respectively arranged in the reverse order to obtain the following values as a read address of the input data memory:
0 (000),
2 (010),
1 (001),
3 (011),
4 (100),
6 (110),
5 (101),
7 (111).

Then, a butterfly operation is carried out with respect to each pairs of 0 and 1, 2 and 3, 4 and 5, and 6 and 7 as the first counter values. Namely, in case of the address after the above-mentioned bit-reverse-order process on each lower two bits, the butterfly operation is carried out with respect to each pairs of 0 and 2, 1 and 3, 4 and 6, and 5 and 7.

Moreover, the group of values obtained by the reverse arrangement of the lower two bits of each value generated by the output counter, i.e. 0, 2, 1, 3, 4, 6, 5, 7, are defined as a write address to the output data memory.

Then, on the second stage, the lower three bits of the following group of values generated from a counter:
0 (000),
1 (001),
2 (010),
3 (011),
4 (100),
5 (101),
6 (110),
7 (111)
are respectively arranged in the reverse order to obtain the following values as a read address of the input data memory:
0 (000),
4 (100),
2 (010),
6 (110),
1 (001),
5 (101),
3 (011),
7 (111).

Then, a butterfly operation is carried out with respect to each pairs of 0 and 1, 2 and 3, 4 and 5, and 6 and 7 as the first counter values. Namely, in case of the address after the above-mentioned bit-reverse-order process on each lower three bits, the butterfly operation is carried out with respect to each pairs of 0 and 4, 2 and 6, 1 and 5, and 3 and 7.

Moreover, the group of values obtained by the reverse arrangement of the lower three bits of each value generated by the output counter, i.e. 0, 4, 2, 6, 1, 5, 3, 7, are defined as a write address to the output data memory.

Figure 5:
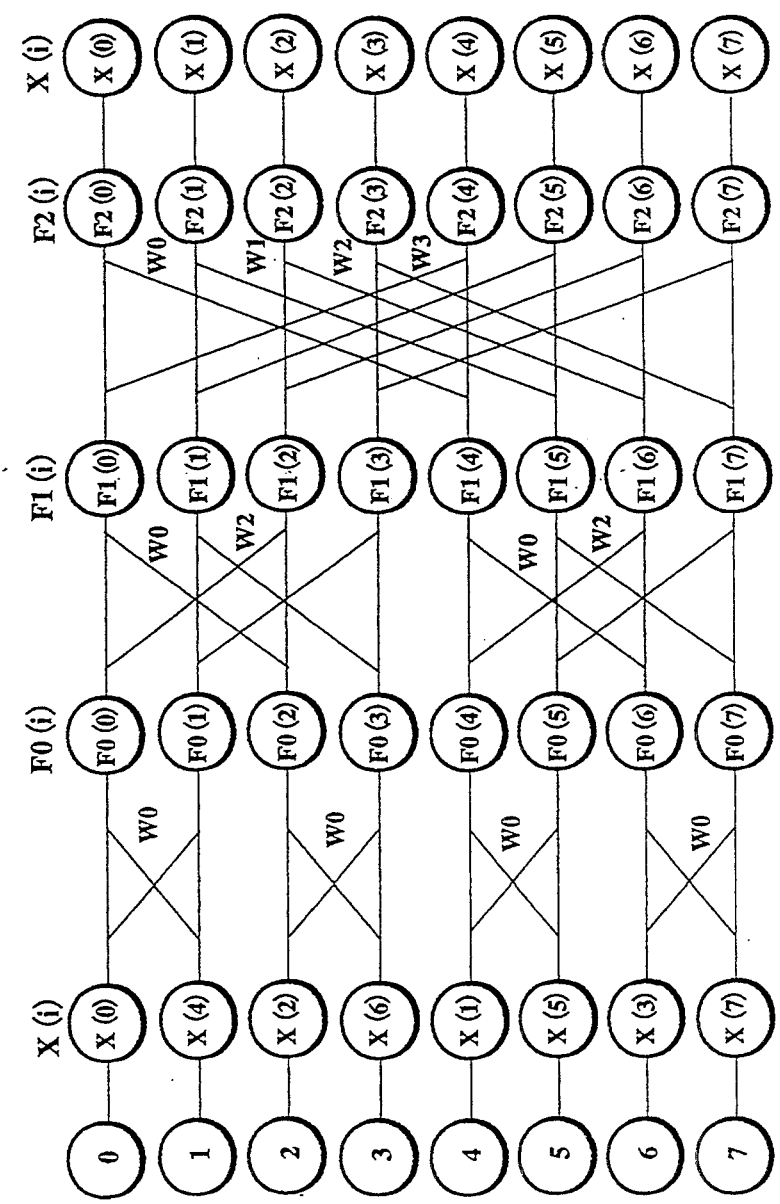
FIG. 5 is a flow graph of a time thinning-out FFT with respect to eight points.
Figure 6:
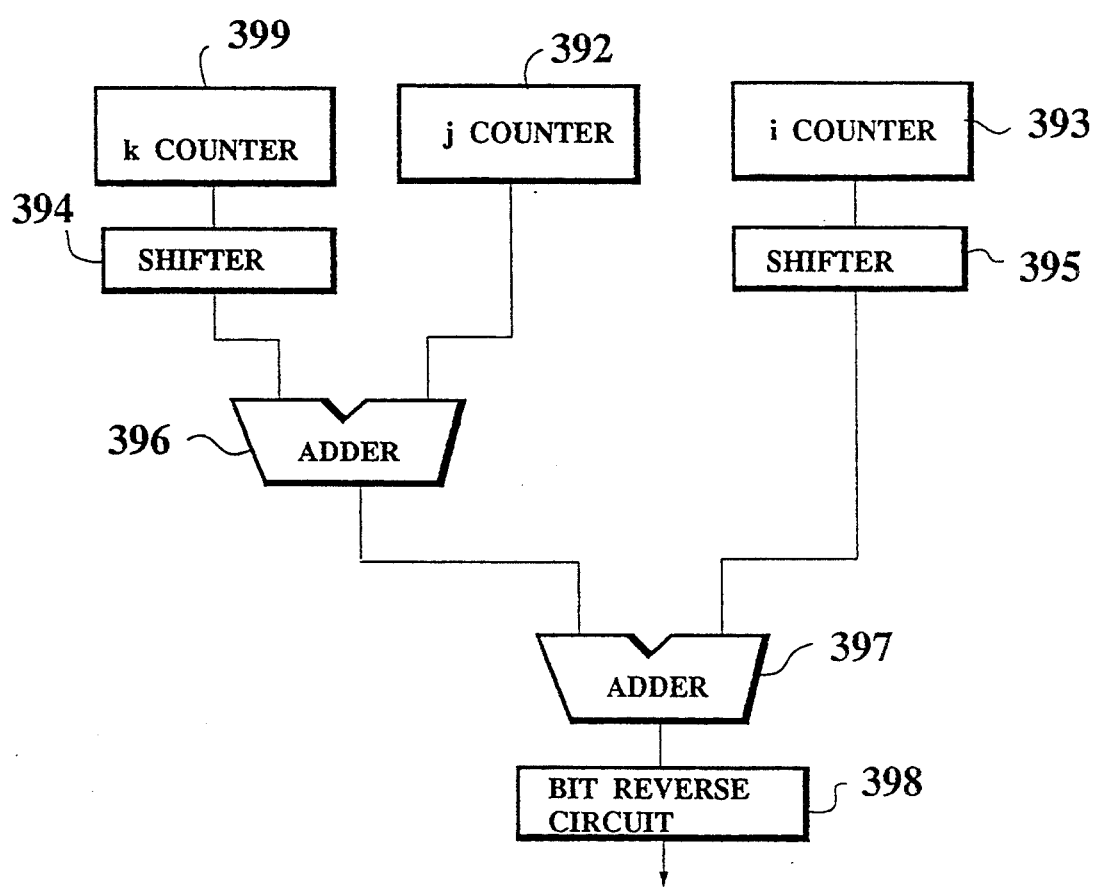
FIG. 6 is a diagram to show construction of an address generating circuit based on a conventional address generation method.
Figure 7:
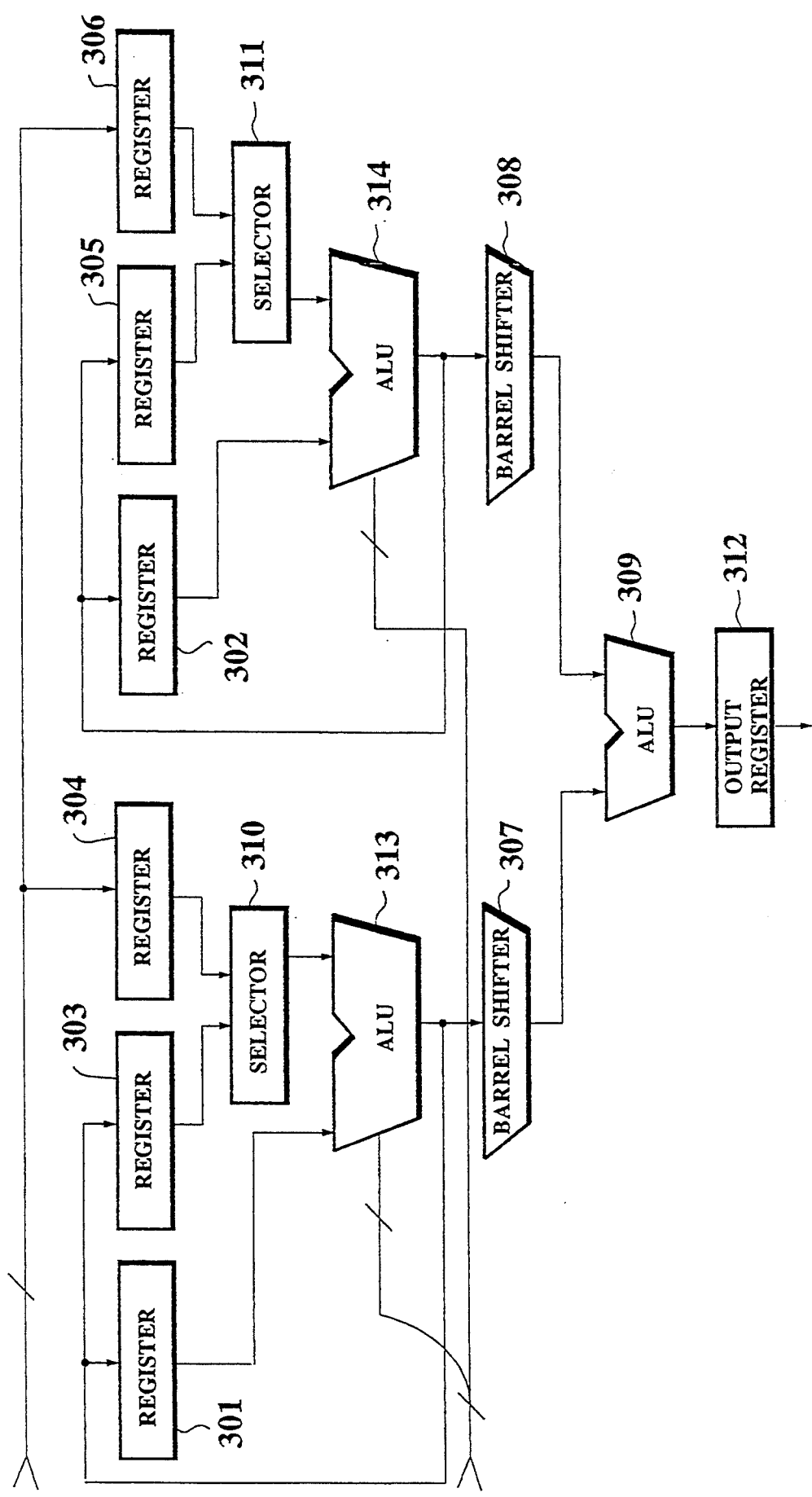
FIG. 7 is a block diagram of a conventional and general address generating circuit.
Figures 8, 9:
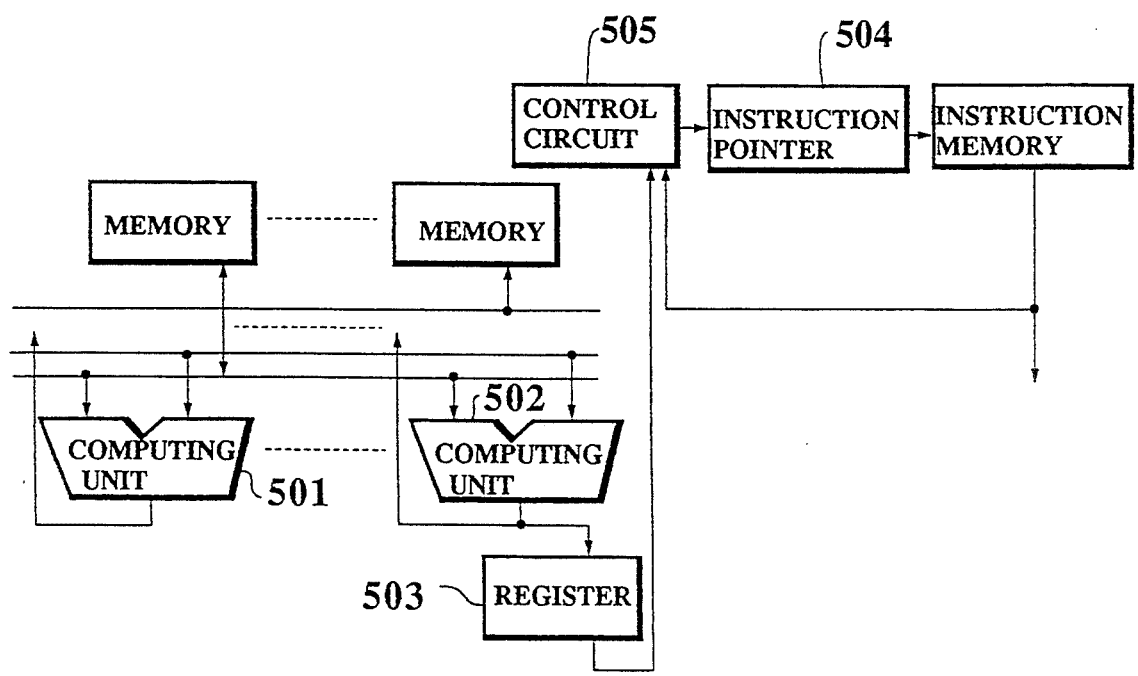
FIG. 8 is a diagram to schematically explain eight adjacent points.
FIG. 9 is a block diagram to show construction of a parallel arithmetic operation unit conventionally known.
Figure 10:
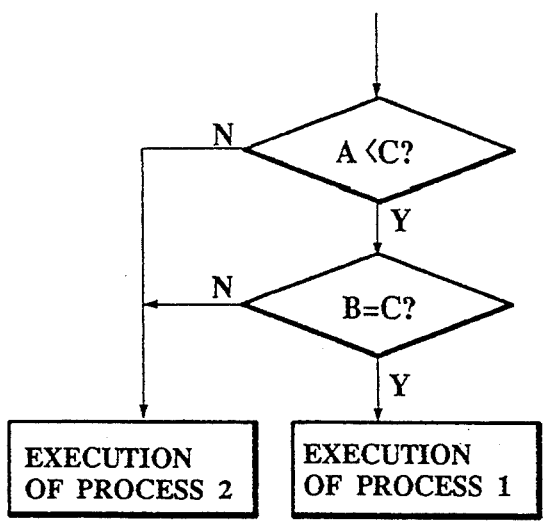
FIG. 10 is a process flow to explain the conventional parallel arithmetic operation unit shown in FIG. 9.
Figure 11:
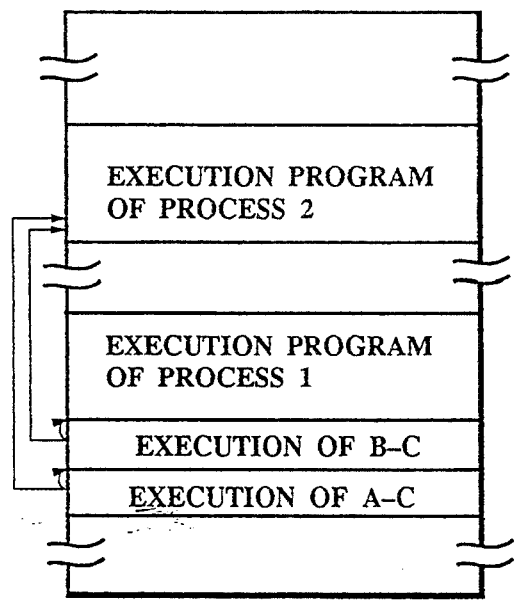
FIG. 11 is an instruction memory generally used in the conventional arithmetic operation unit shown in FIG. 9.
Figure 12:
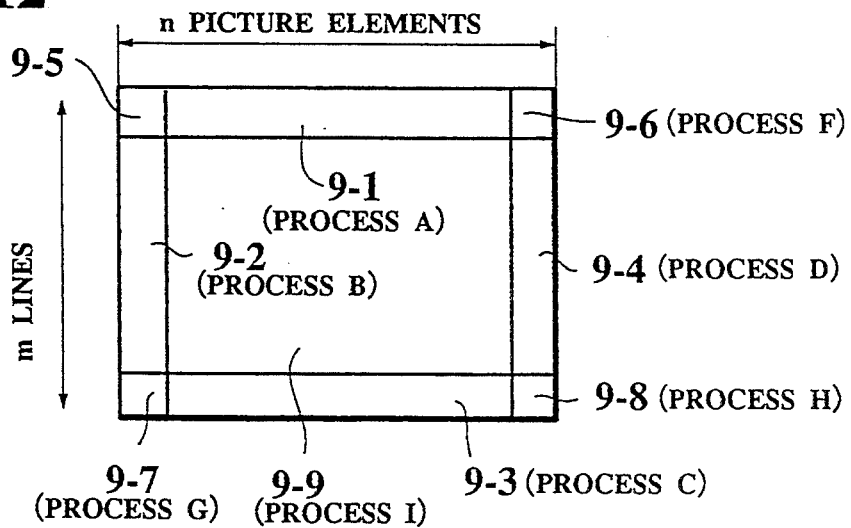
FIGS. 12 and 13 show diagrams to respectively explain processes on the picture image and on the screen.

Accordingly, the time thinning-out FFT shown in FIG. 5 can be carried out by a counter always performing a constant count. Moreover, as seen from FIG. 28, though the input data address is different from the output data address on the 0th stage, these are the same on the other stages.

Next, an embodiment of the frequency thinning-out FFT on eight points is explained with reference to FIGS. 29 and 30.

On the 0th stage, the lower three bits of a group of values, 0, 1, 2, 3, 4, 5, 6, 7 generated from a counter are respectively arranged in the reverse order to obtain a group of values, 0, 4, 2, 6, i, 5, 3, 7 as a read address of an input data memory.

Then, a butterfly operation is carried out with respect to each pairs of 0 and 1, 2 and 3, 4 and 5, and 6 and 7 as the first counter values. Namely, in case of the address after the above-mentioned bit-reverse-order process on each lower three bits, the butterfly operation is carried out with respect to each pairs of 0 and 4, 2 and 6, 1 and 5, and 3 and 7.

Moreover, the group of values obtained by the reverse arrangement of the lower three bits of each value generated by the output counter, i.e. 0, 4, 2, 6, 1, 5, 3, 7, are defined as a write address to an output data memory.

In the first stage, the lower two bits of the group of values, 0, 1, 2, 3, 4, 5, 6, 7 generated from a counter are respectively arranged in the reverse order to obtain a group of values, 0, 2, 1, 3, 4, 6, 5, 7 as a read address of the input data memory.

Then, a butterfly operation is carried out with respect to each pairs of 0 and 1, 2 and 3, 4 and 5, and 6 and 7 according to the first counter values. Namely, in the case of the address after the above-mentioned bit-reverse-order process on each lower two bits, the butterfly operation is carried out with respect to each pairs of 0 and 2, 1 and 3, 4 and 6, and 5 and 7. Moreover, the group of values obtained by the reverse arrangement of the lower two bits of each value generated by the output counter, i.e. 0, 2, 1, 3, 4, 6, 5, 7, are defined as a write address to the output data memory.

On the second stage, the group of values, 0, 1, 2, 3, 4, 5, 6, 7 obtained by arranging the lowest one bit of each value generated by the output counter in the reverse order are defined as a read address of the input data memory.

Then, a butterfly operation is carried out with respect to respective pairs of 0 and 1, 2 and 3, 4 and 5, and 6 and 7 according to the first counter values. Namely, in case of the address after the above-mentioned bit-reverse-order process on the lowest one bit, the butterfly operation is carried out with respect to respective pairs of 0 and 1, 2 and 3, 4 and 5, and 6 and 7.

Moreover, all bits of the group of values, 0, 1, 2, 3, 4, 5, 6, 7 generated from the output counter are respectively arranged in the reverse order to obtain a group of values, 0, 4, 2, 6, 1, 5, 3, 7 as a write address to the output data memory.

Figure 30:
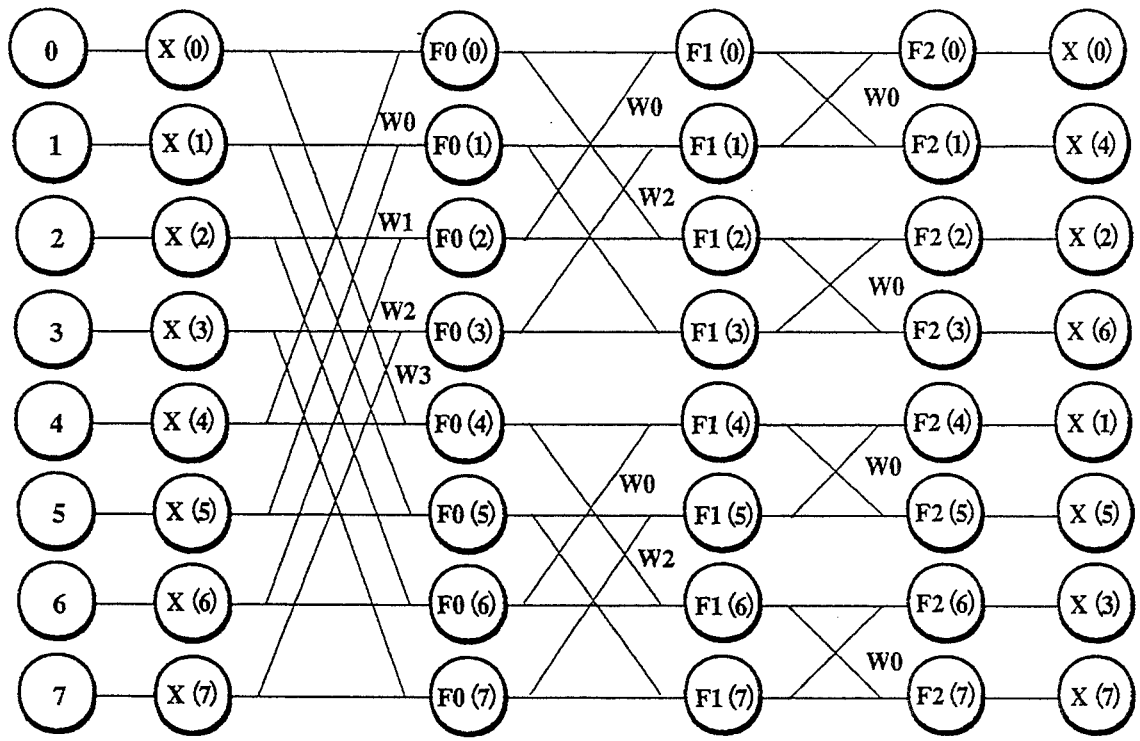
FIG. 30 is a flow graph concerning the frequency thinning-out FFT on eight points.

Accordingly, the time thinning-out FFT shown in FIG. 30 can be carried out by a counter always performing a constant count. Moreover, as seen from FIG. 29, though the input data address is different from the output data address on the second stage, these are the same in the other stages.

Next, the address generation based on the time thinning-out FFT on $2^m$ points is generally explained.

First, on the 0th stage, all bits of the values 0, 1, 2, . . . , $2^m-1$ generated from a counter are respectively arranged in the reverse order to obtain a read address of an input data memory. Then, a butterfly operation is carried out with respect to respective pairs of 0 and 1, 2 and 3, . . . , 2p and 2p+1, ($0 \leq p \leq 2^{m-1}-1$), . . . , $2^m-2$ and $2^m-1$ according to the first counter values.

Moreover, the group of values 0, 1, 2, . . . , $2^m-1$ are used as a write address to an output data memory.

Then, on the n-th ($1 \leq n \leq m-1$) stage, the lower (n+1) bits of the values 0, 1, 2, . . . , $2^m-1$ generated from the counter are respectively arranged in the reverse order to obtain a read address of the input data memory. Then, a butterfly operation is carried out with respect to respective pairs of 0 and 1, 2 and 3, . . . , 2p and 2p+1, ($0 \leq p \leq 2^{m-1}-1$), . . . , $2^m-2$ and $2^m-1$ according to the first counter values.

Moreover, a write address to the output memory is also obtained by the reverse order arrangement of the respective lower (n+1) bits of the values 0, 1, 2, . . . , $2^m-1$ generated from the output counter in the reverse order.

Next, the address generation based on the frequency thinning-out FFT on $2^m$ points is generally explained.

On the n-th stage ($0 \leq n \leq m-2$), the lower (m-n) bits of the values 0, 1, 2, . . . , $2^m-1$ generated from the counter are respectively arranged in the reverse order to obtain a read address of the input data memory. Then, a butterfly operation is carried out with respect to respective pairs of 0 and 1, 2 and 3, . . . , 2p and 2p+1, ($0 \leq p \leq 2^{m-1}-1$), . . . , $2^m-2$ and $2^m-1$ according to the first counter values.

Moreover, a write address to the output memory is also obtained by the reverse order arrangement of the respective lower (m-n) bits of the values 0, 1, 2 . . . ., $2^m-1$ generated from the output counter in the reverse order.

Then, on the (m-1)th stage, the values 0, 1, 2, . . . , $2^m-1$ generated from the counter are used as a read address of the input data memory. Then, a butterfly operation is carried out with respect to respective pairs of 0 and 1, 2 and 3 , . . . , 2p and 2p+1, ($0 \leq p \leq 2^{m-1}$), . . . , $2^m-2$ and $2^m-1$ according to the counter values.

Moreover, the values 0, 1, 2, . . . , $2^m-1$ generated from the counter are also used as a write address of the output data memory.

Next, a method of generating a read address of a factor memory based on the time thinning-out FFT on eight points is explained with reference to FIGS. 31 and 5.

On the 0th stage, values as the read address of the factor memory are all 0. Namely, this is because the values of the factor generating counter are subjected to increment from 0 to $2^0-1$ (=0).

On the first stage, the read address of the factor memory is obtained by the reverse arrangement of the respective lower 2 bits of values generated by repeating 0, $2^1-1$ (=1) twice from a factor generating counter operated at a half of the operation rate of the data address generating counter.

While, on the second stage, the read address of the factor memory is obtained by the reverse arrangement of the respective lower 2 bits of values 0, 1, 2, $2^2-1$ (=3) generated from the factor generating counter operated at a half of the operation rate the data address generating counter.

In such a manner, the increment of respective values of the factor generating counter in the time thinning-out FFT is always constant even when the stage number is increased.

Next, a method of generating a read address of a factor memory based on the frequency thinning-out FFT on eight points is explained with reference to FIGS. 32 and 30.

On the 0th stage, the read address of the factor memory is obtained by the reverse arrangement of the respective lower 2 bits of values 0, 1, 2, $2^2-1$ (=3) generated from a factor generating counter operated at a half of the operation rate of the data address generating counter.

Then, on the first stage, the read address of the factor memory is obtained by the reverse arrangement of the respective lower 2 bits of values generated by repeating 0, $2^1-1$ (=1) twice from a factor generating counter operated at a half of the operation rate of the data address generating counter.

On the second stage, values as the read address of the factor memory are all 0. Namely, this is because the values of the factor generating counter are subjected to increment from 0° to $2°-1$ (=0).

Also in this case, the increment of respective values of the factor generating counter in the time thinning-out FFT is always constant even when the stage number is increased.

Subsequently, a method of generating a read address of a factor memory based on the time thinning-out FFT on $2^m$ points is generally explained.

On the n-th stage ($0 \leq n \leq m-1$), the read address of the factor memory is obtained by the reverse arrangement of the respective lower m-1 bits of values generated by repeating 0, 1, 2, . . . , $(2^n-1)$ $2^{m-n-1}$ times from a factor generating counter operated at a half of the operation rate of the data address generating counter.

Next, a method of generating a read address of a factor memory based on the frequency thinning-out FFT on $2^m$ points is generally explained.

On the n-th stage ($0 \leq n \leq m-1$), the read address of the factor memory is obtained by the reverse arrangement of the respective lower $m-1$ bits of values generated by repeating $0, 1, 2, \ldots, (2^{m-n-1}-1)$ $2$ n times from a factor generating counter operated at a half of the operation rate of the data address generating counter.

Moreover, these address generation methods are carried out by the counter 25 and the bit reverse circuit 27 shown in FIG. 27.

Namely, when an input or output data addresses based on the FFT (Fast Fourier Transform) is generated, the value of the counter 25 is started from 0, then increased by 1 for repeating count corresponding to the number of points. Then, a predetermined address can be obtained by carrying out the bit reverse arrangement corresponding to the point number of the FFT and the bit number of each stage.

On the other hand, when a factor address of the FFT is generated, the value of the counter 25 is started from 0 at a period twice as long as the case of the data address generation, then increased by 1 for repeating count corresponding to the number of points and the stage number. Then, a predetermined address can be obtained by carrying out the bit reverse arrangement corresponding to the point number of the FFT and the bit number of each stage.

Figure 33:
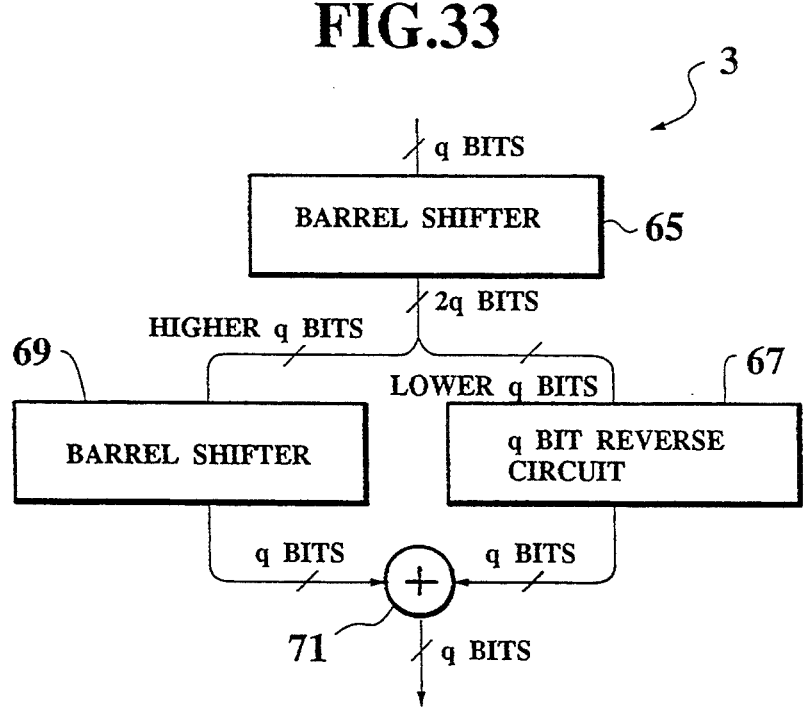
FIG. 33 is a diagram to show construction of a variable-width bit reverse circuit shown in FIG. 27.

FIG. 33 shows the construction of the bit reverse circuit 27 shown in FIG. 27.

Incidentally, the bit reverse circuit 27 shown in FIG. 33 carries out q-bit input and processes the bit reverse arrangement with respect to the lower r bits of the input data.

In the construction shown in the same drawing, a barrel shifter 65 shifts the q-bit input data by q-r bits in the left direction to extend it into a 2q-bit data. Incidentally, the barrel shefter 65 sets the lower q-r bits and the higher r bits of the 2q bits data at 0.

Then, a q-bit reverse circuit 67 reverses the order of all of the lower q bits of the output from the barrel shifter 65. Incidentally, since the bit width of the q-bit reverse circuit 67 is fixed, it can be constructed with a hard wired logic.

Moreover, a barrel shifter 69 shifts the higher q bits of the output from the barrel shifter 65 by r bits in the left direction. Incidentally, the barrel shifter 69 sets the lower r bits of the q-bit output at 0.

Thereafter, an adder 71 adds the output of the q-bit reverse circuit 67 to the output of the barrel shifter 69. Because one of these two outputs is always 0, the adder 71 can be constructed with an or circuit.

Namely the above-mentioned address generation circuits shown in FIGS. 27 and 33 are respectively prepared for the input data, output data and factors related, so as to carry out the address generation based on the time thinning-out FFT and frequency thinning-out FFT.

As stated above, according to the address generation method based on the time thinning-out FFT and frequency thinning-out FFT of the present invention, by preparing only one counter and one variable bit-width reverse circuit, it becomes possible to carry out address generation of input and output data or of factors related, on each stage of the FFT. As the result, the circuit scale can be greatly reduced.

Moreover, in the above invention, it is not necessary to connect counters successively, and in case of addressing input and output data, the initial values and final values to be set in advance are constant irrespectively of each stage number. Therefore, the counter control can be carried out with ease.

Next, an embodiment of the address generation unit (AGU) for obtaining addresses based on the affine transform is explained.

Namely, this embodiment relates to an address generation unit for realizing reduction of the calculation time and simplification of the program by only containing numerical values necessary for the affine transform to calculate addresses based on the transform method with no data processing sections.

Figure 34:
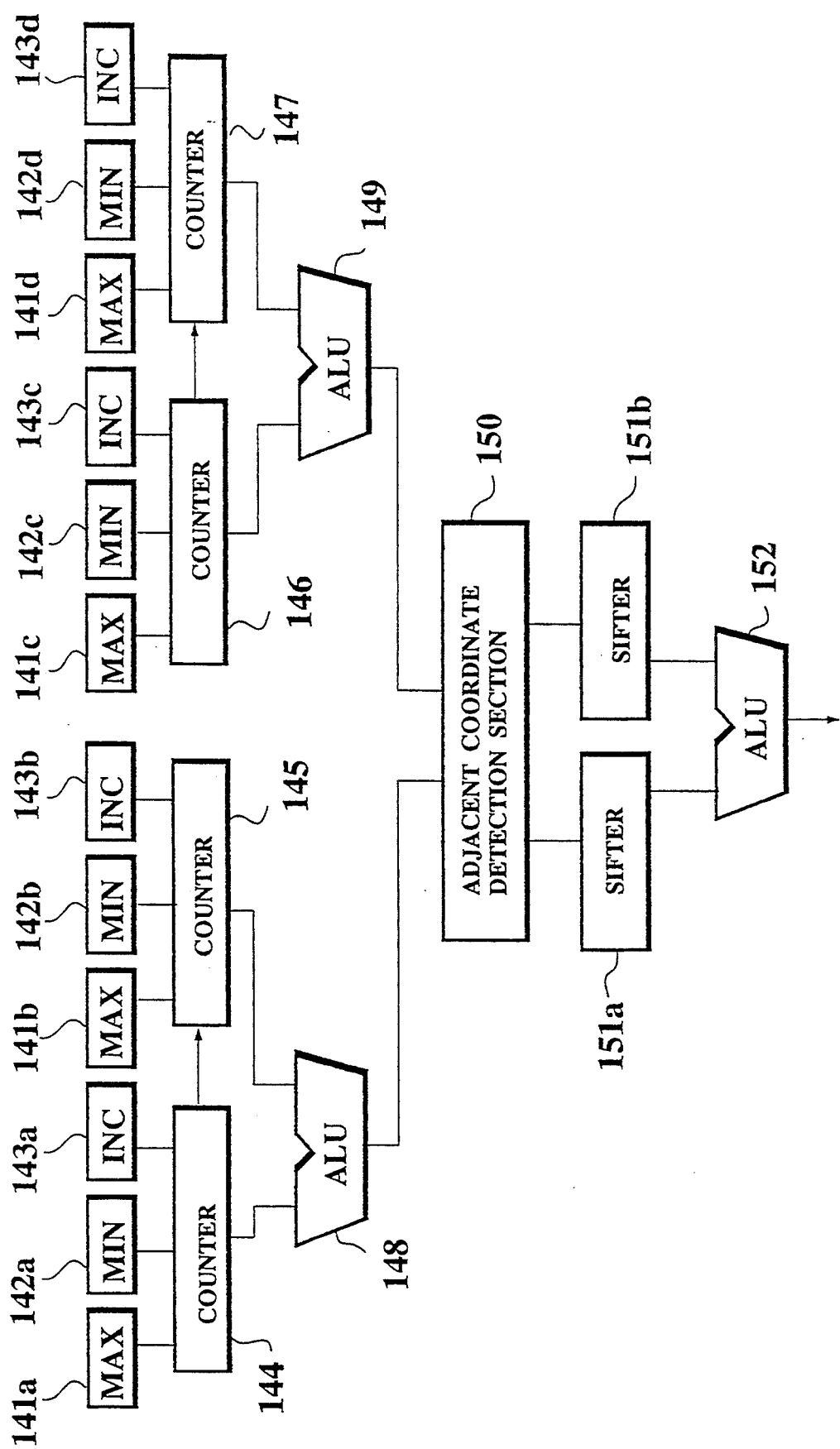
FIG. 34 is a block diagram to show an embodiment of an address generating circuit for obtaining an address based on the affine transform, according to the present invention.

As shown in FIG. 34, this address generation unit is generally divided into a part of generating coordinates of the X direction, a part of generating coordinates of the Y direction and a part of transforming coordinates of the X and Y directions into addresses on the image memory. Moreover, the respective parts of generating coordinates of the X and Y directions have the same construction.

As shown in the same drawing, the part of producing coordinates of the X direction comprises registers 141a, 141b, 142a, 142b, 143a, 143b, counters 144, 145, and an ALU 148, while the part of producing coordinates of the Y direction comprises registers 141c, 141d, 142c, 142d, 143c, 143d, counters 146, 147, and an ALU 149. Moreover, the part for transforming these coordinates into addresses on the image memory comprises an adjacent coordinate detection section 150, shifters 151a, 151b, and an ALU 152.

Moreover, to the register 141a is inputted a value composed by multiplying the maximum coordinate in the X direction of an image output by a in the formula (2), and to the register 141b is given a value obtained by multiplying the maximum coordinate in the Y direction by b of the same formula. While, to the register 142a is inputted a value obtained by multiplying the minimum coordinate in the X direction by a, and to the register 142b is given to a value composed by adding e to a value obtained by multiplying the minimum coordinate in the Y direction by b. Moreover, to the registers 143a, 143b are respectively inputted a, b.

While, the counter 144 carries out count operation every time is given a clock produced with the value given in the register 142a as the initial value and the value a in the register 143a as the increment. If the output of the counter 144 reaches the value inputted to the register 141a, and the next clock is given to the same counter, the counter 145 is counted up once as well as the counter 144 is reset at the value of the register 142a. While, the counter 145 is counted up with the value of the register 142b as the initial value and the value b of the register 143b as the increment every time the counter 144 reaches the maximum value. Moreover, the ALU 148 outputs real-number X coordinates by adding respective outputs of the counters 144 and 145.

On the other hand, to the register 141c is inputted a value composed by multiplying the maximum coordinate in the X direction of an image output by c, and to 141d is added a value obtained by multiplying the maximum coordinate in the Y direction by d. While, to the register 142c is inputted a value obtained by multiplying the minimum coordinate in the X direction by c, and to 142d is given to a value composed by adding f to a value obtained by multiplying the minimum coordinate in the Y direction by d. Moreover, to the registers 143c, 143d are respectively inputted c, d. Besides, the coordinates of the Y direction are generated in the same manner as the above-mentioned coordinate generation method on the X direction.

Incidentally, since coordinates respectively generated from the ALU's 148, 149 are real numbers, four points of adjacent integral coordinates are respectively obtained first at the adjacent coordinate detection section 150, then the most nearest coordinate is detected from these four points. Thereafter, each of the detected coordinates is transformed into an address on the image memory by the shifters 151a, 151b and the ALU 152, then outputted onto the image memory.

Figure 35:
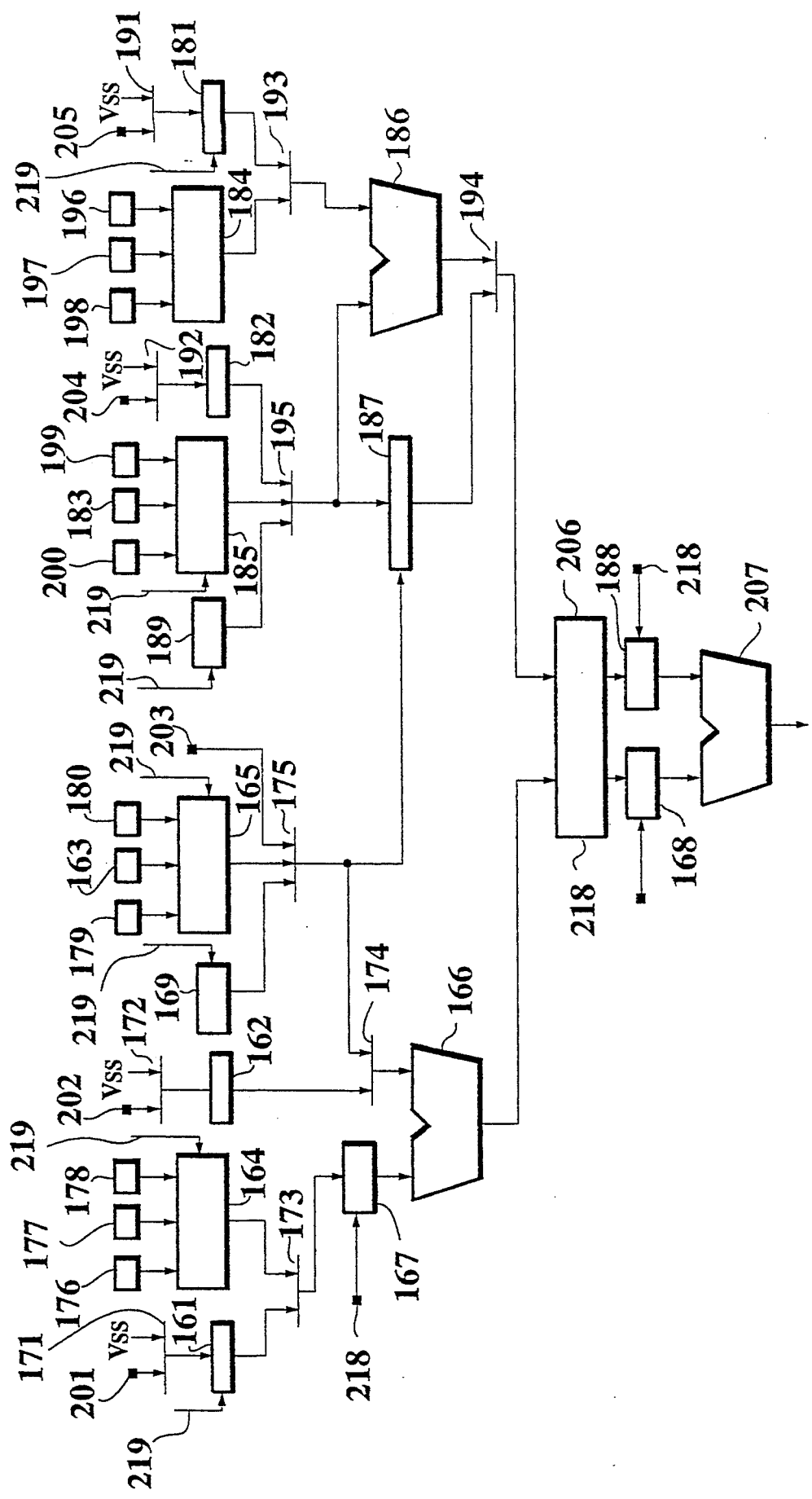
FIG. 35 is a block diagram of another embodiment of the address generating circuit according to the present invention.

FIG. 35 shows a block diagram of another embodiment of the address generation unit for obtaining addresses based on the affine transform.

As shown in the same drawing, this address generation unit is generally divided into a part of generating addresses (logic addresses) in the X direction on the image memory, and another of generating address (logic addresses) in the Y direction on the image memory.

The part for carrying out the calculation on logic addresses of the Y direction comprises registers 161, 162, 176 to 179, 180, 163, counters 164, 165, an adder 166, shifters 167, 168 and selectors 171 to 175.

While, the part for carrying out the calculation on logic addresses of the X direction comprises registers 181, 182, 196 to 199, 200, 183, counters 184, 185, an adder 186, a shifter 188, selectors 191 to 195 and a bit reverse circuit 187.

Besides, the address generation unit includes an adjacent coordinate detection section 206.

In the respective registers 177, 197 are initially set the respective minimum address values in the X and Y directions, while in the registers 176, 196 are initially set the respective maximum values in the X and Y directions. On the other hand, in the registers 179, 199 are respectively set the maximum values in the X and Y directions in a specific area in the window raster scan mode. Besides, the counters 164, 184 respectively carry out scan operation on addresses of the respective directions with increment, while the counters 165, 185 carry out scan operation in the respective directions on a specific area. Moreover, the other registers 161, 162, 181, 182 hold addresses generated from external circuits (not shown).

Furthermore, neighbor access decoders (NAC) 169, 189 respectively generate neighbor distances from a central point optionally designated on the screen. The NAC's 169, 189 are so constructed as to designate values variably every time an external clock 219 is inputted.

The shifter 167 shifts the value of the register 161 or of the counter 164 by a shifter amount 218.

The adder 166 addes the value of the counter 164 or register 161 and the value of the counter 165, NAC 169 or register 162 respectively. While, the adder 186 adds the value of the counter 184 or register 181 and the value of the counter 185, register 182 or NAC 189 respectively.

Moreover, the bit reverse circuit 187 carries out bit reverse operation on the lower n bits of the output value from the counter 185. Incidentally, n is divided by the value of the counter 165.

The adjacent coordinate detection section 206 detects an integral coordinate the most nearest to each designated real-number coordinate in the same manner as explained in case of the adjacent coordinate detection section 150 shown in FIG. 34.

The shifters 168, 188 respectively shift addresses by the predetermined shifter amount 218.

While, the adder 207 adds the respective logic addresses of the X and Y directions generated by the above construction, then outputs each result as an address on the image memory.

Next, the operation based on the affine transform is explained with reference to FIG. 35.

To the register 177 is inputted a value obtained by adding e to a value produced by multiplying the minimum coordinate in the X direction of an image output by a according to the formula (2), and to the register 197 is set a value obtained by adding f to a value produced by multiplying the minimum coordinate in the X direction by c. While, to the register 176 is inputted a value obtained by multiplying the maximum coordinate in the X direction by a, and to the register 196 is given to a value obtained by multiplying the maximum coordinate in the X direction by c, further to the register 179 a value obtained by multiplying the maximum coordinate in the Y direction by b, and to the register 199 a value obtained by multiplying the maximum coordinate in the Y direction by d. Moreover, to the registers 178, 198 are respectively inputted a, c, and to the registers 180, 200 are respectively inputted b, d. Furthermore, to the register 163 set a value obtained by multiplying the minimum coordinate of the Y direction by b, and to the register 183 a value obtained by multiplying the minimum value by d.

In such construction, the counters 164, 184 are respectively operated by the clock 219 to increase the outputs by the values respectively set in the registers 178, 198. Then, when the values of the counters 164, 184 respectively exceed the values of the registers 176, 196 and reach the values of the registers 177, 197, the counters 165, 185 are operated so as to increase the respective outputs by the values set in the registers 180, 200. Thereafter, the values of the counters 164 and 165 and of the counters 184 and 185 are respectively added at the ALU's 166 and 186, then the results are outputted to the adjacent coordinate detection section 206. Since each coordinate outputted is a real number, the adjacent coordinate detection section 206 first obtains four adjacent integral coordinates, then detects a coordinate having the most adjacent distance among them, in each operation. Then, each of the detected coordinates is transformed into an address on the image memory through the shifters 168, 188 and ALU 207, and outputted onto the image memory.

Accordingly, in this embodiment, the number of parts, such as counters, ALU's or shifters, occupying mainly the surface of the AGU is the same as the above-described first embodiment. Moreover, this embodiment can also carry out all addressing modes frequently used in the picture-image signal process.

As stated above, the address generation unit as mentioned above comprises registers for memorizing parameters necessary for carrying out the affine transform and an adjacent coordinate detection section for detecting each adjacent integral coordinate. As the result, this address generation unit can perform high-speed affine transform only by independently using the address generation section without using any data processing section. Besides, since the operation is constructed simply, the program can be prepared with ease.

By the way, as a data process method related to the present invention, there is a process including such a conditional branch that an addressing mode is changed into another by a data called from an address generated from the addressing mode, then the changed addressing mode is returned to the original one by the contents of the process.

Next, an embodiment of another address generation unit according to the present invention, in which pipeline operation can be performed without requiring any program control thereof even in case that the above-mentioned branch condition is not established, is explained.

Figure 36:
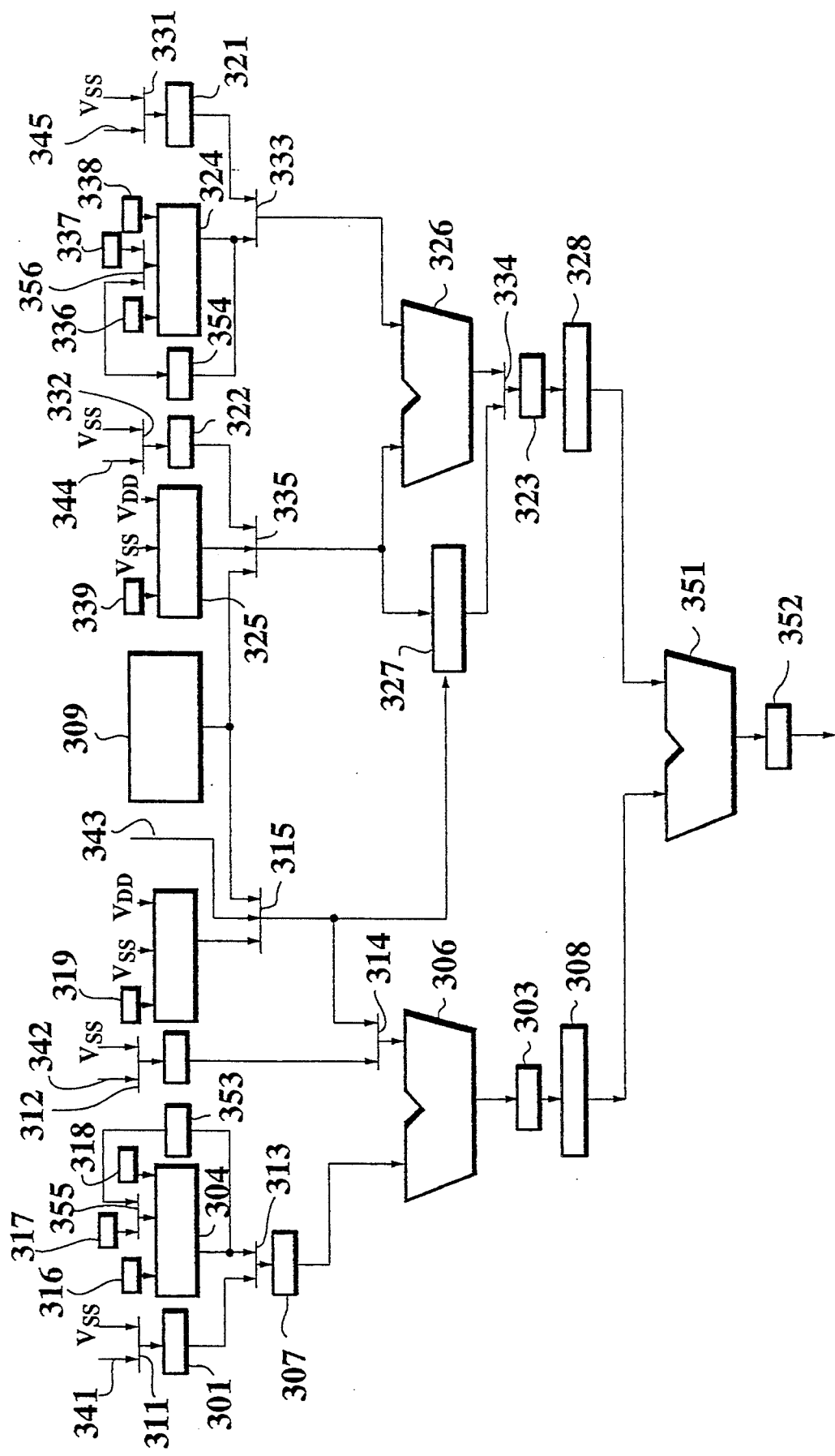
FIG. 36 is a diagram to show construction of another embodiment of the address generating circuit for a DSP according to the present invention.

FIG. 36 is a block diagram to show schematic construction of an address generation unit related to the embodiment of the present invention. Incidentally, the entire construction is almost the same as that of the address generation unit described in the explanation on the prior art. However, in this embodiment, address cues 353, 354 are newly provided.

In the same drawing, to registers 317, 337 are initially set the minimum values of the respective X and Y directions, and to registers 316, 336 are initially set the maximum values of the respective directions. Moreover, to registers 319, 339 are respectively set the maximum values on a specific area in such an addressing mode that raster scan is carried out on the specific area, and the area is changed to one after another.

While, counters 304, 324 respectively increase addresses of the respective X and Y directions in case that the raster scan on the two-dimensional screen is executed.

Counters 305, 325 respectively increase addresses of the respective X and Y directions in case that the raster scan on the specific area is executed.

Registers 301, 302, 321, 322 respectively hold generated from external circuits (not shown).

Moreover, an adjacent access decoder (NAC) 309 generates an adjacent distance from a central point optionally designated on the screen.

An adder 306 adds values respectively held in the counter 304 or register 1 and in the counter 305, NAC 309 or register 302, and an adder 326 adds values respectively held in the counter 326 or register 321 and in the counter 325, register 322 or NAC 309.

Moreover, a bit reverse circuit 327 carries out bit reverse operation on the lower n bits of the output value from the counter 325, and the value n is decided by the value of the counter 305.

Register 303 holds the addition result of the adder 306, and register 323 holds the addition result of the adder 326 or the output value of the bit reverse circuit 327.

Besides, barrel shifters 308, 328 respectively shift the addresses held in the registers 303, 323 by a predetermined number of bits, and a barrel shifter 307 shifts the value of the register 301 or counter 304 in the same manner.

An adder 351 adds respective logic addresses of the X and Y directions produced by the above-described construction, then outputs the results as addresses (physical addresses) on the picture-image memory.

While, a register 352 holds the physical addresses outputted from the adder 351.

Moreover, the address cues 353, 354 are memories for respectively memorizing successive count values for a predetermined number of steps in the outputs of the counters 304, 324.

Incidentally, the address generation unit related to this embodiment is accommodated to various addressing modes, such as (1) two-dimensional raster mode, (2) window raster mode, (3) adjacent access mode, (4) two-dimensional indirect mode, (5) two-dimensional direct mode, (6) one-dimensional raster mode, (7) one-dimensional indirect mode, and (8) FFT mode.

Hereinafter, a case in which the addressing mode is started from the raster scan mode, then changed into the adjacent access mode, and returned to the raster scan mode is explained.

Each delay time corresponding to the number of steps of pipe line operation from the output of the counters 304, 324 to the conditional judgement is set at the address cues 353, 354. Now, assuming that the delay time is m steps, each output of the address cue 353, 354 precedes each corresponding output of the counter 304, 324 by m clocks.

In case of the raster scan mode, selectors 313, 314 select the counter 304 and register 302 respectively, then the values of the counter 304 and of the register 302 are added by the adder 306 so as to produce the logic address of the Y direction. While, selectors 333, 334 select the counter 324 and register 322 respectively, and the values of the counter 324 and of the register 322 are added by the adder 326 so as to produce the logic address of the X direction. Then, both of the logic addresses are added by the adder 351 to produce each corresponding physical address. Incidentally, the number of pipeline steps adoped in this case up to the register 352 is three. Moreover, the step number of pipeline finally required for obtaining actual conditional judgement through the processes for address output, data read and data process is m which includes the three steps for the address generation circuit. Incidentally, the cycle of address output, data read and data process is covered with several clocks according to circumstances.

When the condition is established and the addressing mode is changed, the counter value designates a value later by m clocks than the address of a data which is an object of the conditional judgement. Incidentally, the address of the object data is held in each address cue.

When the addressing mode is changed to the adjacent access mode, the register 301 is selected by the selector 313, and the NAC 309 is selected by the selectors 314, 315. Then, the values of the NAC 309 and of the register 301 are added by the adder 306 so as to generated each logic address of the Y direction. On the other hand, the selectors 333, 334 select the register 321, NAC 309 respectively, then the values of the register 321 and of the NAC 309 are added by the adder 329 so as to produce each logic address of the X direction. Thereafter, both logic addresses are added ;by the adder 351 to produce each physical address. Then, on the adjacent access mode, each of the counters 304, 324, address cues 353, 354 remains in the state of holding each value on occurrence of the conditional branch. According to circumstances, the adjacent access mode conducts pipeline operation.

Then, when the operation mode is returned to the two-dimensional raster scan mode again along the conditional branch, the selectors 355, 356 select the address cues 353, 354 respectively. Then, the values of the address cues 353, 354 are respectively loaded to the counters 304, 324, then subjected to increment. As the result, address generation is restarted from a data next to the data which is the Object of the conditional judgement on the conditional branch from the raster scan mode to the adjacent access mode.

FIG. 37 shows a time chart of the above-described operation. As seen from the same drawing, it is possible to carry out pipeline operation from the first clock to the fourth. Then, addresses respectively corresponding to the interval from the time when the counter 304 generates an address (A-4) of a data (DA-4) on occurrence of the conditional branch to the time when the conditional branch is established, that is, the interval from the fifth clock to the ninth in FIG. 37 are not used and discarded without being executed. After the change of the addressing mode by such conditional branch, meaningless data are outputted for a while. Namely, hatched portions designate such discarded or meaningless data. Moreover, in the same drawing, A-1, A-2, . . . show addresses outputted from the counter 304, B-1, B-2, . . . show addresses outputted from the NAC 309, DA-1, DA-2, . . . show data read from the addresses A-1, A-2, . . . in the external memories 383a to 383c, and DB-1, DB-2, . . . show data read from the addresses B-1, B-2, . . . in the external memories 383a to 383c.

Accordingly, by providing the address cues 353, 354 for memorizing values of the counters by the number of pipeline steps, it becomes possible to realize the pipeline operation even in the process including the conditional branch.

Incidentally, on this embodiment, though the case where the two-dimensional raster mode is changed to another address mode is explained, the present invention is not limited to the case, and it is also possible to realize such conditional branch that the window raster mode is changed to another by provising these address cues to the counters 305, 325.

As stated above, according to this embodiment, it becomes possible to carry out the pipeline operation irrespectively of establishment of the conditional branch by using a simple operation program. Therefore, it is possible to realize the high-speed process including the conditional branch.

Next, another embodiment related to the present invention is explained. That is, this embodiment includes counters and decoders for generating each X address and each Y address of a point to be accessed among eight or four adjacent points respectively corresponding to a relative distance to a point designated to be a central point from outputs of the counters, so as to generate addresses of the four or eight adjacent points by adding each X address and each Y address generated from the decoders and each X address and each Y address of the central point.

Namely, in this embodiment, each X and Y address of a point to be accessed among eight or four adjacent points respectively corresponding to a relative distance to a point designated to be a central point are generated by the counters and decoders, so as to facilitate the address generation of such adjacent points and to make simple the construction of the control program.

Figure 38:
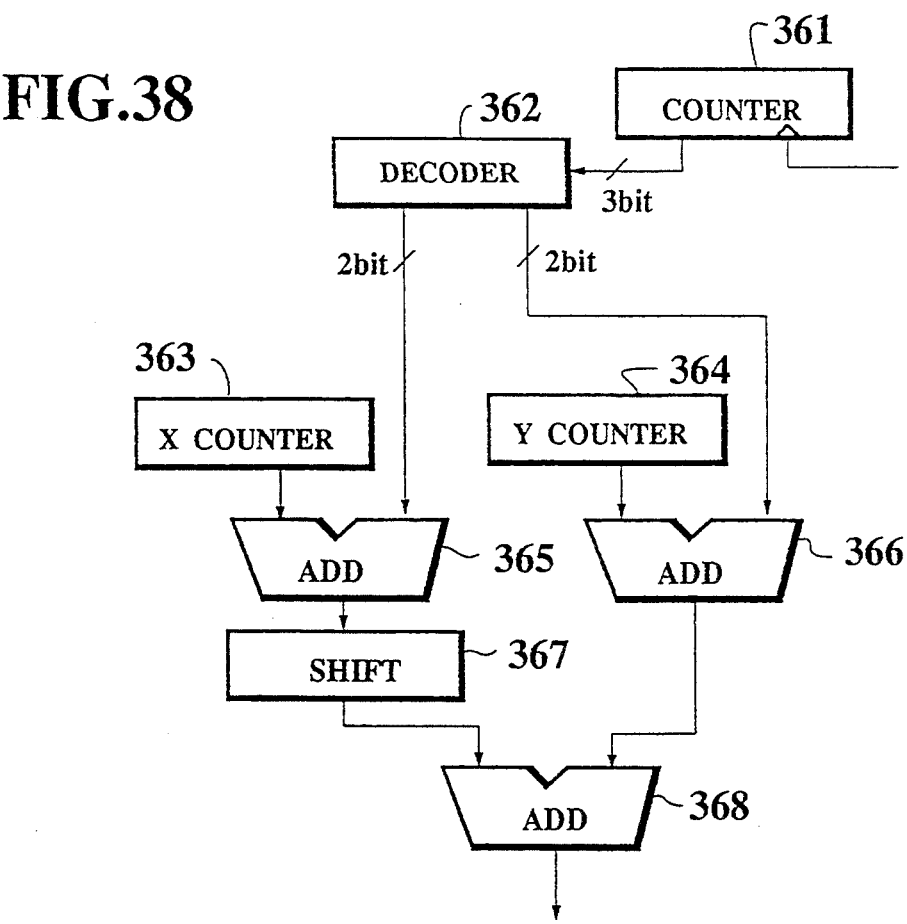
FIG. 38 is a diagram of an embodiment of an address generating circuit for generating addresses of eight adjacent points to be accessed, according to present invention.

FIG. 38 shows an example of the construction of this embodiment. In the same drawing, reference numeral 361 denotes a 3-bit binary counter for counting values of from 000 to 111 in accordance with clocks. While, 362 designates a decoder for outputting each X and Y address of a point to be accessed among eight adjacent points corresponding to a relative distance to a point designated to be a central point in the 2-bit form based on the output of the counter 361. The relative address is expressed by the complement of 2, that is, 0 is expressed by 00, 1 by 01, and −1 by 11. The truth table of the decoder is shown in Table 1.

In Table 1, X0, Y0 respectively designates the X address and Y address of the 0th bit, X1, Y1 are the X address and Y address of the first bit, and so on. The output of the decoder and the values of an X counter 363 and Y counter 364 for respectively generating or holding each X address and Y address of a point designated by a central point are respectively added by adders 365, 366, so as to form each logic address of a point to be accessed among eight adjacent points.

Moreover, each X address is so shifted by a shifter 367 as not to overlap each corresponding Y address, and added to the Y address by an adder 368 to produce each physical address. Now, assume that the combination system comprising these counters and the decoder is called an adjacent access decoder for convenience sake. Namely, according to the adjacent access decoder, it becomes possible to easily generate each address of the eight adjacent points only by inputting clocks to the counters.

TABLE 1

| Adjacent Point No. | X1 | X0 | Y1 | Y0 | C2 | C1 | C0 |
|---|---|---|---|---|---|---|---|
| (1) | 1 | 1 | 0 | 1 | 0 | 0 | 0 |
| (2) | 1 | 1 | 0 | 0 | 0 | 0 | 1 |
| (3) | 1 | 1 | 1 | 1 | 0 | 1 | 0 |
| (4) | 0 | 0 | 1 | 1 | 0 | 1 | 1 |
| (5) | 0 | 1 | 1 | 1 | 1 | 0 | 0 |
| (6) | 0 | 1 | 0 | 0 | 1 | 0 | 1 |
| (7) | 0 | 1 | 0 | 1 | 1 | 1 | 0 |
| (8) | 0 | 0 | 0 | 1 | 1 | 1 | 1 |

Figure 39:
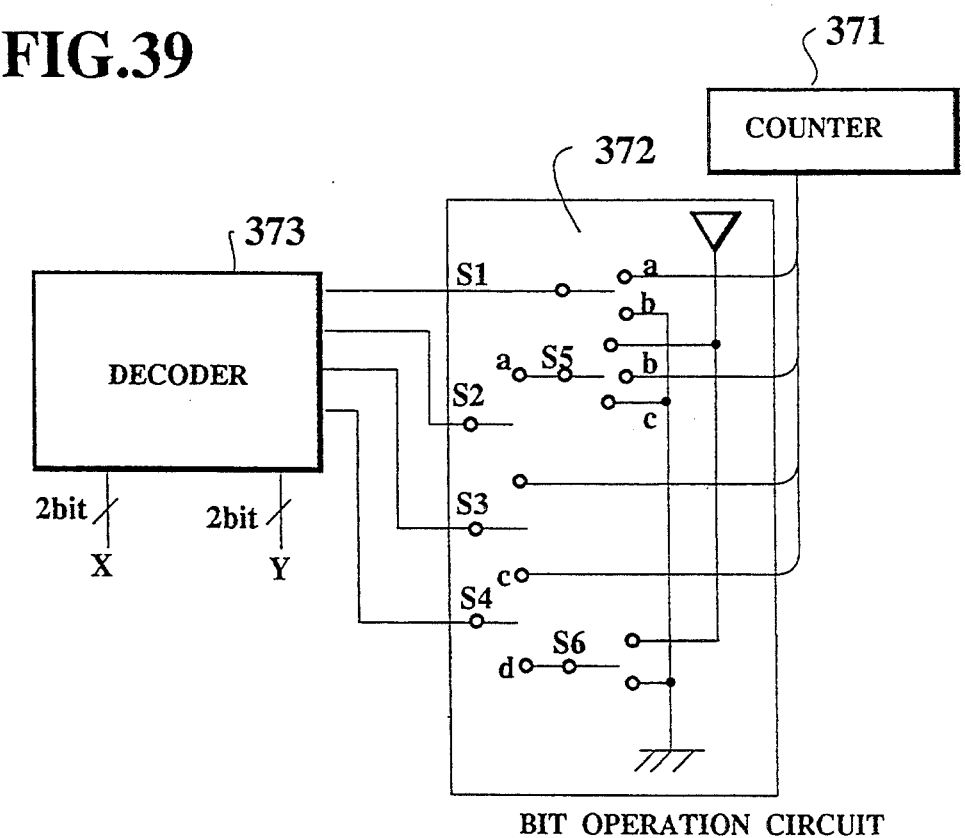
FIG. 39 is a diagram to show another embodiment of the address generating circuit concerning its adjacent access decoder, according to the present invention.

FIG. 39 shows a second embodiment of the adjacent address decoder in the address generation unit shown in FIG. 38.

Figures 40, 41:
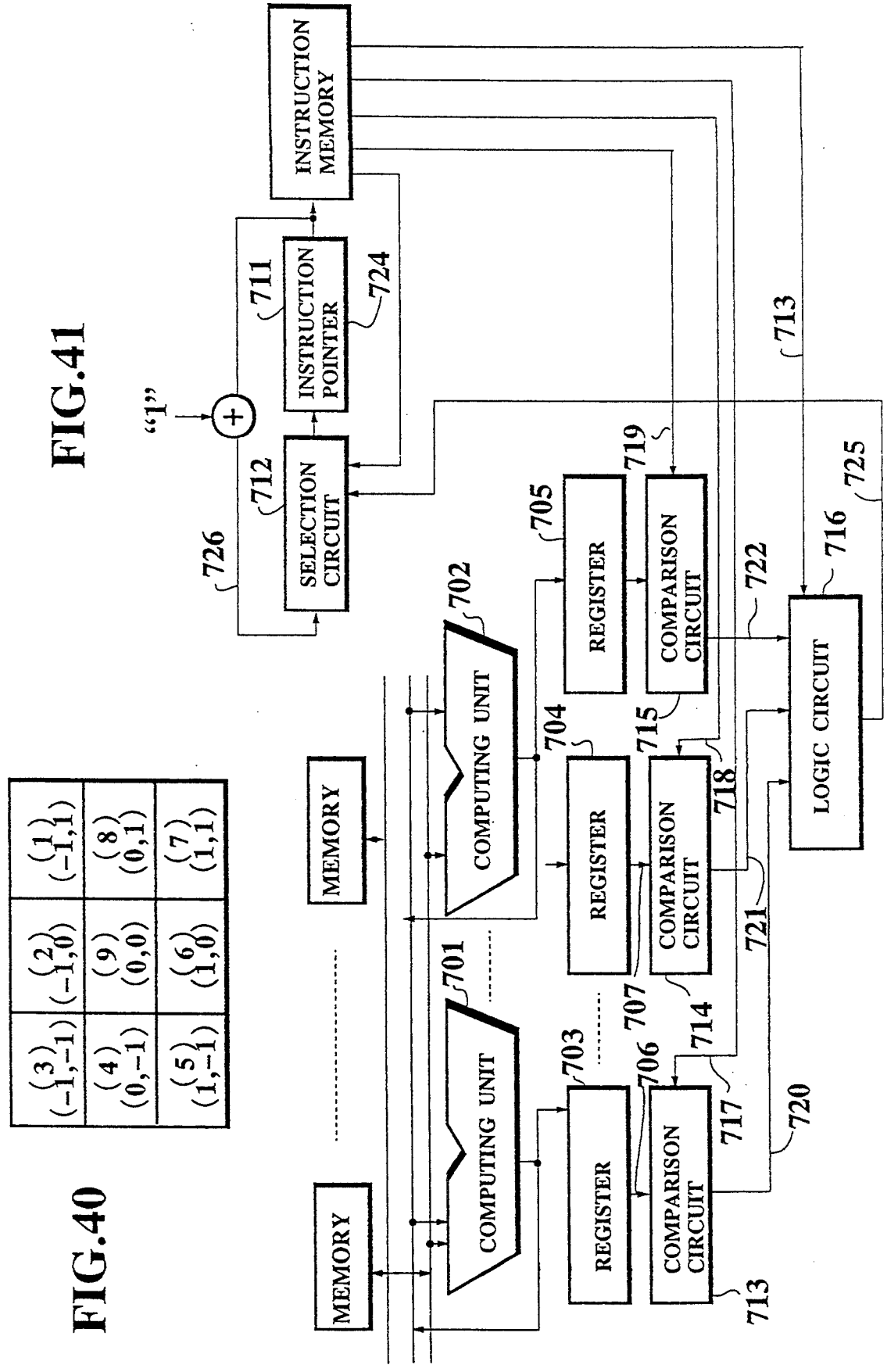
FIG. 40 is a diagram to explain the eight adjacent points in case of the embodiment shown in FIG. 39.
FIG. 41 is a block diagram to show construction of an embodiment of a parallel arithmetic operation unit of a DSP of the present invention.

The second embodiment can realize the following eight types of access-modes on four adjacent points being already scanned among nine areas (1) to (9) shown in FIG. 40.

(a) All of 3×3 areas (1) to (9)
(b) Eight adjacent points in the areas (1) to (8)
(c) Eight adjacent points already scanned in case of raster scan from the left upper to the right lower of areas (1) to (4)
(d) Eight adjacent points already scanned in case of raster scan from the right lower to the left upper of areas (5) to (8)
(e) Four adjacent points of (2), (4), (6), (8)
(f) Eight adjacent points except four adjacent points of (1), (3), (5), (7)
(g) Four adjacent points already scanned in case of raster scan from the left upper to the right lower of (2), (4)
(h) Four adjacent points already scanned in case of raster scan from the right lower to the left upper of (6), (8)

The respective combinations of these adjacent points (a) to (h) are necessary for adjacent process such as labelling, line thinning or boundary tracking.

In FIG. 39, reference numeral 371 designates a 4-bit binary counter.

While, 372 shows a bit operation circuit for carrying out bit shift on counter output and for setting a specific bit at 1 or 0. Moreover, 373 shows a decoder for outputting each X address and Y address of a point to be accessed among eight adjacent points in the 2-bit form based on output of the counter 371, and these X and Y addresses respectively correspond to a relative distance to a point designated to be a central point. Table 2 shows the relation between the counter values and the output of decoder.

TABLE 2

| Adjacent Point No. | X1 | X0 | Y1 | Y0 | C3 | C2 | C1 | C0 |
|---|---|---|---|---|---|---|---|---|
| (1) | 1 | 1 | 0 | 1 | 0 | 0 | 0 | 0 |
| (2) | 1 | 1 | 0 | 0 | 0 | 0 | 0 | 1 |
| (3) | 1 | 1 | 1 | 1 | 0 | 0 | 1 | 0 |
| (4) | 0 | 0 | 1 | 1 | 0 | 0 | 1 | 1 |
| (5) | 0 | 1 | 1 | 1 | 0 | 1 | 0 | 0 |
| (6) | 0 | 1 | 0 | 0 | 0 | 1 | 0 | 1 |
| (7) | 0 | 1 | 0 | 1 | 0 | 1 | 1 | 0 |
| (8) | 0 | 0 | 0 | 1 | 0 | 1 | 1 | 1 |
| (9) | 0 | 0 | 0 | 0 | 1 | 0 | 0 | 0 |

In case of (a), a switch S1 is connected to a, S2 to a, S3 to b, S4 to c, and S5 to b respectively. Then, the four bits of output of the counter are all inputted to the decoder. Thereafter, relative addresses respectively corresponding to the areas (1) to (9) are generated from the decoder. Then, the counter is reset when the fourth bit 1s set at 1.

In case of (b), the switch S1 is connected to b, S2 to b, S3 to b, S4 to c, and S5 to b respectively. Then, MSB of the four bits of output of the counter is fixed at 0, and 0000 to 0111 are inputted to the decoder successively and repeatedly. ;Thereafter, relative addresses respectively corresponding to the areas (1) to (8) are generated from the decoder.

In case of (c), the switch S1 is connected to b, S2 to a, S3 to b, S4 to c, and S5 to c respectively. Then, the respective third bits from MSB and LSB among the four bits of the counter output is fixed at 0, and 0000 to 0011 are inputted to the decoder successively and repeatedly. Thereafter, relative addresses respectively corresponding to the areas (1) to (4) are generated from the decoder.

In case of (d), the switch S1 is connected to b, S2 to a, S3 to b, S4 to c, and S5 to a respectively. Then, MSB is fixed at 0 and the third bit from LSB is fixed at 1 among the four bits of the counter output, and 0100 to 0111 are inputted to the decoder successively and repeatedly. Thereafter, relative addresses respectively corresponding to the areas (5) to (8) are generated from the decoder.

In case of (e), the switch S1 is connected to b, S2 to b, S3 to c, S4 to d, and S6 to a respectively. Then, MSB is fixed at 0 and LSB is fixed at 1 among the four bits of the counter output, and 0001, 0011, 0101, 0111 are inputted to the decoder successively and repeatedly. Thereafter, relative addresses respectively corresponding to the areas (2), (4), (6), (8) are generated from the decoder.

In case of (f), the switch S1 is connected to b, S2 to b, S3 to c, S4 to d, and S6 to b respectively. Then, MSB and LSB are fixed at 0 among the four bits of the counter output, and 0000, 0010, 0100, 0110 are inputted to the decoder successively and repeatedly. Thereafter, relative addresses respectively corresponding to the areas (1), (3), (5), (7) are generated from the decoder.

In case of (g), the switch S1 is connected to b, S2 to a, S3 to c, S4 to d, S5 to c, and S6 to a respectively. Then, MSB and the first bit from MSB are fixed at 0 and LSB is fixed at 1 among the four bits of the counter output, and 0001, 0011 are inputted to the decoder successively and repeatedly. Thereafter, relative addresses respectively corresponding to the areas (2), (4) are generated from the decoder.

In case of (h), the switch S1 is connected to b, S2 to a, S3 to c, S4 to d, S5 to a, and S6 to a respectively.

Then, MSB is fixed at 0 and the respective first bits from MSB and LSB are fixed at 1 among the four bits of the counter output, and 0101, 0111 are inputted to the decoder successively and repeatedly. Thereafter, relative addresses respectively corresponding to the areas (6), (8) are generated from the decoder.

Accordingly, by using the adjacent access decoder according to the second embodiment, it is possible to easily carry out address generation with respect to eight or four adjacent points or to a part thereof.

As stated above, according to the address generation unit related to this embodiment, it becomes possible to easily carry out address generation on various combinations of adjacent points and to facilitate the control program by generating each X address and Y address of a point to be accessed among eight or four adjacent points respectively corresponding to a relative distance to a point designated to be a central point by the decoder.

Next, another embodiment related to an arithmetic operation section and a control section in the DSP for processing picture-image signals is explained. Incidentally, the arithmetic operation section is a parallel arithmetic operation section.

FIG. 41 is a block diagram to show construction of the embodiment of the parallel arithmetic operation section.

The parallel arithmetic operation section in the same drawing comprises a plurality of computing units 701 to 702, flag registers 703 to 705, comparison circuits 713 to 715, a logic circuit 716, an instruction pointer 711, a selection circuit 712, and other memories and an instruction memory. Moreover, the flag registers 703 to 705 and the comparisons circuits 713 to 715 are respectively corresponding to the computing units 701 to 702.

The computing units 701 to 702 execute a plurality of operations in parallel in accordance with a plurality of conditional branch instructions given from the instruction memory.

The flag registers 703 to 705 rewrite the bit contents into contents in response to the operation result from the computing units 701 to 702.

The comparison circuits 713 to 715 respectively compare the bit contents of the flag registers 703 to 705 and the branch condition read out from the instruction memory. As the result, the comparison circuits 713 to 715 respectively judge whether or not the operation result of the computing units 701 to 702 satisfies the branch condition.

The logic circuit 716, though the detailed description on the circuit is given later on, carries out logical operations on the plurality of comparison results outputted from the comparison circuits 713 to 715. The logical operations (on logical products or logical sums) respectively correspond to the relation between the plurality of conditional branch instructions.

The selection circuit 712 selects an address in the instruction memory, at which an instruction to be executed after execution of the plurality of conditional branch instructions, in accordance with the operation result of the logic circuit 716. In more detail, the circuit 712 selects a target address given from the instruction memory or an address at which the current value of the instruction pointer 711 is increased by 1.

The instruction pointer 711 receives the address selected by the selection circuit 712, and outputs it to the instruction memory.

Moreover, in the above-described construction, the computing units 701 to 702, and registers 703 to 704, 705 compose the arithmetic operation section together, and the comparators 713, 714, 715, logic circuit 716, selection circuit 712, and instruction pointer 711 compose the control section together.

Next, the operation of this embodiment is explained.

When a plurality of conditional branch instructions are given from the instruction memory to the computing units 701 to 702, a plurality of arithmetic operations in accordance with these conditional branch instructions are executed in parallel by the computing units 701 to 702. Then, the operation results are outputted to the flag registers 703 to 705 from the computing units 701 to 702. As the result, the bit contents of the flag registers 703 to 705 are rewritten into contents corresponding to these operation results.

Then, the rewritten bit contents of the flag registers 703 to 705 are given to the comparison circuits 713 to 715 through signal lines 706 to 708.

Thereafter, by these comparison circuits 713 to 715, the branch condition given from the instruction memory through the signal lines 717 to 719 and the outputs 706 to 708 of the flag registers 703 to 705 are compared. Namely, whether or not the operation results of the computing units 701 to 702 satisfy the branch condition is judged. Then, the result is given to,the logic circuit 716 through signal lines 720 to 722.

To the logic circuit 716, with the comparison result, information for designating relation between a plurality of conditional branch instructions is given through signal lines 723 from the instruction memory. Then, in the logic circuit 716, the plurality of comparison results obtained by the comparison circuits 713 to 715 are subjected to logical operations in accordance with the relation between the plurality of conditional branch instructions. From the logical operations, a selection signal 725 to be given to the selection circuit 712 is produced.

Then, in accordance with the selection signal 725, the selection circuit 712 judges whether a target address given through a signal line 724 or a value obtained by increasing the current value of the instruction pointer 711 by 1 is decided as an input of the instruction pointer 711. In this case, if the branch condition is established, the target address given through the signal line 724 is selected as an input of the instruction pointer 711. As the result, the branch operation is carried out. On the other hand, if the branch condition is not established, a signal line 726 on which the current value of the instruction pointer 711 is increased by 1 is selected as such. As the result, the value of the instruction pointer 711 is increased by 1 instead of being rewritten into the target address.

Figure 42:
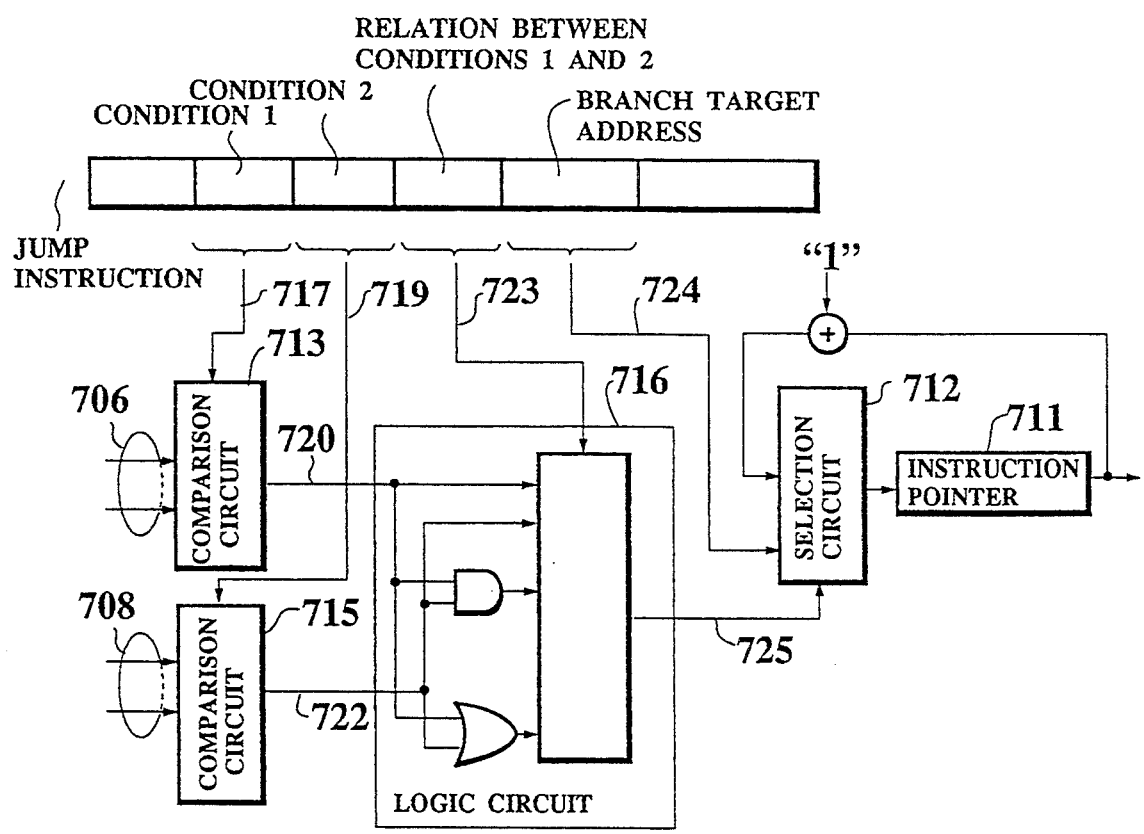
FIG. 42 is a block diagram to explain a logic circuit shown in FIG. 41 in more detail.

FIG. 42 shows the logic circuit 716 in more detail. In the same drawing, only two flag registers 703 and 705 are designated for simplification. However, it is also possible to use other construction including more flag registers.

As shown in FIG. 42, respective outputs designated by 706, 708 from the flag registers 703, 705 are inputted to the comparison circuit 713, 715. Then a signal 717 for designating a branch condition based on condition 1 and a signal 719 for designating another branch condition based on condition 2, the conditions 1, 2 being set in a jump instruction, are compared with each other, so as to judge which branch condition is satisfied. Then, the outputs 720, 722 are respectively inputted to the logic circuit 716, and a logical operation is carried out in accordance with a signal 723 for designating the relation between conditions 1 and 2 set in the jump instruction. Then, one of these outputs is selected, and the selection signal 725 to be given to the selection circuit 712 is produced. Incidentally, in this embodiment, the four cases of a logical sum, a logical product between the conditions 1 and 2, only the condition 1, and only the condition 2 are respectively shown. However, it is also possible to set other logical operations.

Then, the selection circuit 712 selects the target address set in the instruction or the value obtained by increasing the instruction pointer by 1 in accordance with the produced selection signal 725.

Next, the operation of this embodiment is explained with concrete conditional branch instructions.

Figure 43:
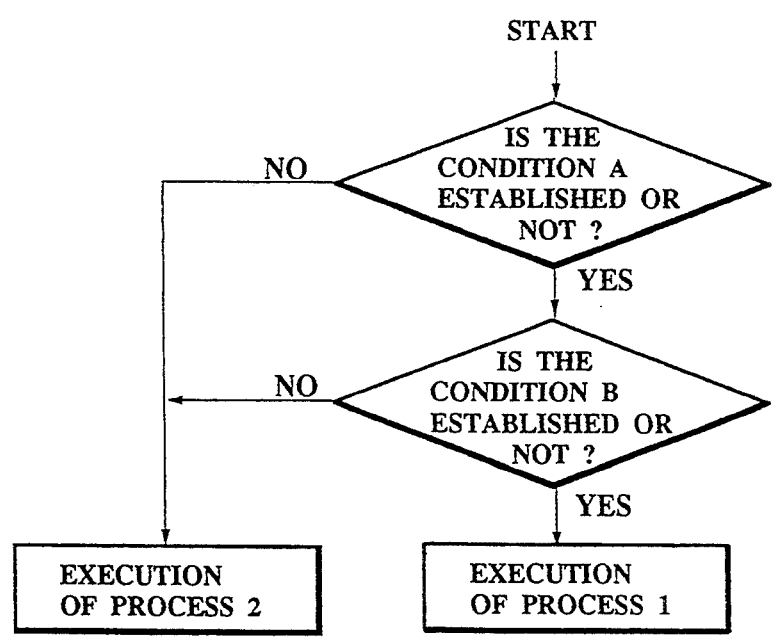
FIGS. 43, 44, 45(a) and 45(b) are process flows to respectively show conditional branch instructions for explaining the operation of an arithmetic operation section according to the present invention.

For example, consider a conditional branch instruction expressed by a process flow as shown in FIG. 43.

In case of the instruction, judgement on a condition A is carried out by a computing unit 701, a flag register 703 and a comparison circuit 713, then judgement on a condition B is carried out by a computing unit 702, a flag register 705 and a comparison circuit 715. In this case, the signal 723 to be given to the logic circuit 716 from the instruction memory expresses the logical product in accordance with the relation between the conditions A and B. As the result, in the logic circuit 716 is taken the logical product between the signals 720, 722 respectively outputted from the comparison circuits 713, 715. Then, the results outputted to the selection circuit 712. Thereafter, the selection circuit 712 selects a branch address 724 if the selection signal 725 shows that both of the conditions A and. B are satisfied. The branch address 724 is a head address of an area in which an execution program of a process 1 is set in advance in the instruction memory. Then, the instruction pointer 711 is rewritten with the head address, so that the process 1 is executed. On the other hand, if the selection signal 725 shows that at least one of the conditions A and B is not satisfied, the selection circuit 712 selects the address designating the value obtained by increasing the value of the instruction pointer 711 by 1. In this case, if an execution program of a process 2 is set in the instruction next to the conditional branch instruction, the process 2 is executed. Accordingly, in case of the conditional branch instruction as shown in FIG. 43, the process 1 is executed when both of the conditions A and B are established, while the process 2 is executed when at least one of the conditions A and B is not established.

Figure 44:
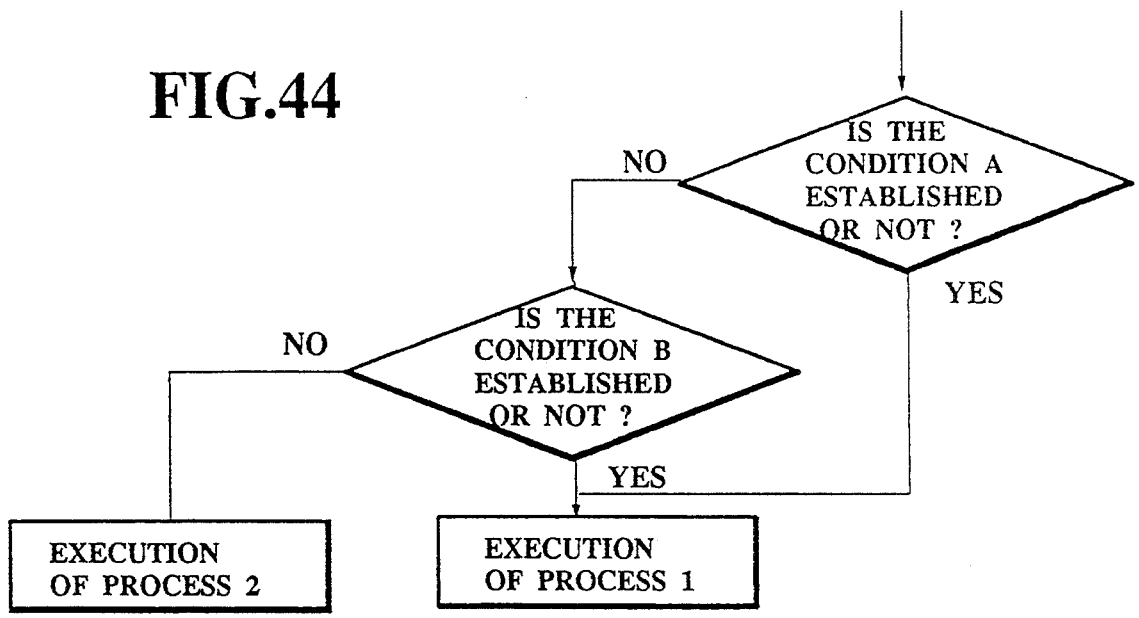

Next, another case in which another conditional branch instruction expressed by a process flow as shown in FIG. 44 is explained.

In this case, the process 1 is executed when at least one of the conditions A and B is satisfied, while the process 2 is executed when neither the condition A nor B is satisfied. In this case, in accordance with the signal 723 showing the relation between the conditions A and B, the logical sum of the conditions A and B is taken in the logic circuit 716. As a result, the conditional branch is established when at least one of the conditions A and B is satisfied, and the process 1 is executed. In the other case, the conditional branch is not established, and the process 2 is executed.

Figure 45A:
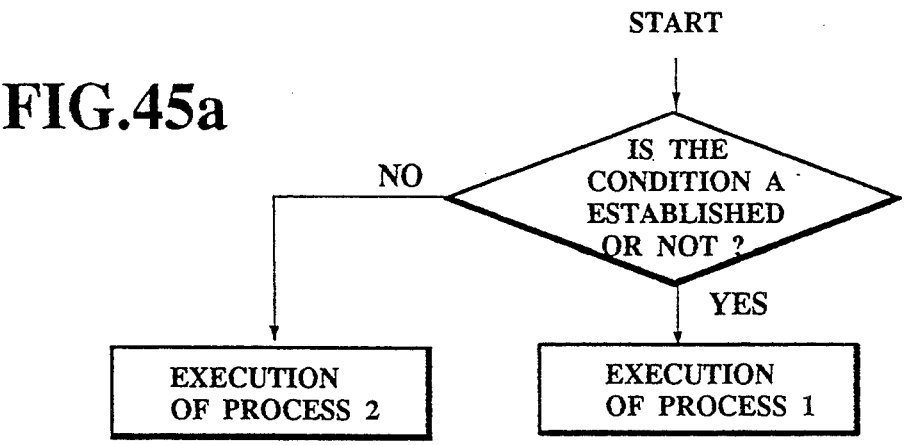

Moreover, in such a case as shown in FIG. 45a, the condition which relates to the conditional branch is only the condition A. Thus, since the condition B does not relate to the conditional branch, the signal 723 can be so formed as to express only the condition A. In the case of such an instruction, the conditional branch is established when the condition A is established, so that the process 1 is executed. However, in the other cases, the conditional branch is not established, so that the process 2 is executed.

Figure 45B:
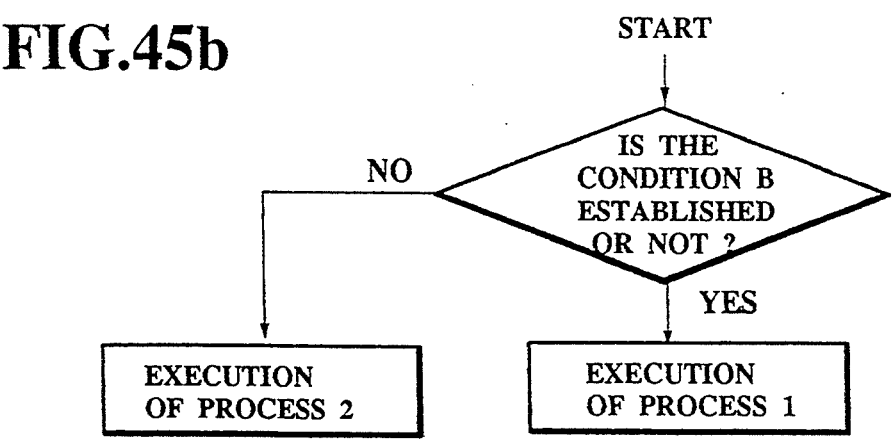

Likewise, in such a case as shown in FIG. 45b, the signal 723 is so formed as to express only the condition B. Thus, the process 1 is executed only when the condition B is established, and in the other cases, the process 2 is executed.

As stated above, according to this parallel operation device, it is possible to execute a plurality of arithmetic operations based on a plurality of conditional branch instructions in parallel by the plurality of computing units 701 to 702. Moreover, by the comparison circuits 713 to 715 and the logic circuit 716, it becomes possible to judge whether or not a plurality of branch conditions are satisfied. Accordingly, it becomes possible to fast select addresses at which are respectively set instructions after the conditional branch instructions.

Incidentally, as arithmetic operations, there can be mentioned other various logical operations than the logical sum and logical product operations.

As stated above, since the comparison circuits corresponding to the plurality of computing units, and the logic circuit for carrying out logical operations in accordance with the relation between the plurality of conditional branch instructions are provided in the parallel arithmetic operation unit of this embodiment, it becomes possible to carry out the plurality of conditional branch instructions in parallel and to immediately judge whether or not these conditions are satisfied. Therefore, also in case of execution of a program including a plurality of conditional branches, it is possible to carry out the conditional branch operation without deteriorating the operational processability.

Next, another embodiment of the control section for the DSP for processing picture-image signals is explained. In this embodiment, a specific area to which image signals to be process belong is determined based on position information for designating each position of the image signals and area information for designating the specific area, and the image signals are processed in accordance with a process method corresponding to each determined specific area.

Figure 13:
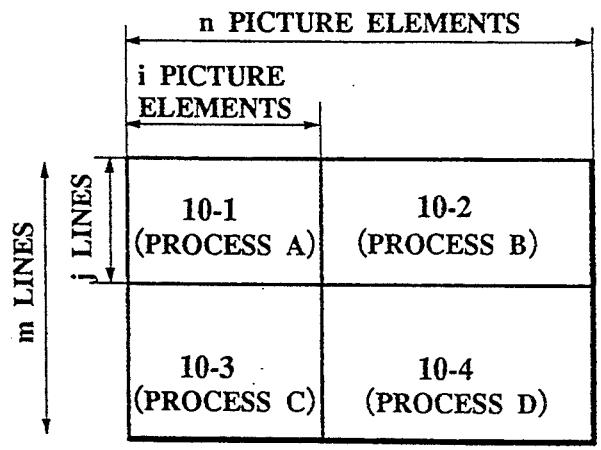
Figure 14:
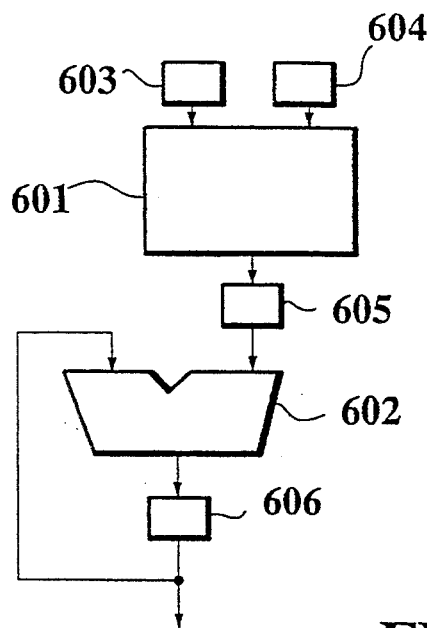
FIGS. 14 and 15 are block diagrams to respectively show conventional arithmetic operation sections for an DSP for carrying out operations on sums of products.
Figure 15:
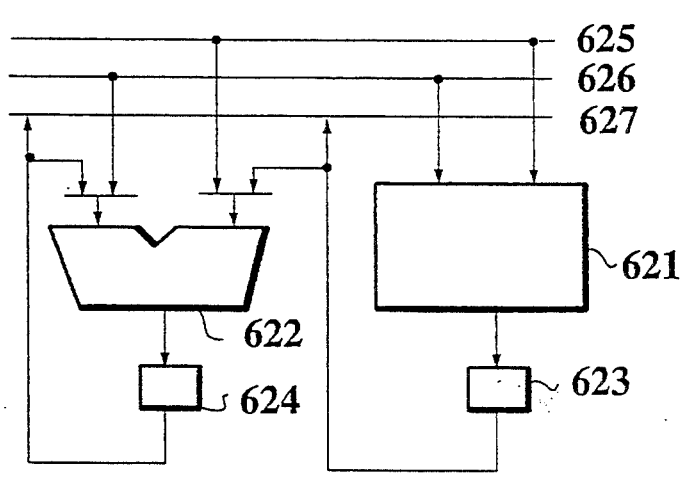
Figure 16:
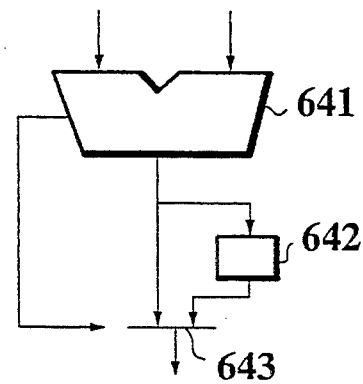
FIG. 16(a) and 16(b) are block diagram of a conventional arithmetic operation section for obtaining absolute values of respective differences.
Figure 16:
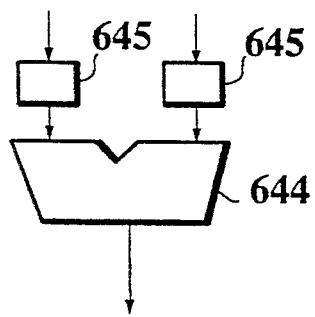
Figure 16:
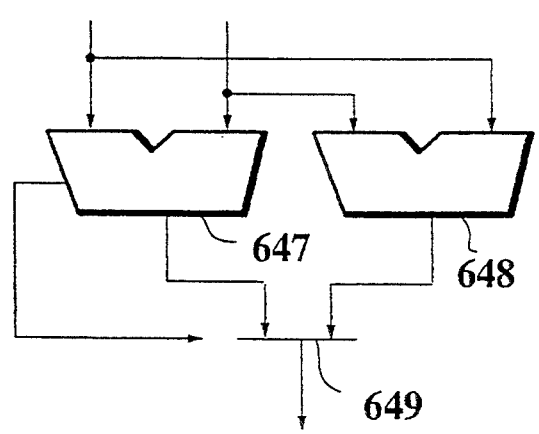
Figure 17:
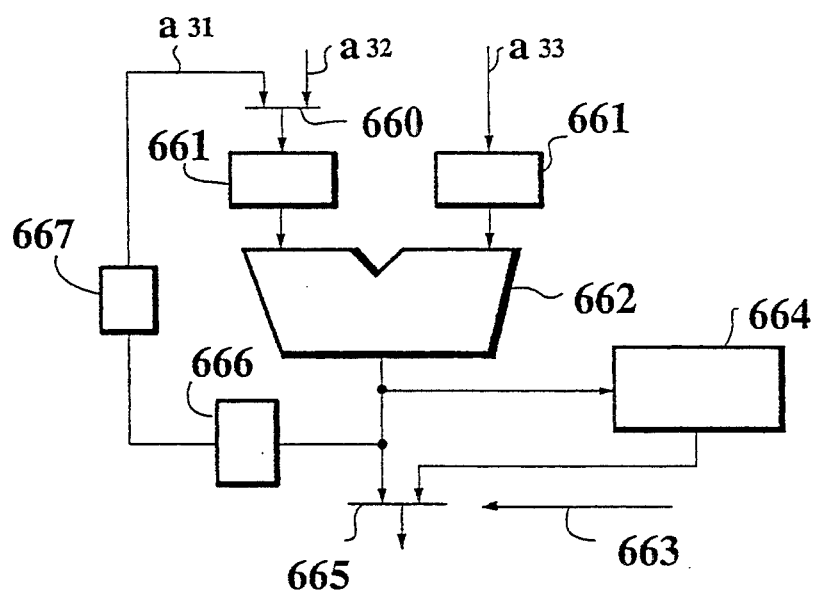
FIG. 17 is a diagram to show construction of a circuit for carrying out an overflow process of higher-one-bit extension in a conventional arithmetic operation section of a DSP.
Figure 46:
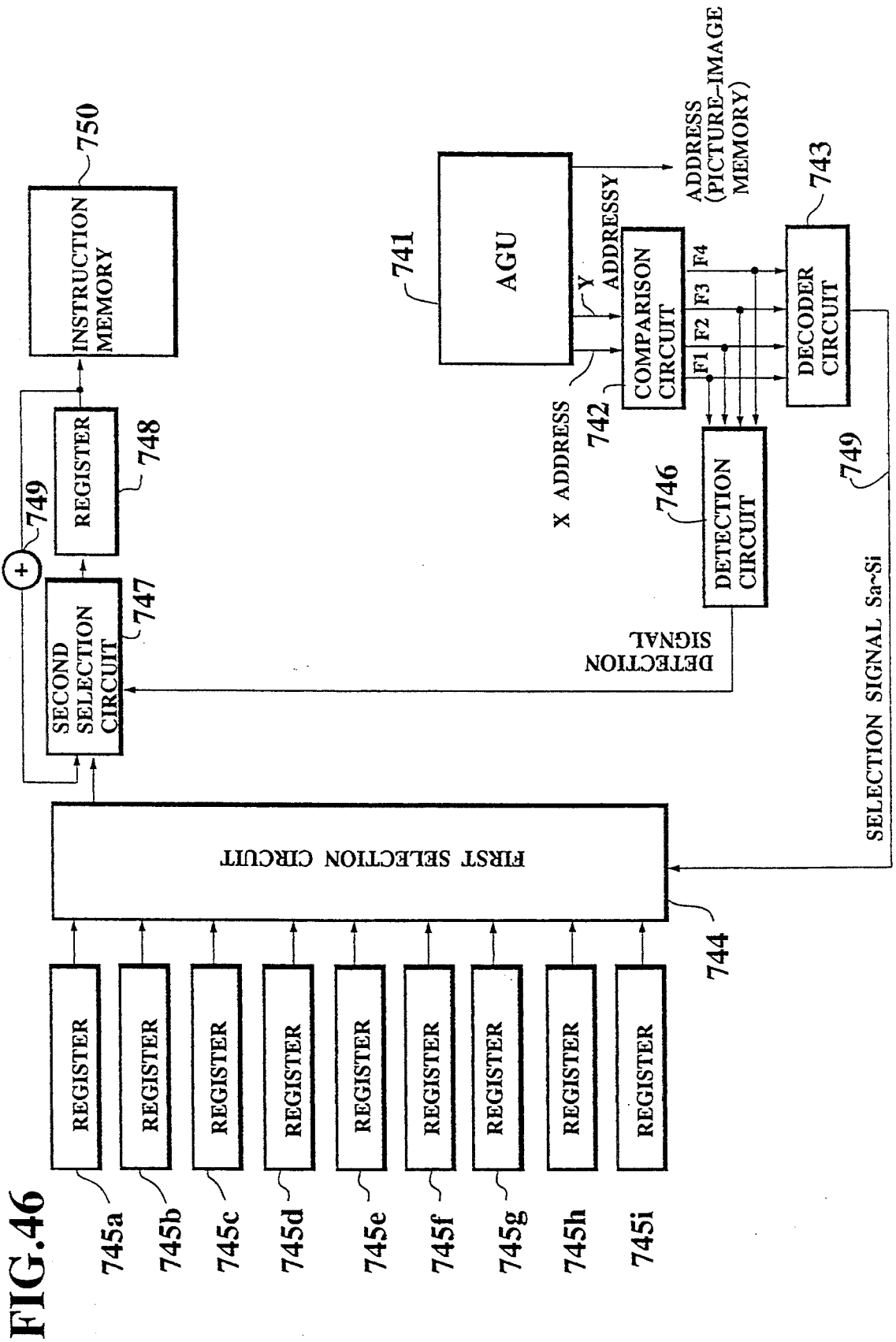
FIG. 46 is a diagram to show construction of an embodiment of a control section of the DSP for picture-image signal process according to present invention.

FIG. 46 shows a diagram to show construction of this embodiment on the control section. The control section shown in the same drawing is so constructed as to independently set picture-image process with respect to nine sections for composing the whole screen as shown in FIG. 13, and to determine a specific area to which picture-image signals read out from the image memory based on each coordinate address on the screen of each picture-image signal to be read out from the image memory and on each coordinate address showing the boundary between these sections, and to read an instruction to execute an image process method corresponding to each determined specific area, so as to carry out the process on the picture-image signals read out from the image memory in accordance with the read instruction.

In FIG. 46, a digital image signal processor (DSP) related to this embodiment comprises an address generation unit (AGU) 741, a comparison circuit 742, a decoder circuit 743, a first selection circuit 744 and registers 745a to 745i.

The AGU 741 generates each address signal for reading each picture-image signal contained in an image memory (not shown), and supplies the generated address signal to the external image memory. Moreover, the AGU 741 generates each x address and y address for showing each positional coordinate on the actual screen of each picture-image signal to be read from the image memory corresponding to the generated address signal. Then, the generated x address and y address are respectively given to the comparison circuit 742.

Moreover, as shown in FIG. 47, the comparison circuit 742 comprises four comparators 751 to 754, and four registers 2x1, 2x2, 2y1, 2y2 respectively corresponding to these comparators 751 to 754.

In this case, as shown in FIG. 48a, the screen is divided into nine sections by four boundary lines respectively designated by addresses of x1, x2, y1, y2.

Namely, returning to FIG. 47, the x1 address is set in the register 2x1, and the x2 address in the register 2x2. While, the y1 address is set in the register 2y1, and the y2 address in the register 2y2.

The comparator 751 compares an x address given from the AGU 741 with the x1 address given from the register 2x1, and outputs a first flag signal F1
 of the level "1" if the x address $\leq$ the x1 address,
 or of the level "0" if the x address $>$ the x1 address.

The comparator 752 compares an x address given from the AGU 741 with the x2 address given from the register 2x2, and outputs a second flag signal F2
 of the level "1" if the x address $\geq$ the x2 address,
 or of the level "0" if the x address $<$ the x2 address.

While, the comparator 753 compares an y address given from the AGU 741 with the y1 address given from the register 2y1, and outputs a third flag signal F3
 of the level "1" if the y address $\leq$ the y1 address,
 or of the level "0" if the y address $>$ the y1 address.

The comparator 754 compares an y address given from the AGU 741 with the y2 address given from the register 2y2, and outputs a fourth flag signal F4
 of the level "1" if the y address $\geq$ the y2 address,
 or of the level "0" if the y address $<$ the y2 address.

Among these flag signals F1 to F4 taking such logic levels, the first flag signal F1 designates the level "1" only when the x address is included in a hatched area as shown in FIG. 48b, and designates the level "0" in the other case. Likewise, the second flag signal F2 designate the level "1" only when the x address is included in hatched area as shown in FIG. 48c, and designate the level "0" in the other case. On the other hand, the third and fourth flag signals F3 and F4 designate the level "1" only when the y address is included in respected hatched areas as shown in FIGS. 48d and 48e. incidentally, such flag signals F1 to F4 are respectively given to the decoder 743.

Moreover, the decoder 743 decodes the flag signals F1 to F4 respectively given from the comparators 751 to 754, then generates selection signals Sa to Si of nine bits. The logic of the selection signals Sa to Si is set as follows with respect to these flag signals F1 to F4:

$Sa = F1 \cdot F3$, $Sb = F1 \cdot \overline{F3} \cdot \overline{F4}$, $Sc = F1 \cdot F4$, $Sd = \overline{F1} \cdot \overline{F2} \cdot F3$, $Se = \overline{F1} \cdot \overline{F2} \cdot \overline{F3} \cdot \overline{F4}$, $Sf = \overline{F1} \cdot \overline{F2} \cdot F4$, $Sg = F2 \cdot F3$, $Sh = F2 \cdot \overline{F3} \cdot \overline{F4}$, $Si = F2 \cdot F4$.

Accordingly, tile selection signal Sa designates the level "1" only when a position on the screen designated by the x address and the y address outputted from the AGU 741 is included in a hatched area A as shown in FIG. 49a, and designates the level "0" in the other case. Likewise, the respective selection signals Sb to Si designate the level "1" only when a position on the screen designated by each x address and each y address is included in each hatched area of B to I shown in FIGS. 49b to 49i, and designate the level "0" in the other case. Incidentally, these selection signals Sa to Si are respectively given to the first selection circuit 744.

Figure 50:
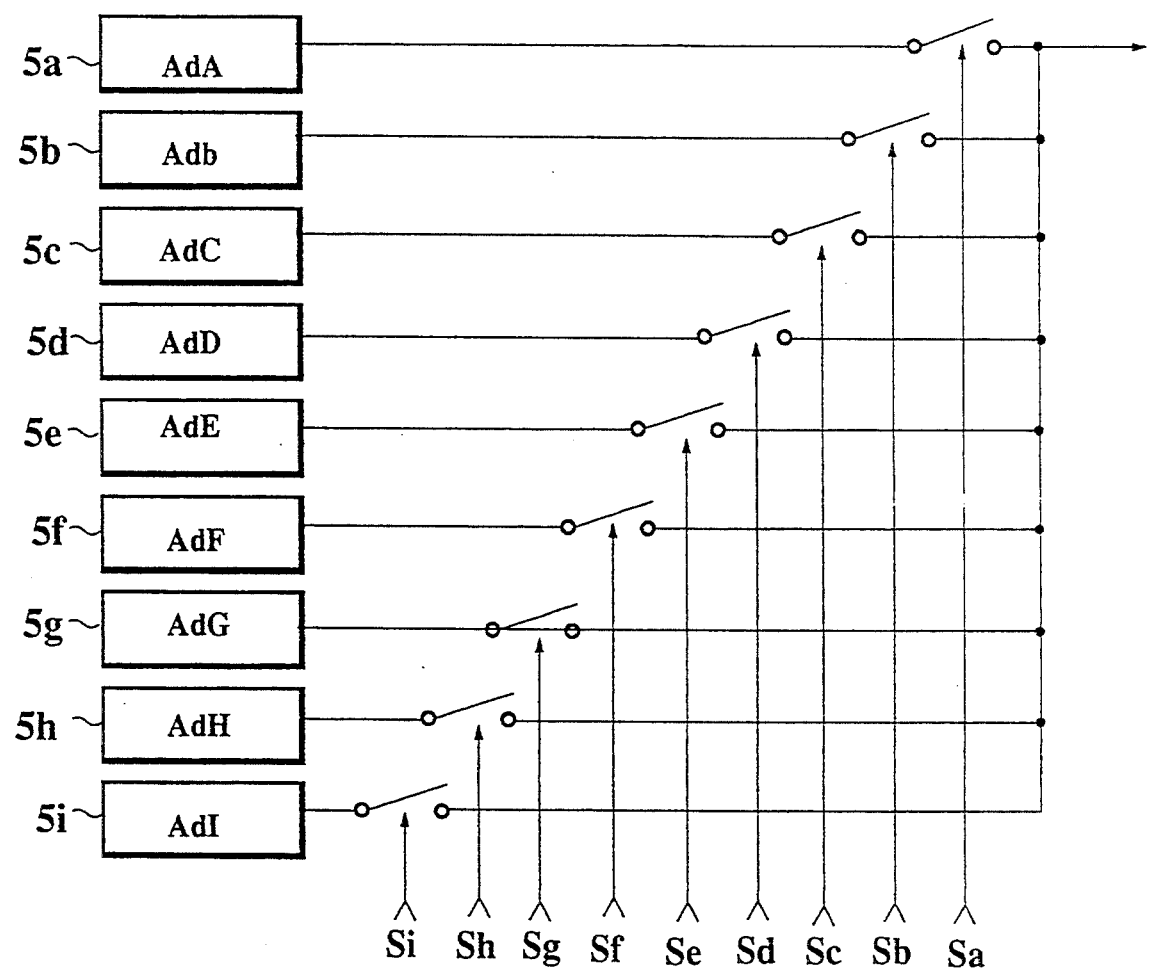

The first selection circuit 744 selects and outputs one of the contents respectively set in the registers 745a to 745i in accordance with these selection signals Sa to Si. Namely, as shown in FIG. 50, the first selection circuit 744 selects the contents, selectively being at the level "1", of the registers 745a to 745i respectively corresponding to the selection signals Sa to Si.

Figure 49:
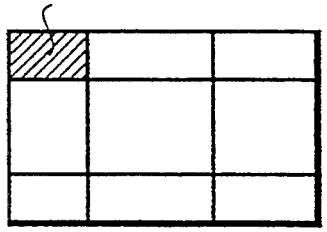
Figure 49:
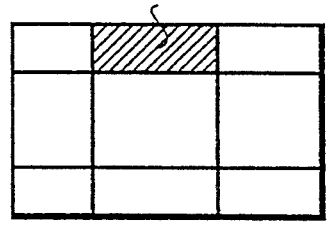
Figure 49:
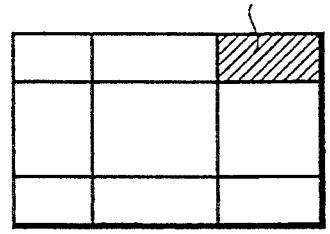
Figure 49:
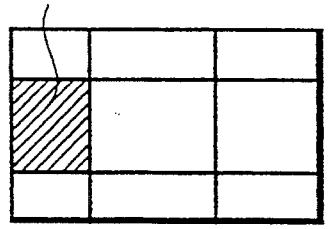
Figure 49:
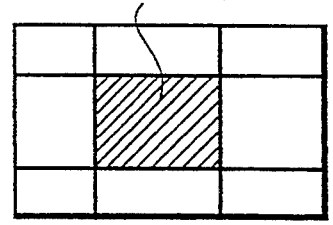
Figure 49:
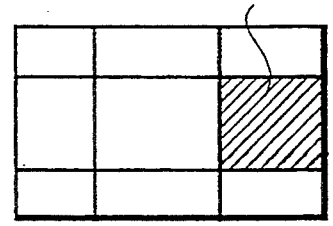
Figure 49:
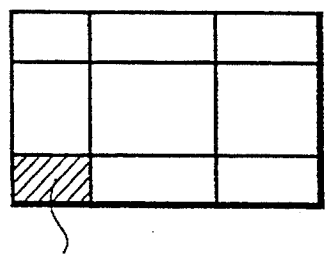
Figure 49:
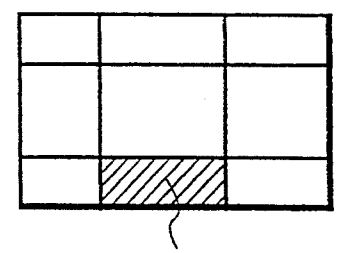
Figure 49:
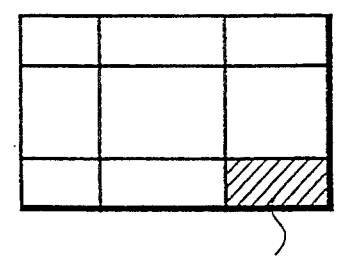

Moreover, in the registers 745a to 745i are respectively set head addresses AdA to AdI for designating respective instructions for executing each picture-image processes in the respective areas shown in FIG. 49.

Returning now to FIG. 46, the digital picture-image signal processor of this embodiment further comprises a detection circuit 746, a second selection circuit 747 and a register 748.

The detection circuit 746 receives the first to fourth flag signals F1 to F4 respectively outputted from the comparison circuit 742, and detects that each area to which belong picture-image signals to be read out based on each address outputted from the AGU 741 is transferred to another area in accordance with the change of these flag signals, so as to give a detection signal to the second selection circuit 747.

Figure 51:
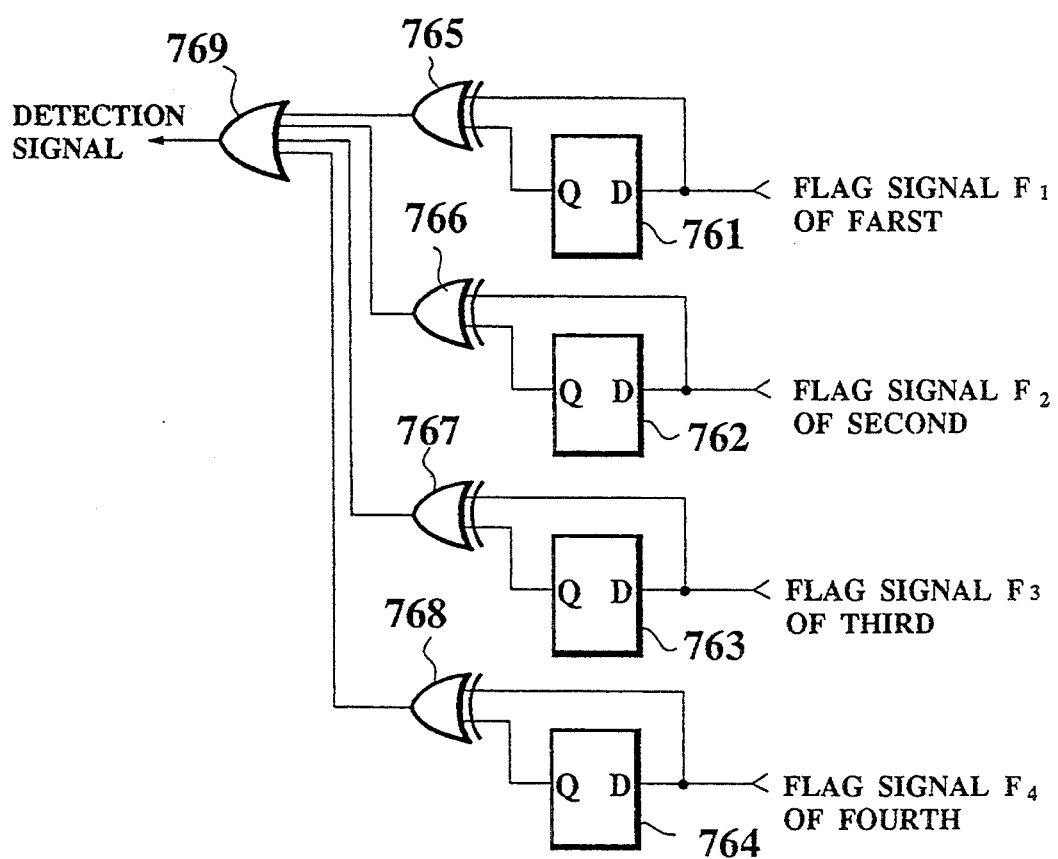

As shown in FIG. 51 in more detail, the detection circuit 746 comprises D-type F/F's (flip-flops) 761 to 764 for receiving the first to fourth flag signals F1 to F4 as inputs (D), exclusive logical-sum (EX-RR) gates 765 to 768 for receiving the respective outputs (Q) of the F/F's 761 to 764 and the first to fourth flag signals F1 to F4, and a logical-sum (OR) gate 769 for receiving the respective outputs of these EX-OR gates 765 to 768.

In such construction, these flag signals F1 to F4 are respectively delayed by a predetermined time unit in which each address outputted from the AGU 741 is changed by the respective F/F's 761 to 764, then the exclusive logical sum of each delayed flag signal (corresponding to each previous address) and the corresponding current flag signal is calculated. As the result, when the delayed flag signal and the current flag signal are the same, each output of the EX-OR gates 765 to 768 is the level "0", and when different, the output is the level "1".

Namely, when both of these signals are the same, the specific area to which belongs each picture-image signal read out based on each address outputted from the AGU 741 is not changed. While, when both of these values are different, the specific area to which the picture-image signal belongs is shifted. Accordingly, the shift of the specific area corresponding to the picture-image signal to be read out is detected when the output of at least one of the EX-OR gates 765 to 768 is the level "1", and the output of the OR gate is also the level "1".

For example, when the specific area corresponding to the picture-image signal to be read out is shifted from the section A to the section B, the level of the third flag signal F3 is changed from "1" to "0". As the result, the output of the EX-OR gate 767 for outputting the exclusive OR of the value "1" of the flag signal F3 set in the F/F 763 before the shift and the value "0" of the flag signal after the shift becomes the level "1", so that the shift of the specific area is detected.

The second selection circuit 747 selects an address obtained by adding "1" through the adder 749 to a head address given to one of the registers 745a to 745i and selected by the first selection circuit 744 or to an address value currently accessing the instruction memory 750 containing an instruction for executing image process on each of the sections A to I, in accordance with a the detection signal given from the detection circuit 746. Namely, the second selection circuit 747 selects the head address selected by the first selection circuit when the detection signal is the level "1", while selects the address outputted from the adder 749 when the detection signal is the level "0". Then, the selected address is set in the register 748, and given to the instruction memory 750.

Next, the operation of this embodiment is explained.

When a read address is outputted from the AGU 741 to read a picture-image signal corresponding to a picture image to be processed from the picture-image memory, together with the output of this address, an x address and y address for designating a position on the screen of the picture-image signal to be read by this address are given to the comparison circuit 742 from the AGU 741.

Among these x and y addresses given to the comparison circuit 742, the x address is compared with the x1 address and x2 address for designating the boundary lines for deciding the respective sections on the screen by the comparators 751,752, respectively. While, the y address is compared with the y1 address and y2 address by the comparators 753, 754 respectively.

Then, the respective comparison results are given to the decoder circuit 743 from the comparators 751 to 754 as the flag signals F1 to F4.

Thereafter, the flag signals F1 to F4 given to the decoder circuit 743 are respectively decoded into any one of the selection signals Sa to Si of nine bits having the level "1" based on the above-described logics. Because each of these selection signals Sa to Si is corresponding to each of the sections A to I to which belongs a picture-image signal designated by the x address and y address, the specific area relating to then picture-image signal is included in each of these sections A to I corresponding to the selection signal having the level "1". Then, such a selection signal is given to the first selection circuit 744.

When the selection signal reaches the first selection circuit 744, a head address contained in a register corresponding to the selection signal of the level "1" is selected among the registers 745a to 745i by the first selection circuit 744. Namely, the head address in the instruction memory for designating the instruction for executing the image process on the specific area corresponding to the picture-image signal designated by the x address and y address outputted from the AGU 741 is selected. Then, the selected ! head address is given to the second selection circuit.

On the other hand, the first to fourth flag signals F1 to F4 outputted from the comparators 751 to 754 of the comparison circuit 742 are also given to the detection circuit 746. Then, these flag signals F1 to F4 given to the detection circuit 746 are respectively compared with the previous flag signals F1 to F4 given thereto before a predetermined time unit. As the result, it can be judged whether or not the specific area to which belongs the picture-image signal corresponding to the currently outputted x address and y address is the same as another specific area to which belongs a picture-image signal read out just before the current picture-image signal.

When these specific areas are different, a detection signal of the level "1" is given to the second selection circuit 747. As a result, the head address selected by the first selection circuit 744 is selected by second selection circuit 747, and set in the register 748, then given to the instruction memory 750 therefrom. Accordingly, when the specific area corresponding to the picture-image signal designated by the x and y addresses outputted from the AGU 741 is shifted, the head address of an instruction for executing the image process on the shifted specific area is supplied to the instruction memory 750, then the Instruction designated by the head address is executed successively, so as to carry out the image process to be executed on the shifted specific area in accordance with the picture-image signal having been read out.

On the other hand, when the specific area is not shifted, a detection signal of the level "0" is given to the second selection circuit 747. In such a case, an address value obtained by adding "1" to an address value having been set in the register 748, that is, an address value for designating an instruction to be executed next to an instruction having been already executed is selected by the second selection circuit 747, and set in the register 748, then outputted to the instruction memory 750. Accordingly, when the specific area corresponding to the read picture-image signal is not shifted, a series of programs having been already executed is continued as such, so as to carry out the same image process as that having been carried out.

Accordingly, when different image processes are carried out at different positions on the screen designated by each picture-image signal, it is possible to carry out the image processes without calculating the order or the number of times of these processes. Therefore, it becomes possible to easily prepare the procedure for realizing such image process without much difficulty. Moreover, since the computing units provided in the execution unit (EU) for actually carrying out the image process are used not for the control of the procedure of such image process but only for the original image process, the processability on the image process is never deteriorated.

Next, another embodiment of the control section of the DSP is explained.

Figure 52:
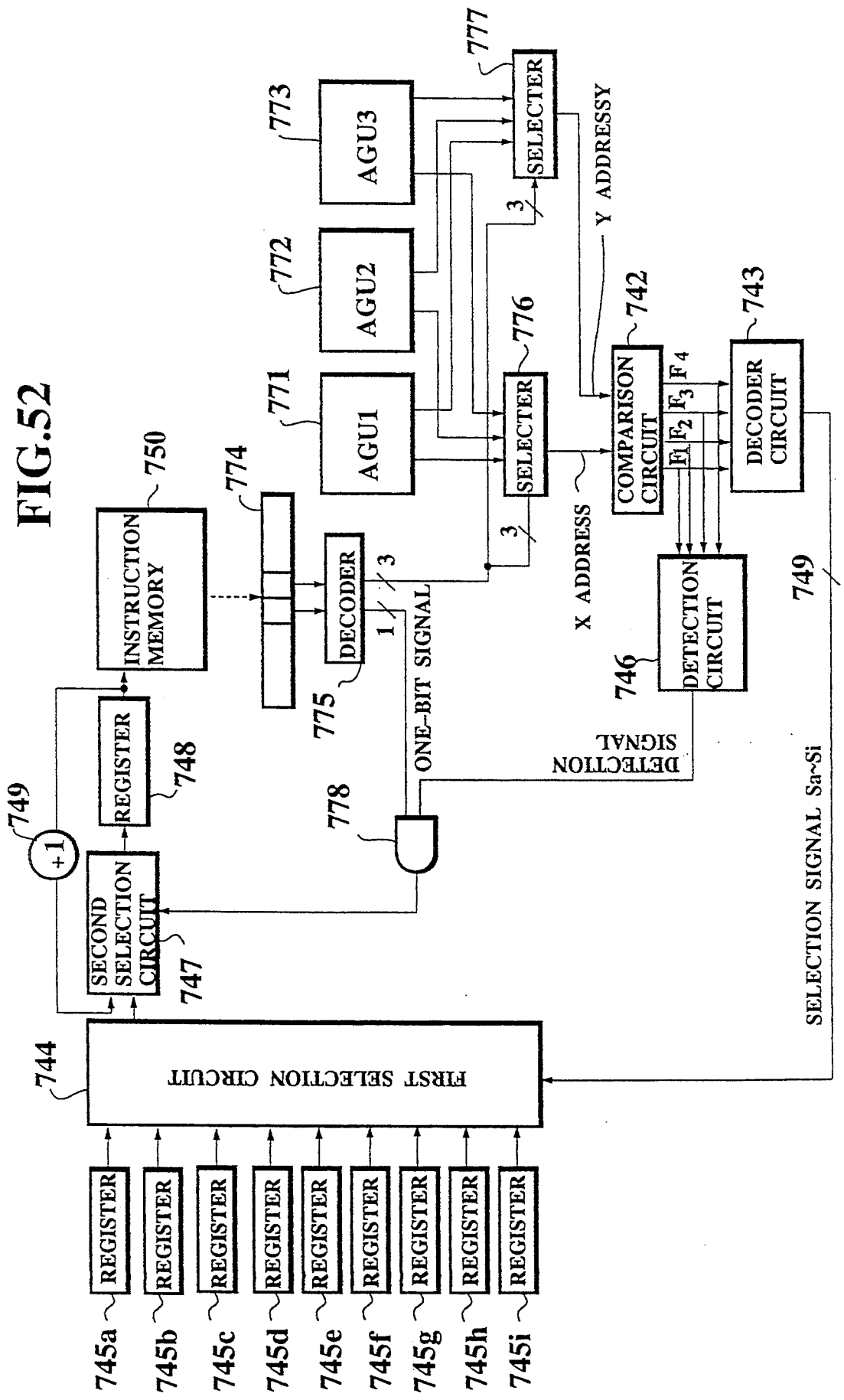
FIG. 52 is a diagram to show construction of another embodiment of the control section according to the present invention shown in FIG. 46.

FIG. 52 is a diagram to show construction of this embodiment. The feature of this embodiment is that a plurality of AGU's 771, 772, 773 are used as compared with the above-mentioned embodiments, and that it becomes easy to process the case where the procedure of the image process is not required to be changed to each section on the screen. Incidentally, in FIG. 52, the parts designated by the same reference numerals or reference characters have the same functions as those shown in FIG. 46, so that the explanation on them is omitted here.

In the same drawing, to achieve the above-mentioned feature, an addresses comprising an x address and a y address is selected by selectors 776, 777 from three addresses outputted from the AGU's 771 to 773 under control of a 3-bit selection signal obtained by decoding a 2-bit control bit provided in an instruction 774 read out from an instruction memory 750, then the selected address is given to a comparison circuit 742.

By setting a one-bit signal obtained by decoding a control bit by the decoder 775 at the level "0" by controlling the selection operation of a second selection circuit 777 based on output from an AND gate 778 to which are inputted the one-bit signal and a detection signal outputted from a detection circuit 746, the same image process is realized irrespectively of the values of the detection signal or of the shift of the specific area.

Also in this embodiment, it is possible to obtain the same effect as in the previous embodiment.

Incidentally, in either of these embodiments, by respectively changing the addresses to be set in the registers 2x1, 2x2, 2y1, 2y2 in the comparison circuit 742, and the addresses to be set in the registers 745a to 745i, it becomes possible to set various image process modes on each specific area as shown in FIG. 49.

For example, by setting the minimum x address on the screen in the register 2x1, the maximum x address on the screen in the register 2x2, the minimum y address on the screen in the register 2y1, and the maximum y address on the screen in the register 2y2, and setting a head address, for designating an instruction for executing the image process in the screen in the register 745e, and setting another head address for designating an instruction for executing another process to be executed when the addresses outputted from the AGU's are out of the screen, in the registers 745a to 745d, and 745f to 745i, it becomes possible to easily realize the image process when addresses based on the affine transform and the like are out of the screen.

As stated above, according to this embodiment, since a specific area to which belongs an image signal to be processed is judged from position information for designating a position of the image signal and information for discriminating the specific area, and the image signal is processed in accordance with an image process method corresponding to the judged specific area, it becomes possible to provide a picture-image signal processor which can make easy the procedure of processing picture images in accordance with a processing method corresponding to each position on the screen based on image signals without deteriorating the processability.

Next, an embodiment related to a method of constructing a microinstruction which can perform excellent operational control by selecting driving operations exclusive to one another even in a processor including a plurality of buses, computing units and register files, and can realize a convenient programming.

Figure 53:
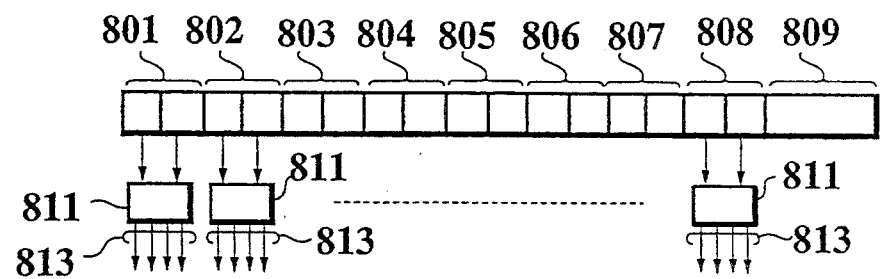
FIG. 53 is a diagram to show construction of an embodiment of a method of constructing a micro-instruction for the DSP according to the present invention.

FIG. 53 is a diagram to show construction of an embodiment related to the method of constructing a microinstruction.

Figure 54:
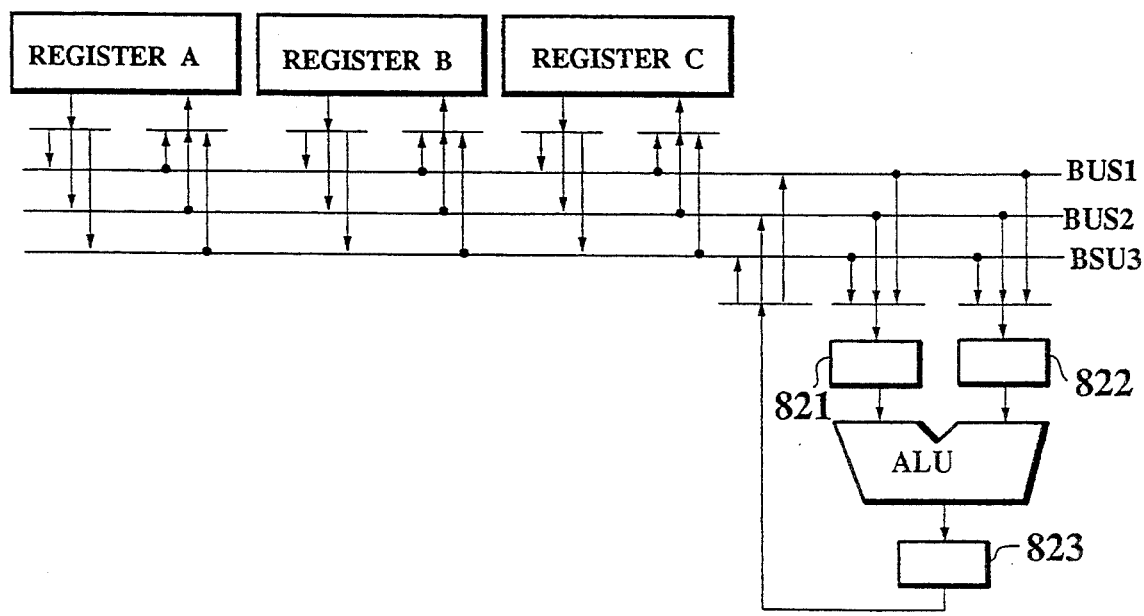
FIG. 54 is a block diagram to show construction of a processor for explaining the present invention.

Here, a processor as shown in FIG. 54 is used for explanation. As shown in the same drawing, the processor comprises registers A to C, an ALU (arithmetic and logical computing unit), buses (BUS) 1 to 3, and registers 821 to 823. Incidentally, the registers 821 to 828 are registers used for pipeline construction.

Moreover, in a microinstruction shown in FIG. 53 are set a plurality of fields 801 to 808 respectively composed of bits and a field 809 composed of several bits.

Each of these fields 801 to 808 corresponds to each input of the respective constructional elements shown in FIG. 54. For example, the field 801 corresponds to the input of the register A, the field 802 to the input of the register B, the field 803 to the input of the register C, the field 804 to the input of the BUS 1, the field 805 to the input of the BUS 2, the field 806 to the input of the BUS 3, the field 807 to the input of the register 821 and the field 808 to the input of the register 822. Incidentally, the field 809 is a field in which the operation designation of the ALU is carried out, so that it is defined as an ALU operation designation field 809. Therefore, this microinstruction is constructed with 16 bits and the ALU operation designation field 809.

Moreover, to these fields 801 to 808 are respectively arranged decoder 811. Accordingly, each 2 bits of the fields 801 to 808 is decoded by each decoder 811, and from each decoder 811 are outputted four kinds of microoperation signals 813 respectively corresponding to four combinations of the 2 bits. Moreover, to these microoperation signals 813 are respectively allocated the inputs of the respective constructional elements.

Incidentally, the ALU operation designation field 809 may be coded in the same manner as the fields 801 to 808, or may be driven by a direct control method in which each bit corresponds to each input of these constructional elements.

FIG. 55 shows relations between four kinds of codes in the respective fileds 801 to 808 and the inputs of the corresponding constructional elements.

For example, the following codes are allocated to the field 801 to the input of the register A:
00: BUS 1
01: BUS 2
10: BUS 3
11: No connection While, to the field 804 corresponding to the input of the BUS 1 are allocated the following codes:
00: Register A
01: Register B
10: Register C
11: Register 203

Next, the operation of a processor using such a microinstruction is explained.

A data contained in the register A is transferred to the registers B and 821. (Step 1)

Then, a data contained in the register C is transferred to the register 822. (Step 2)

Finally, a data contained in the register 823 is transferred to the register A. (Step 3)

In this case, the BUS 1 is used for the Step 1, the BUS 2 is used for the Step 2, and the BUS 3 is used for the Step 3.

To realize this operation, the fields 801 to 808 of the microinstruction are respective set as follows:
Register A input field: BUS 3
Register B input field: BUS 1
Register C input field: No connection
BUS 1 input field: Register A
BUS 2 input field: Register C
BUS 3 input field: Register 203
821 Register input field: BUS 1
822 Register input field: BUS 2

FIG. 56 shows a manner of signal propagation of the processor when the microinstruction is constructed as described above. As understood from the same drawing, the data transfer from one register, for example the register A, to a plurality of registers, for example the registers B, 201, becomes possible only by designating respective inputs of the registers and BUS's.

As explained above, according to this embodiment of the method of constructing the microinstruction, there are provided instruction fields which are respectively coded based on the respective constructional elements of a processor. Therefore, only by designating the respective constructional elements with codes in the respective fields, it becomes possible to realize high-speed parallel operation of a processor. Moreover, the programming can be made by a simple method of designating only the constructional elements of the processor.

Next, another embodiment of the control section of the DSP for reducing the description amount by omitting program description on instructions previously used.

Figure 57:
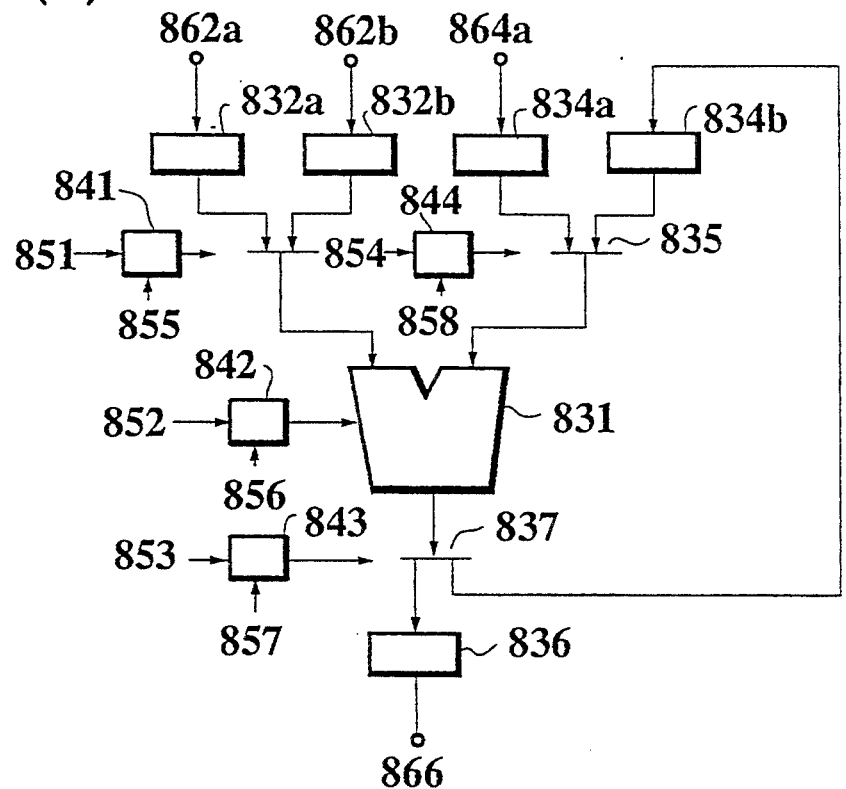
FIG. 57(a) and 57(b) are block diagram to show construction of an embodiment related to a control section of the DSP according to the present invention.
Figure 57:
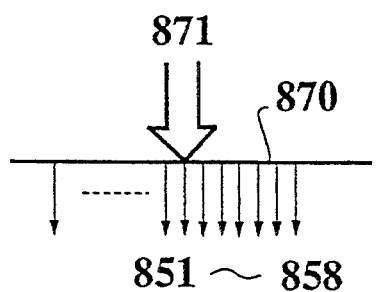

FIG. 57a is a block diagram to show construction of an embodiment related to the control section of the DSP, and FIG. 57b is a diagram schematically showing a group of control signals for controlling a digital information processor (hereinafter, called processor).

In FIG. 57a, the digital information processor comprises an ALU (Arithmetic and Logical operation unit) 831, input registers 832a, 832b, 834a, 834b, selectors 833, 835, an output register 836, a multiplexer 837, and state control registers 841 to 844. Incidentally, in this embodiment, the ALU can be replaced by a multiplier.

The ALU 831 has two input terminals being respectively connected to the output terminal of the selector 833 for selecting the input registers 832a, 832b, and to the output terminal of the selector 835 for selecting the input registers 834a, 834b. The ALU 831 has one output terminal which is connected to the input terminal of the multiplexer 837 for selecting the output register 836 and the input register 834b. Moreover, the respective input sides 862a, 862b, 864a of the input registers 832a, 832b, 834a, and the output side 866 of the output register 836 are respectively connected to other parts not shown but contained in the processor or to the input and output terminals of the processor.

Also, to the ALU 831, selectors 833, 835 and multiplexer 837 are respectively arranged the state control register 841 to 844.

On the other hand, an input terminal 870 for instruction signals shown in FIG. 57b is connected to the output terminal of an instruction memory or instruction decoder contained in the processor. From the input terminal 870, a plurality of bit rows 851 to 858 respectively contained in a control signal are outputted. Among them, the bit rows 851, 853, 854 are state control signals used as instructions to the selector 833, multiplexer 837, selector 835, and the bit row 852 is a state control signal used as an instruction to the ALU 831. Moreover, the bit rows 855 to 858 are used as switch signals for selecting a writing mode in which these state control signals 851 to 854 are set in the state control registers 841 to 844, or a holding mode in which the setting is prohibited.

Namely, the state control registers 841, 843, 844 respectively receive or do not receive the state control signals 851, 853, 854 in accordance with the control of the signals 855, 857, 858, and output signals for controlling the states of the selectors 833, 835, and multiplexer 837. On the contrary, the selectors 833, 835 and multiplexer 837 respectively carry out rewriting or holding of their states in accordance with these control signals. Likewise, the state control register 842 receives or does not receive the state control signal 852 in accordance with the signal 856, and outputs a signal for controlling the state of the ALU 831. Namely, the ALU 831 rewrites or holds its state in accordance with the control signal.

Figure 58:
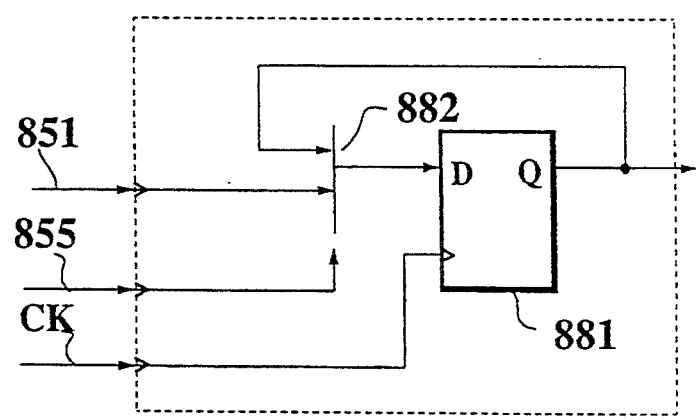
FIG. 58 is a diagram to explain in more detail a state control register shown in FIG. 57.

FIG. 58 shows the state control register 841 in representatively more detail for explaining these state control registers 841 to 844.

in the same drawing, the state control register 841 comprises a m-bit flip-flop 881 and a selector 882. Moreover, an input terminal for inputting a state control signal 851, a switch signal 855, and a clock signal ck, and an output terminal for outputting a control signal to be given to the selector 833 are provided.

In the writing mode, the selector 882 is so switched by the switch signal 855 as to connect the state control signal 851 to a D input terminal of the flip-flop 881. While, in the holding mode, the selector 882 is so switched by the switch signal 855 as to connect a Q output signal (control signal to the selector 833) of the flip-flop 881 to the D input terminal. As the result, the previous state control signal 851 can be held and outputted to the selector 833.

Next, the operation of the processor according to this embodiment is explained.

When the control signal 871 is inputted to the instruction signal input terminal 870, instructions are transmitted over all of parts not shown and contained in the processor. Among these constructions, the bit rows concerning the ALU 831 are inputted to the input terminals of the state control registers 841 to 844 as the state control signals 851 to 854 and the switch signals 855 to 858. In this case, when the switch signals 855 to 858 are in the writing mode, the state control signals 851 to 854 inputted to the respective input terminals are outputted, while when in the holding mode, the state control signals 851 to 854 having been outputted in the previous instructions are outputted.

Next, examples of the instruction fields used in this embodiment are explained with reference to FIGS. 59 and 60.

In the instruction field shown in FIG. 59, there are provided fields 892 for setting the states as well as fields for switching the state rewriting/holding modes. Moreover, when an instruction is set in these instruction fields, the instruction is described only in the state setting field 892 concerning instructions different from the previous ones, while in the other state setting field 892 concerning instructions the same as the previous ones, only bit information for showing the holding mode is described in the mode switching field 891 corresponding to such a field 892.

While, in the instruction field shown in FIG. 60, the holding mode is taken only when another state setting field 893 is set into a combination of specific bit patterns (for example all 0).

As stated above, according to the digital information processor of this embodiment, only by adding one switch signal input terminal to the state control register, it becomes possible to execute an instruction the same as the previous one independently by each part without describing the same instruction on every instruction cycle.

FIG. 61 shows an assembler program to be described in case that this embodiment is adopted. As shown in the same drawing, it is necessary to describe instructions the same as the previous ones, and only different instructions are described. As compared with conventional assembler programs, the description amount of this case is reduced to about 50%.

As explained above, according to this embodiment, the program description on instructions the same as the previous ones can be omitted. .Therefore, it becomes possible to greatly reduce the amount of program description and to simplify the program description without lowering the process speed and elevating the production cost.

Next, there is explained an embodiment of an arithmetic operation section of a DSP. In this embodiment, the multiplication accuracy on the operation for obtaining sums of products can be kept, and these circuits are not wasted even in case of other arithmetic operations than that for obtaining sums of products. Moreover, it is also possible to realize high-speed operations for obtaining absolute values of respective differences without increasing the circuit scale.

Figure 62:
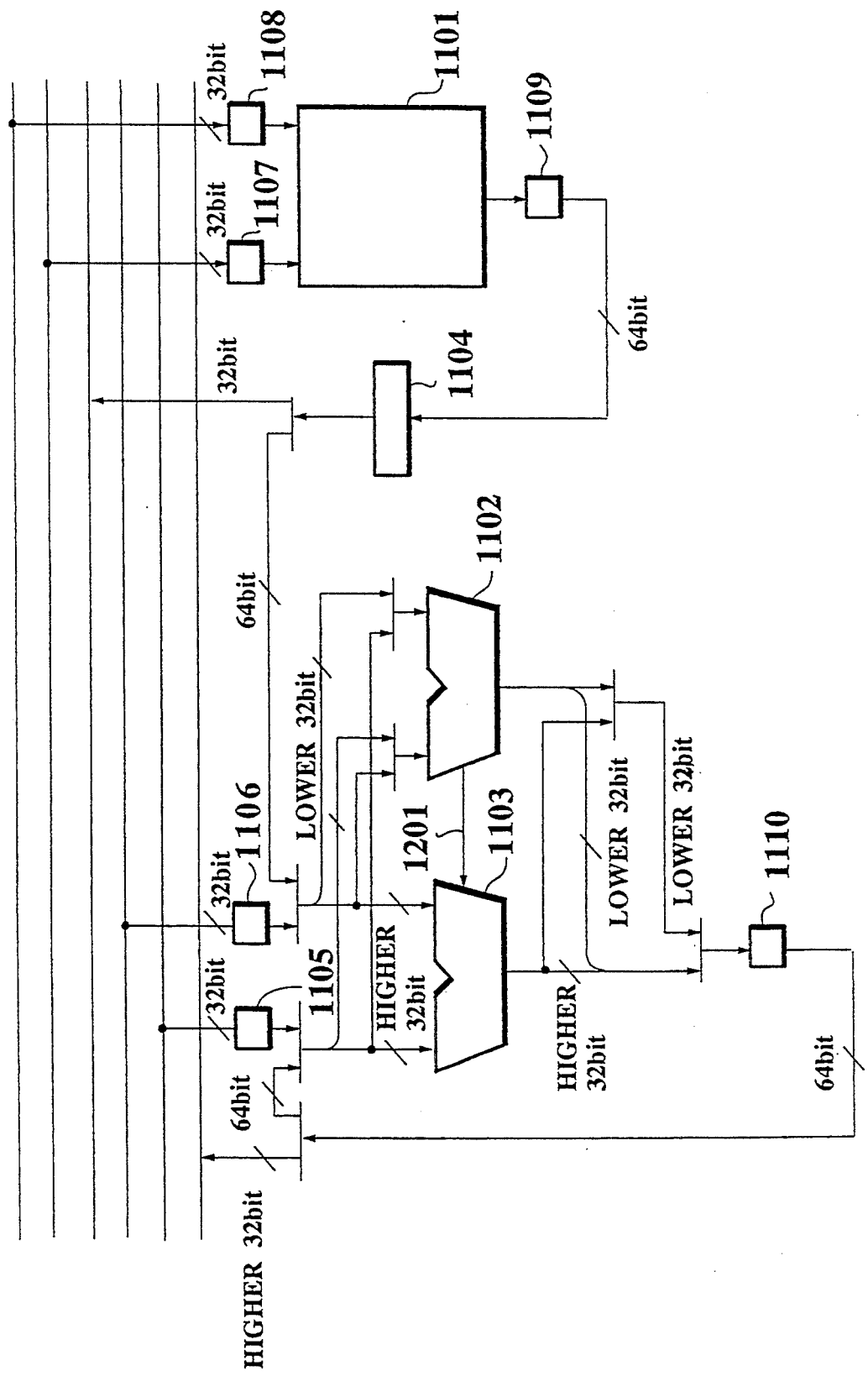
FIG. 62 is a block diagram to show construction of an embodiment related to the arithmetic operation section in the DSP according to the present invention.

FIG. 62 is a block diagram to show construction of an embodiment related to the arithmetic operation section. In this embodiment, explanation is given on the case of a 32-bit arithmetic operation section.

As shown in the same drawing, the operation section comprises a multiplier 1101, two arithmetic logical operation units (ALU) 1102, 1103, a shifter 1104, registers 1105 to 1109, and an accumulator 1110.

The multiplier 1101 has two input ports of 32 bit width, and one output port of 64 bit width.

The ALU's 1102, 1103 respectively have a first and a second input port of 32 bit width, and an output port of 32-bit width.

Moreover, the input and output sides of these multiplier 1101 and ALU's 1102, 1103 are respectively connected to general data buses.

Besides, the output of the multiplier 1101 and the inputs of the ALU's, and the outputs and inputs of the ALU's 1102, 1103 are respectively connected through exclusive lines.

Next, the operation of the arithmetic operation section is explained with reference to FIGS. 63.

Figure 63A:
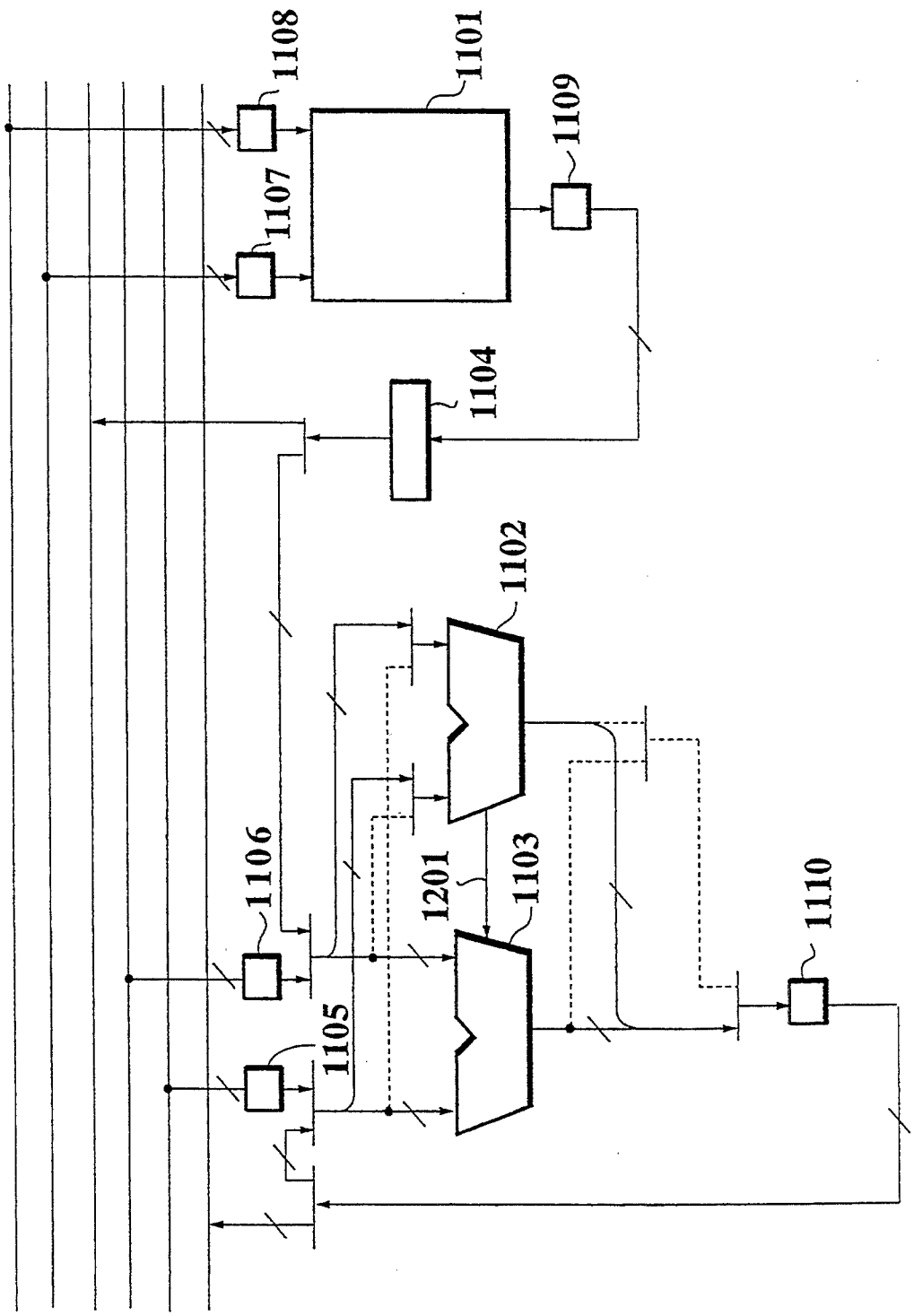
FIG. 63a is a block diagram to explain the operation of arithmetic operations for obtaining sums of products according to the arithmetic operation section shown in FIG. 62.

First, the arithmetic operation for obtaining sums of products is explained with reference to FIG. 63a.

In the same drawing, the wiring designated by solid lines is used for the operation for obtaining sums of products.

In the arithmetic operation, two 32-bit data on data buses are inputted to a multiplier 1101 through the registers 1107, 1108. Then, the multiplication result consisting of 64 bits is outputted from the multiplier 1101. Among the 64 bits of the multiplication result, the higher 32 bits are inputted to the first input port (the right input port in the drawing) of the ALU 1103, and the lower 32 bits are inputted to the first input port (the right input port in the drawing) of the ALU 1102.

On the other hand, the higher 32 bits of the 64-bit output of the accumulator 1110 are inputted to the second input port (the left input port in the drawing) of the ALU 1103, and the lower 32 bits thereof are inputted to the second input port (the left input port in the drawing) of the ALU 1102. Moreover, a carry output 1201 of the ALU 1102 is used as a carry input of the ALU 1103.

Moreover, the respective operation results of 32 bits of the ALU's 1103 and 1102 are connected together into a data of 64 bits, then inputted to the accumulator 1110. Moreover, the higher 32 bits and the lower 32 bits of the output of the accumulator 1110 are respectively inputted to the ALU's 1103 and 1102. Then, the same process is repeated.

As the result, the respective higher 32 bits are accumulated in the ALU 1103, and the respective lower 32 bits are accumulated in the ALU 1102, so that the operation for the sum of products is executed. Then, in the 64 bits of the final result of the operation for the sum of products, the higher 32 bits are outputted to the data bus from the accumulator 1110.

In the operation section, while the accumulation is carried out in the accumulator 111, the accuracy of 64 bits is guaranteed because each data to be processed by the accumulator 1110 comprises 64 bits. Moreover, though the final result to be outputted to the data bus is the higher 32 bits, and the lower 32 bits are omitted, there is no problem on the calculation to be carried out later.

Next, the arithmetic operation for obtaining absolute values of respective differences is explained with reference to FIG. 63b.

First, two data respectively comprising 32 bits are inputted from a data bus to the first input (designated on the left side in the drawing) and the second input (on the right side) of an ALU 1103 through registers 1105, 1106. At the same time, the same data are inputted to the second input (on the right side) and the first input (on the left side) of an ALU 1102.

In the ALU's 1102, 1103, the difference of these two data is respectively calculated. Then, among the arithmetic operation results from these ALU's 1102, 1103, the positive one is selected by a selector 1111, and inputted to an accumulator 1110. Thereafter, 32 bits all consisting of 0 are added to the lower site of the bit sequence in the inputted operaten result, so as to change it into a 64-bit data. Then, among the 64 bits inputted into the accumulator 1110, the higher 32 bits are outputted to the data bus. Since the accumulation operation is not conducted in the operation for obtaining an absolute value of difference, it is enough to use such a 32-bit data as a data to be processed.

Figure 63B:
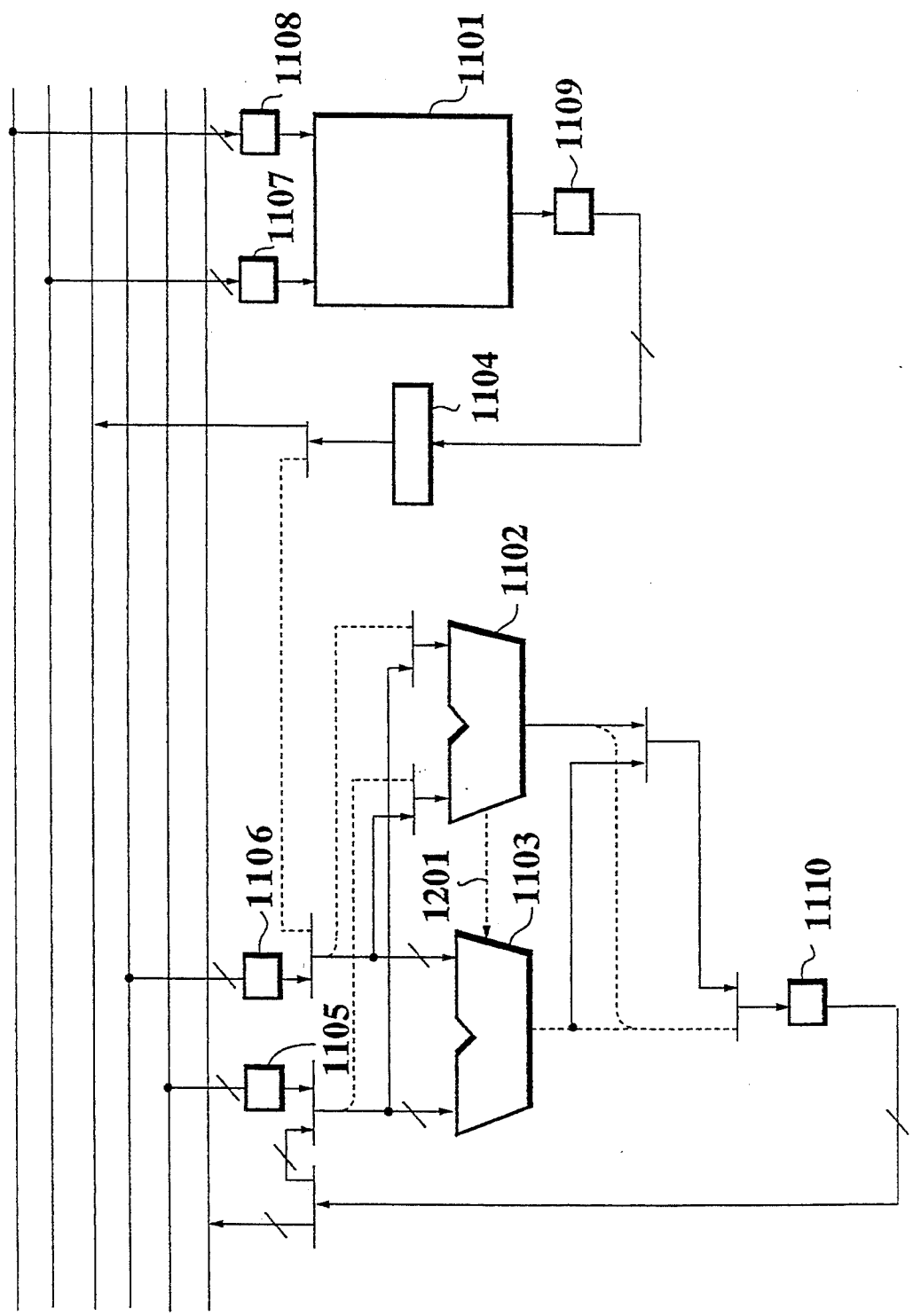

Incidentally, though a multiplier 1101 and the ALU's 1102, 1103 are operated independently in this embodiment shown in FIG. 63b, it is also possible to calculate absolute values on some multiplication results by using construction in which these are connected to one another.

Namely, since two ALU's of 32-bit input width are used in this embodiment, various arithmetic operations, e.g., operations for obtaining sums of products and for obtaining absolutes values of respective differences can be effectively carried out with keeping the accuracy of 64-bit calculation for obtaining sums of products without generating any ALU circuits not used during the operation. Moreover, the operation for obtaining absolute values of respective differences can be performed at a high speed.

Therefore, according to this embodiment related to the arithmetic operation section, since two arithmetic logic operation units are provided to one multiplier, the multiplication accuracy on the operation for obtaining sums of products can be kept, and these circuits are not wasted even in case of other arithmetic operations than that for obtaining sums of products. Moreover, it is also possible to realize high-speed operations for obtaining absolute values of respective differences without increasing the circuit scale.

Next, an embodiment of an overflow process circuit related to the operation section of the DSP is explained.

Namely, in the overflow process circuit of this embodiment can perform subtractions concerning overflowing numerical values and operations for obtaining absolute values of respective differences concerning overflowing numerical values.

Figure 64:
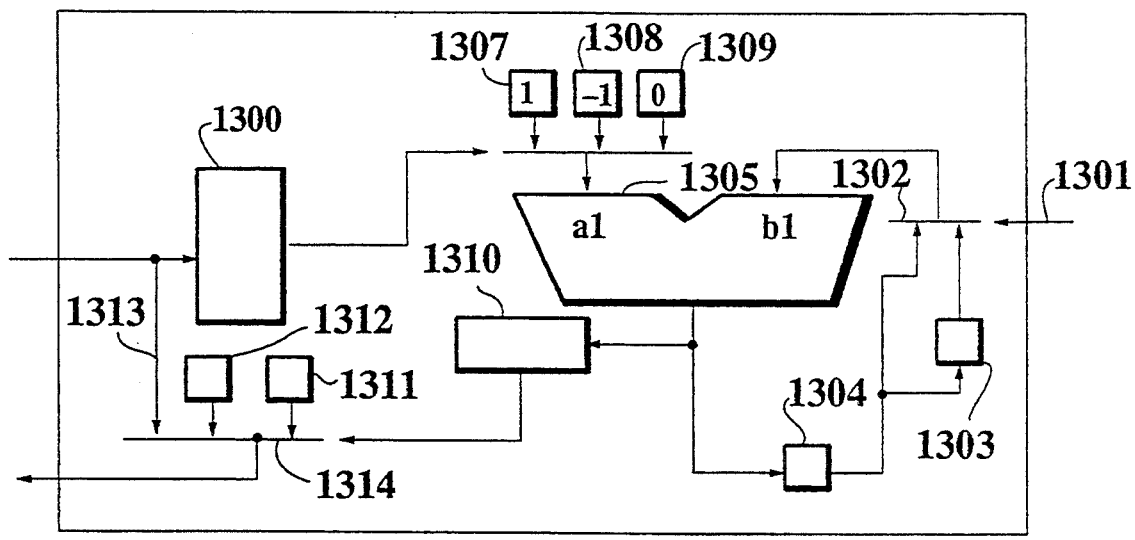
FIG. 64 is a diagram to show construction of an embodiment of an overflow process circuit in the arithmetic operation section of the DSP according to the present invention.
Figure 65:
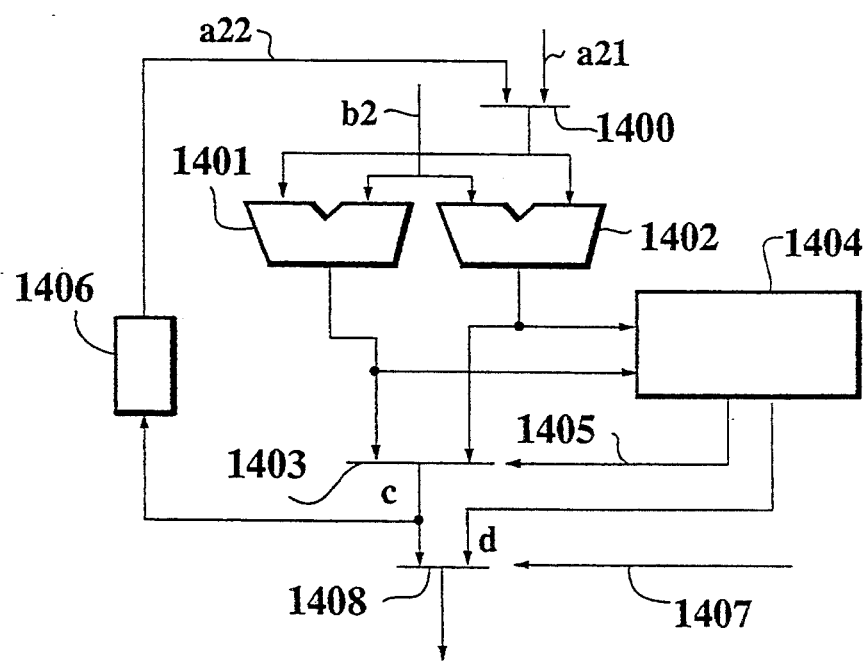
FIG. 65 is a diagram to show construction of a circuit for carrying out arithmetic operations for obtaining absolute values, in which is used the overflow process circuit of the present invention shown in FIG. 64.

FIG. 64 is a diagram to show construction of an overflow process circuit related to this embodiment, and FIG. 65 is a constructional diagram of a circuit for carrying out an arithmetic operation for obtaining absolute values of respective differences, in which such an overflow process circuit is used.

Figure 18:
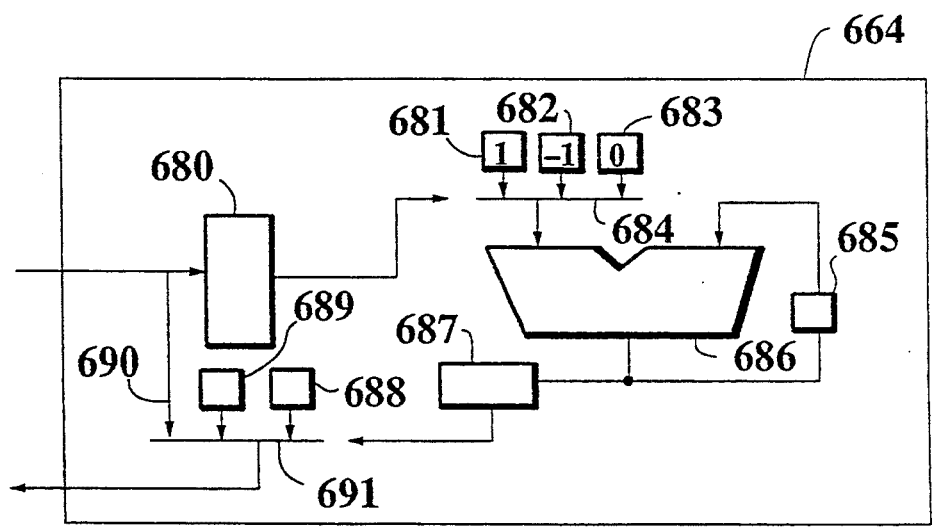
FIG. 18 is a diagram to show construction of an overflow process circuit in a conventional arithmetic operation section of a DSP.
Figure 19:
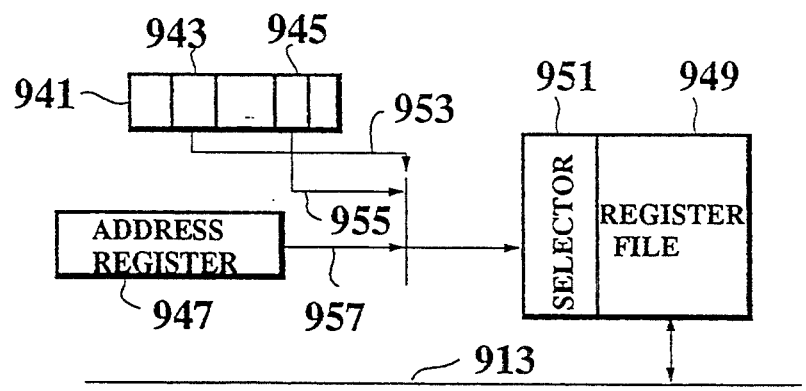
FIG. 19 is a block diagram to explain a manner in which a conventional register file selects an addressing mode.
Figure 20:
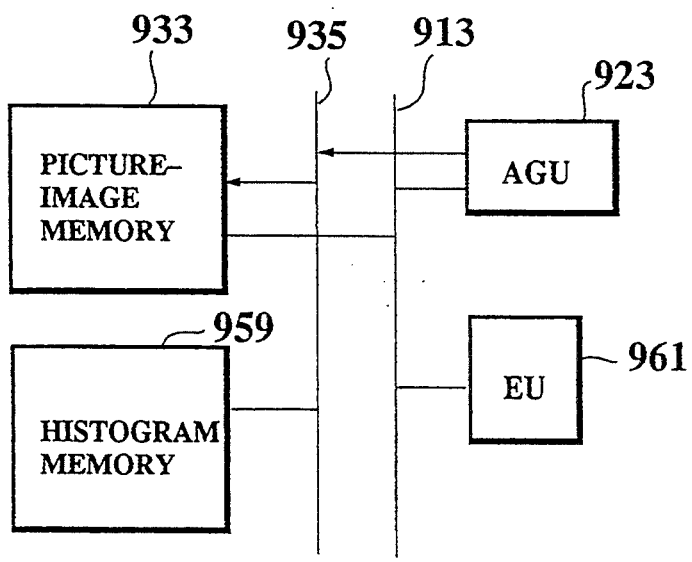
FIGS. 20a and 20b are block diagrams to respectively explain histogram processes in which a conventional register file is used.
Figure 20:
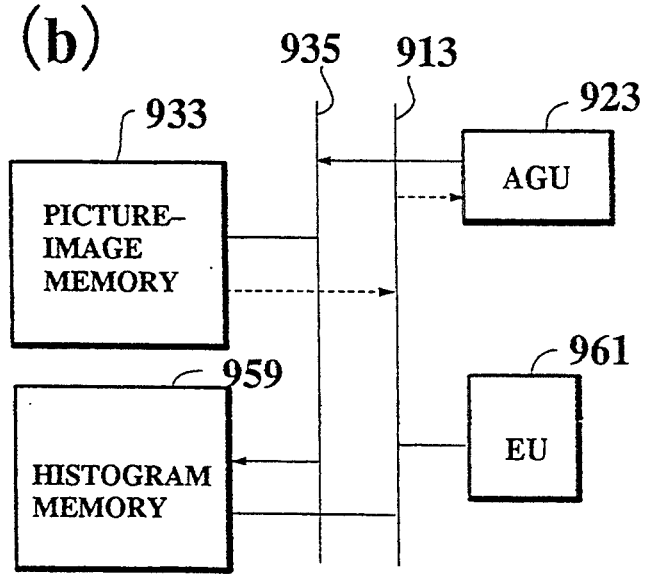
Figure 21:
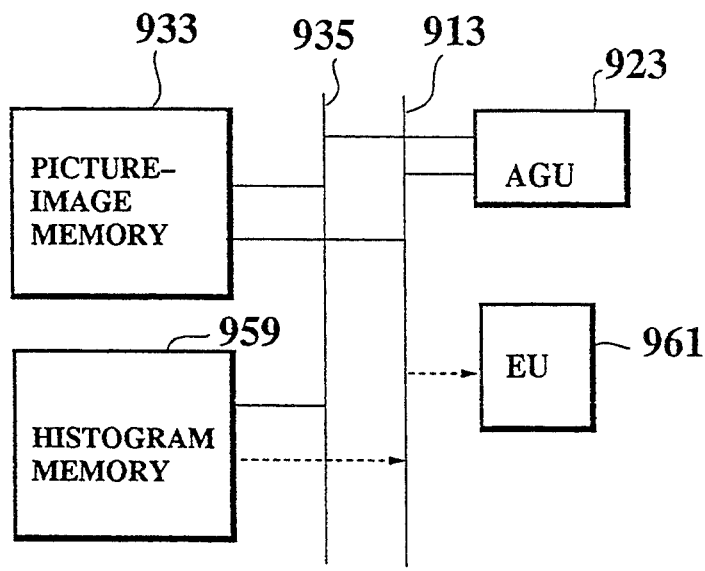
FIGS. 21a and 21b are block diagrams to respectively explain histogram processes in which a conventional register file is used in the same manner as in the case of FIGS. 20.
Figure 21:
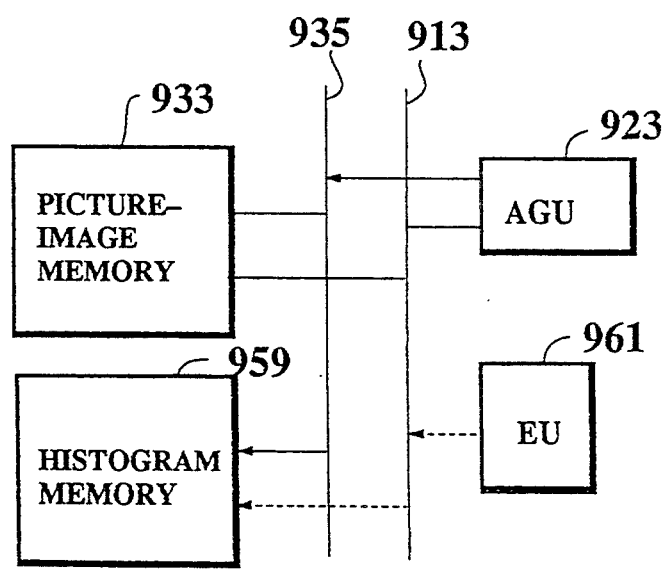

First, an overflow process concerning arithmetic operations using an overflowing numerical value as the subtrahend is explained with reference to FIG. 64. In the same drawing, the overflow process circuit has construction comprising adding a selector 1302 and a positive/negative sign reverse unit 1303 to a conventional overflow process circuit as shown in FIG. 18.

The positive/negative sign reverse unit 1303 reverses the sign of the value of a register 1304. The selector 1302 selects the output of the positive/negative sign reverse unit 1303 if an overflowing numerical number is used as the subtrahend in the operation, and if not so, selects the output of the register 1304.

In such construction, it is judged by a signal 1301 whether the value of the register 1304 in which the number of times of overflow processes having been carried out so far is held or of the positive/negative sign reverse unit 1303 is to be selected. Then, the selected value is inputted to an input b1 of an adder 1305 through the selector 1302. Namely, if the operation is carried out with an overflowing value as the subtrahend, the value of the positive/negative reverse unit 1303 is inputted to the input b1, while if not so, the value of the register 1304 is inputted thereto.

On the other hand, with respect to the input value of the overflow process circuit, the higher 2 bits are judged in an overflow judgement circuit 1300. If the higher 2 bits are 01, the operation carried out on the current stage is judged to be overflowing positively, so that the value "1" of a register 1307 is selected. If 10, the operation on the current stage is judged overflowing negatively, so that "−1" of a register 1308 is selected. Moreover, if 11 or 00, judgement that the overflow on the stage is not existent is given, so that "0" of a register 1309 is selected. Then, the selected value is inputted to another input a1 of thee adder 1305.

Thereafter, the addition result of the adder 1305 is inputted to both of the register 1304 and a clamp judgement circuit 1310. At the clamp judgement circuit 1310, whether the output of the adder 1305 is positive, negative or 0 is judged. If positive, a register 1311 in which is held the positive maximum value is selected, while if negative, a register 1312 holding the negative minimum value, and if 0, the input value 1313 to the overflow process circuit. Then, the selected value is outputted from a selector 1314.

Next, a case of an overflow process on an absolute value operation |a−b| of two numerical values a, b is explained with reference to FIG. 65. A circuit shown in the same drawing comprises subtracters 1401, 1402, a two-input overflow process circuit 1404 and a register 1406.

The subtracter 1401 performs a calculation a−b with respect to the input data a, b, while the other subtracter 1402 performs b−a.

The overflow process circuit 1404 receives the two operation results outputted from these subtracters 1401, 1402 so as to carry out clamping judgement. Moreover, this circuit 1404 outputs a signal 1405 for designating the one to be selected from a−b, b−a when the clamping is not detected, and outputs a clamped value d when the clamping is existent.

First, two data a21 and b2 selected by a selector 1400 are respectively inputted to the two subtracters 1401, 1402. Then, on the second process or after, two data a22 and b2 are inputted to the subtracters 1401, 1402. Thereafter, these subtracters 1401, 1402 respectively perform calculations of a−b, b−a at the same time. Incidentally, the parallel operations are executed for increasing the process speed.

Then, these two operation results are inputted to both of the selector 1403 and the overflow process circuit 1404. From the overflow process circuit 1404, the signal for designating the one to be selected from a−b, b−a in the non-clamping state or the clamped value d in the clamp state is outputted. Based on the signal 1405, one of the values a−b, b−a is selected by the selector 1403, and the selected value is outputted as a value c. Then, the value c is outputted to a selector 1408, at the same time, is held in a register 1406. Thereafter, the value d in the clamp state or c in the non-clamp state is selected by the selector 1408 under control of a clamp control signal 1407.

Next, the overflow process circuit 1404 in the absolute value operation is explained.

Because the value of the overflow counter (register must be always positive or 0, a special process is carried out for obtaining the number of times of overflow and the output value c during the accumulation operation. With respect to the operation, the explanation is given with reference to Table 3.

TABLE 3

| a − b | b − a | b | flgout | selected value |
|---|---|---|---|---|
| 0 | 0 | 0 | flg(n − 1) | positive one of a − b, b − a |
| + | − | 0 | flg(n − 1) + 1 | a − b |
| + | 0 | 0 | flg(n − 1) + 1 | a − b |
| 0 | + | 0 | flg(n − 1) + 1 | b − a |
| − | + | 0 | flg(n − 1) + 1 | b − a |
| 0 | 0 | − | −flg(n − 1) | a − b |
| 0 | + | − | −flg(n − 1) | a − b |
| + | 0 | − | −flg(n − 1) + 1 | a − b |
| + | − | − | −flg(n − 1) + 1 | a − b |
| − | + | − | −flg(n − 1) − 1 | a − b |
| 0 | 0 | + | flg(n − 1) | b − a |
| + | 0 | + | flg(n − 1) | b − a |
| 0 | + | + | flg(n − 1) + 1 | b − a |
| + | − | + | flg(n − 1) − 1 | b − a |
| − | + | + | flg(n − 1) + 1 | b − a |

Now, in FIG. 65, assume that the first input a22 is b and the second input b2 is a, and b is the result obtained by the previous accumulative operations. Moreover, in this case, a is not overflowing.

In Table 1, the columns a−b, b−a respectively show the states of operation results of a−b, b−a, 0 means the a state in which the overflow is not existent, +means positive overflow, and −means negative overflow. While, the column b shows the state of overflow of the previous accumulative operations, and the column of flgout shows the value of the overflow after the absolute value operation. Moreover, flg(n−1) shows the previous value of the overflow counter (register 1304), −flg(n−1) shows the value obtained by reversing the sign of flg(n−1), that is, the complement of 2. Furthermore, the last column shows the value to be outputted as the result of the absolute value operation.

In case that the input b is not overflowing (or 0), and the operation result is not overflowing (or both of a b and b−a are 0), the positive one of a−b and b−a is outputted as the result of the absolute value operation. In this case, the term "positive" means positive overflow so that "the positive one" apparently includes a negative value. On the other hand, in case that the input b is not overflowing, and the operation result is positively overflowing (a−b or b−a>0), 1 is added to the overflow counter, but when the operation result is not overflowing, the previous value is held in the overflow counter.

Moreover, in case that the input b is negatively overflowing (b<0), a−b is outputted as the result of the absolute value operation. In this case, when the operation result a−b is positively overflowing (a−b>0), 1 is added to a value obtained by reversing the sign of the overflow counter (the complement of 2), but when negatively overflowing (a−b<0), −1 is added to a value obtained by reversing the sign of the overflow counter (the complement of 2). Furthermore, when the result a−b is not overflowing (a−b=0), a value obtained by reversing the sign of the previous value is held as the overflow counter.

While, in case that the input b is positively overflowing (b>0), b−a is outputted as the result of the absolute value operation. In this case, when the operation result b−a is positively overflowing (b−a>0), 1 is added to the overflow counter, while when negatively overflowing (b−a<0), −1 is added to the overflow counter. Furthermore, when the result b−a is not overflowing (b−a=0), the previous value is held as the overflow counter.

On the clamping process, when the number of times of overflow flgout is 0, each value selected in Table 1 is outputted as such, while when not 0, the maximum positive value possible to be expressed is outputted.

As explained above, according to this embodiment related to the overflow process circuit, the complement of 2 is taken as a value of the overflow counter when the overflow is existent. Therefore, it becomes possible to exactly carry out subtractions using an overflowing numerical value as the subtrahend and absolute value operations with respect to overflowing values.

Next, an embodiment of a register file of the DSP for processing picture-image signals is explained.

Figure 66:
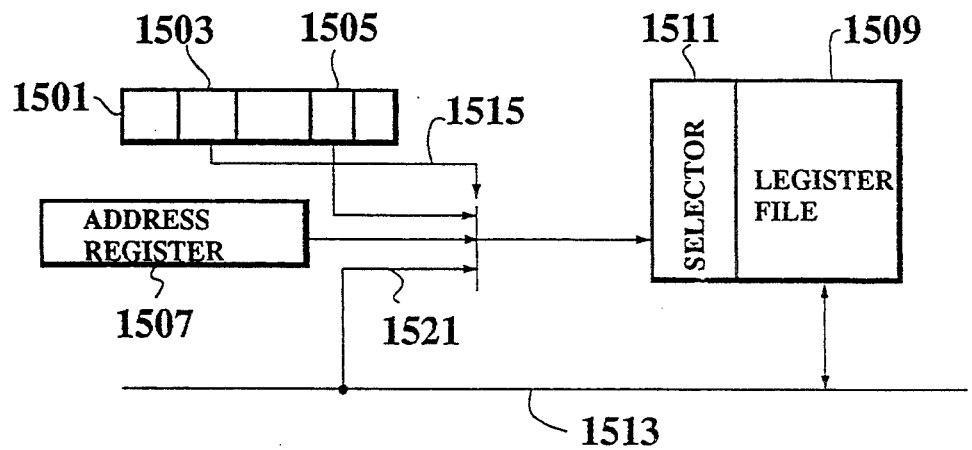
FIG. 66 is a block diagram to show construction of an embodiment of a first register file in the DSP according to the present invention.

FIG. 66 is a block diagram to show construction of an embodiment related to the register file.

In such construction, an addressing designation field 1503 and an address field 1505 are set in an instruction register 1501, so as to designate an addressing mode in accordance with the contents of the addressing designation field 1503. In more detail, a direct addressing mode, indirect addressing mode or a bus indirect addressing mode related to the present invention is selected. Moreover, in the address field 1505 are set addresses to be selected when the direct addressing mode is designated. Besides, in an address register 1507 are held addresses to be selected when the indirect addressing mode is designated.

As shown in the same drawing, a register file 1509 comprises a plurality of registers, and an address register designated by a selector 1511 is accessed.

In case that the direct addressing mode is designated by the addressing designation field 1503, the value set in the address field 1505 is selected as an address.

While, in case that the indirect addressing mode is designated, the value held in the address register 1507 is selected.

Moreover, in case that the bus indirect addressing mode is designated, the value set on a data bus 1513 is selected.

In accordance with an addressing designation signal 1515 outputted from the addressing designation field 1503, one of an direct address signal 1517, an indirect address signal 1519 and a bus indirect address signal 1521 is selected. Then, in accordance with the selected address signal, the selector 1511 designates an address to the register file 1509. Thereafter, a register corresponding to the address designated in the register file 1509 is accessed.

In such a manner, according to this embodiment, it becomes possible to directly set a value on the data bus 1513 as an address in the register file 1509. As the result, since the data transfer to the address register 1507 can be omitted, the execution time can be reduced.

Figure 67:
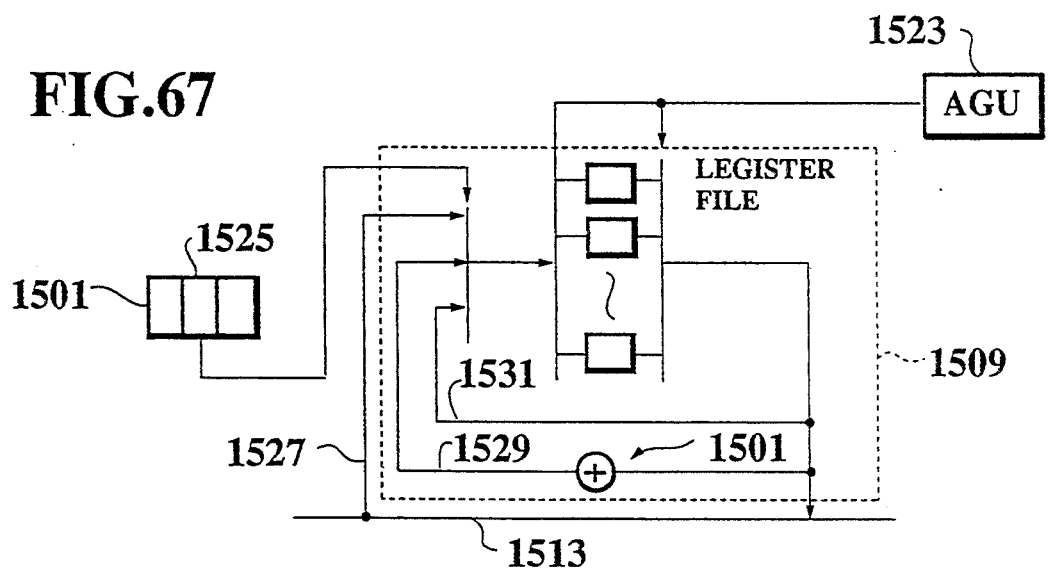
FIG. 67 is a block diagram to show construction of an embodiment of a second register file according to the present invention.

Next, the second embodiment related to the register file is explained with reference to FIGS. 67 and 68. FIG. 67 is a block diagram to show construction of the first embodiment related to a register file according to the second embodiment.

In the same drawing, data reading and data writing of a register file 1509 are schematically shown.

Incidentally, the same reference numerals or the same reference characters as in FIG. 66 respectively show the same functional elements.

An address data 1523 designates an address of the register file 1509 to be accessed.

While, in an instruction register 1501 is set a register writing selection field 1525, and a data to be written in a register is selected by a value of the field 1525.

The data on the data bus 1513 is read through a signal line 1527, and a value obtained by adding 1 to the value of the designated register is read through a signal line 1529. Moreover, the value of the designated register is directly read through a signal line 1531.

Then, in accordance with the value set at the register writing selection field 1525, one of these signal lines is selected, then In the: designated register the value is written.

Namely, if the signal line 1529 is selected, the value obtained by addition of 1 is written in the original register so as to carry out increment. If the signal line 1531 is selected, the previous value is directly written and held in the original register.

Figure 68:
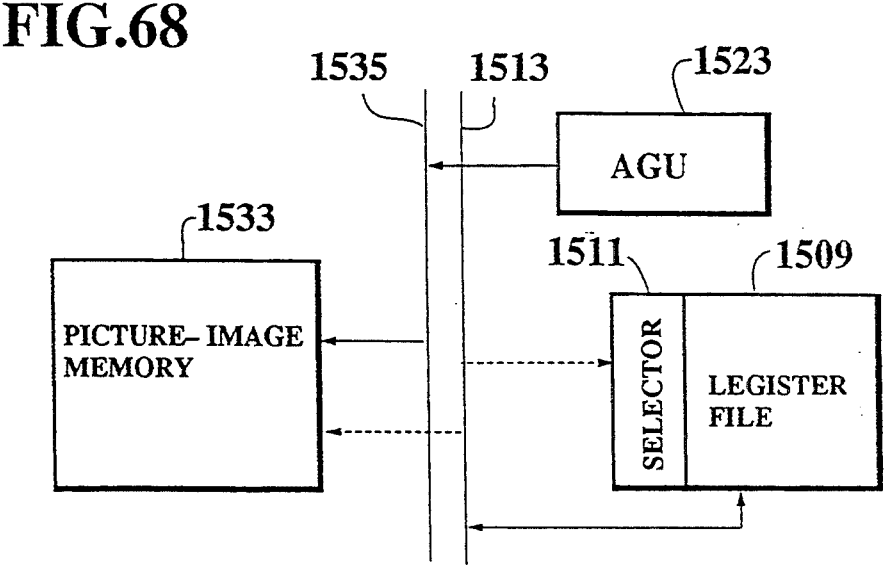
FIG. 68 is a block diagram to explain the histogram process according to the second register file of the present invention.

FIG. 68 shows a block diagram to explain the histogram process using the second embodiment.

In the same drawing, an AGU 1523 and a picture-image memory 1533 are connected to each other through an address bus 1535. Further, the picture-image memory 1583, a register file 1509 and a selector 1511 are connected to each other through a data bus 1513. Here, the register file 1509 incorporated in this system can be considered as a histogram memory.

When an address is outputted from the AGU 1523, the address is inputted to the picture-image memory 1533 through the address bus 1535. Then, a data held in the memory 1533 designated by the address is directly inputted to the selector 1511 through the data bus 1513. Namely, the data is an address which accesses the register file 1509. Then, a register corresponding to the address designated by the selector 1511 is accessed. Moreover, as shown in FIG. 67, it is possible to increment a histogram data (data of a register) in the register file 1509.

As stated above, according to the second embodiment, a data in the picture-image memory 1533 can be directly set as an address corresponding to the register file 1509. Moreover, it is possible to increment a histogram data in the register file 1509 without any EU (execution unit). Thus, it becomes possible to carry out the histogram process at a high speed.

As described above, according to the fist embodiment of the register file of the present invention, it becomes possible to select a data on a data bus as an address for designating a register. Therefore, since it is possible to directly designate such an address not through any address registers, the access time of the register file can be greatly reduced.

Moreover, according to the second embodiment of the register file of the present invention, the internal register file can be used as a histogram memory, and a data can be incremented in the histogram memory. As the result, since the pipeline operation becomes possible, and the entire operation can be realized with a relatively small number of steps, it becomes possible to execute the histogram process at a high speed.

Various modifications will become possible for those skilled in the art after receiving the teachings of the present disclosure without departing from the scope thereof.

What is claimed is:

1. A digital signal processor for processing input digital signals, comprising:
  (a) an address generation unit for generating an address of an addressing mode which is used for processing the input digital signals;
  (b) setting means for setting an initial value necessary for generating the address in advance in the address generation unit; and
  (c) instruction designating means for designating only execution and stop of address generation to the address generation unit;
  (d) the address generation unit in which is set the initial value being so constructed as to perform execution and stop of address generation only by designation of the execution and stop outputted from the instruction designating means, wherein the digital signals are picture-image signals and the address generation unit comprises:
  memory means for storing the maximum value and the minimum value in the respective X and Y directions of coordinates of a picture image;
  first count means for counting in the respective X and Y directions to successively carry out scan addressing on a screen;
  second count means for counting in the respective X and Y directions to carry out raster scan addressing in a specific area on the screen;
  memory means for storing the dimensions along the X and Y directions of the specific area;
  adjacent point address generation means for generating addresses of the X and Y directions so as to carry out addressing for accessing each adjacent point around a point optionally designated as a central point on a two-dimensional screen;
  input means for inputting address values of the respective X and Y directions given from the outside;
  addition means for generating an address corresponding to coordinates of the respective X and Y directions on a screen by adding data, with respect to the X and Y directions, obtained from the two count means for counting in the respective X and Y directions to successively carry out scan addressing and counting in the respective X and Y directions to carry out raster scan addressing in the specific area, adjacent point address generation means for generating addresses of the X and Y directions so as to carry out addressing for accessing the adjacent point, and input means for inputting address values of the respective X and Y directions;

bit reverse means for carrying out variable width bit reverse;

means for generating an address on a picture-image memory by shifting and adding respective addresses of the X and Y directions;

selection means for selecting one addressing mode and selecting an address to be given to the means for generating an address on the picture-image memory; and memory means for storing data during address calculation.

2. A digital signal processor for processing input digital signals, comprising:
   (a) an address generation unit for generating an address of an addressing mode which is used for processing the input digital signals;
   (b) setting means for setting an initial value necessary for generating the address in advance in the address generation unit; and
   (c) instruction designating means for designating only execution and stop of address generation to the address generation unit;
   (d) the address generation unit in which is set the initial value being so constructed as to perform execution and stop of address generation only by designation of the execution and stop outputted from the instruction designating means, wherein the address generation unit is so constructed as to perform time thinning-out fast Fourier transform, in case of address generation comprising $m-1$ stages based on the fast Fourier transform with respect to $2^m$ points, by using:
   a numerical value obtained by arranging in the reverse order all bits of a series of numbers generated by successively adding 1 from 0 until the final addition result reaches $2^m-1$ as a read address of each memory in which is contained an input digital signal, and the series of numbers as a write address of each memory in which is contained an output data, on the 0th stage;
   a numerical value obtained by arranging only the lower $n+1$ bits of the series of numbers generated by successively adding 1 to 0 until the final addition result reaches $2^m-1$ in the reverse order as a read address of each memory in which is contained an input digital signal and also as a write address of each memory in which is contained an output digital signal, on the n-th stage ($1 \leq n \leq m-1$); and
   a numerical value obtained by arranging the lower $m-1$ bits of a series of numbers generated by successively repeating $2^{m-n-1}$ times a cycle of adding 1 to 0 until the final result reaches $2^n-1$ at a period twice as long as that of the address generation of digital signals as a read address of each memory in which a factor is contained, on the n-th stage ($1 \leq n \leq m-1$).

3. A digital signal processor for processing input digital signals, comprising:
   (a) an address generation unit for generating an address of an addressing mode which is used for processing the input digital signals;
   (b) setting means for setting an initial value necessary for generating the address in advance in the address generation unit; and
   (c) instruction designating means for designating only execution and stop of address generation to the address generation unit;
   (d) the address generation unit in which is set the initial value being so constructed as to perform execution and stop of address generation only by designation of the execution and stop outputted from the instruction designating means, wherein the address generation unit is so constructed as to perform frequency thinning-out fast Fourier transform, in case of address generation comprising $m-1$ stages based on the fast Fourier transform with respect to $2^m$ points, by using:
   a numerical value obtained by arranging the lower $m$-$n$ bits of a series of numbers generated by successively adding 1 to 0 until the final addition result reaches $2^m-1$ in the reverse order as a read address of each memory in which is contained an input digital signal and also as a write address of each memory in which is contained an output digital signal, on the n-th stage ($1 \leq n \leq m-2$);
   a series of number generated by successively adding 1 to 0 until the final addition result reaches $2^m-1$ as a read address of each memory in which is contained an input digital signal, and a numerical value obtained by arranging all bits of the series of numbers in the reverse order as a write address of each memory in which is contained an output digital signal, on the (m−1)th stage; and
   a numerical value obtained by arranging the lower $m-1$ bits of a series of numbers generated by successively repeating $2^n$ times a cycle of adding 1 to 0 until the final result reaches $2^{m-n-1}-1$ at a period twice as long as that of the address generation of digital signals as a read address of each memory in which a factor is contained, on the n-th stage ($1 \leq n \leq m-1$).

4. A digital signal processor for processing input digital signals, comprising:
   (a) an address generation unit for generating an address of an addressing mode which is used for processing the input digital signals;
   (b) setting means for setting an initial value necessary for generating the address in advance in the address generation unit; and
   (c) instruction designating means for designating only execution and stop of address generation to the address generation unit;
   (d) the address generation unit in which is set the initial value being so constructed as to perform execution and stop of address generation only by designation of the execution and stop outputted from the instruction designating means, wherein the address generation unit comprises:
   memory means for storing parameters necessary for performing the affine transform for coordinate transformation of digital signals;
   count means for successively carrying out scan addressing by counting respective coordinates of the X and Y directions by using parameters stored in the memory means;
   X coordinate calculating means for calculating a real-number coordinate of the X direction based on an X coordinate counted by the count means;
   Y coordinate calculating means for calculating a real-number coordinate of the Y direction based on a Y coordinate counted by the count means;

adjacent coordinate detection means for detecting respective adjacent integral coordinates based on real-number coordinates of the X and Y directions respectively calculated by the X and Y coordinate calculating means; and generation means for generating each address on a memory of digital signals based on respective integral coordinates of the X and Y directions detected by the detection means, so as to perform the affine transform of a digital picture image.

5. A digital signal processor for processing input digital signals, comprising:

(a) an address generation unit for generating an address of an addressing mode which is used for processing the input digital signals;

(b) setting means for setting an initial value necessary for generating the address in advance in the address generation unit; and (c) instruction designating means for designating only execution and stop of address generation to the address generation unit;

(d) the address generation unit in which is set the initial value being so constructed as to perform execution and stop of address generation only by designation of the execution and stop outputted from the instruction designating means, wherein the address generation unit has a pipeline construction comprising:

address generation means for generating addresses necessary for digital signal processes based on a plurality of addressing modes;

a plurality of holding for holding addresses generated by the address generation means; and memory means for storing each address corresponding to each data for causing an addressing mode branch where an addressing mode is changed into another addressing mode, and for outputting the address to the address generation means when it is necessary to change the changed addressing mode into the original addressing mode, so as to start the pipeline operation in the original addressing mode again from an address next to the address corresponding to the data causing the branch.

6. A digital signal processor for processing input digital signals, comprising:

(a) an address generation unit for generating an address of an addressing mode which is used for processing the input digital signals;

(b) setting means for setting an initial value necessary for generating the address in advance in the address generation unit; and (c) instruction designating means for designating only execution and stop of address generation to the address generation unit;

(d) the address generation unit in which is set the initial value being so constructed as to perform execution and stop of address generation only by designation of the execution and stop outputted from the instruction designating means, wherein the address generation unit includes a plurality of counters and a decoder for generating respective X addresses and Y addresses respectively corresponding to a relative distance from each point to be accessed from among four or eight adjacent points to a point designated by a central point based on the outputs of the counters, and generating addresses of point to be accessed by calculation based on the X addresses and Y addresses of each point of the four or eight adjacent points and of the central point respectively generated by the decoder.

7. A digital signal processor for processing input digital signals, comprising:

(a) an address generation unit for generating an address of an addressing mode which is used for processing the input digital signals;

(b) setting means for setting an initial value necessary for generating the address in advance in the address generation unit; and (c) instruction designating means for designating only execution and stop of address generation to the address generation unit;

(d) the address generation unit in which is set the initial value being so constructed as to perform execution and stop of address generation only by designation of the execution and stop outputted from the instruction designating means, wherein the address generation unit includes a plurality of counters, a bit operation circuit for shifting or setting each output of the counters at a specific bit number, 1 or 0, and a decoder for generating respective X addresses and Y addresses respectively corresponding to a relative distance from each point to be accessed among four or eight adjacent points to a point designated by a central point based on the output of the bit operation circuit, and generating addresses of point to be accessed by calculation based on the X addresses and Y addresses of each point of the four or eight points and of the central point respectively generated by the decoder.

* * * * *